(12) United States Patent
El Hamss et al.

(10) Patent No.: US 12,349,108 B2
(45) Date of Patent: Jul. 1, 2025

(54) METHODS, DEVICES, AND SYSTEMS FOR SUPPORTING HARQ ON V2X

(71) Applicant: InterDigital Patent Holdings, Inc., Wilmington, DE (US)

(72) Inventors: Aata El Hamss, Laval (CA); Martino M. Freda, Laval (CA); Tao Deng, Roslyn, NY (US); Tuong Duc Hoang, Montreal (CA); Chunxuan Ye, San Diego, CA (US); Fengjun Xi, San Diego, CA (US); Kyle Jung-Lin Pan, Saint James, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 749 days.

(21) Appl. No.: 17/278,002

(22) PCT Filed: Sep. 25, 2019

(86) PCT No.: PCT/US2019/052945
§ 371 (c)(1),
(2) Date: Mar. 19, 2021

(87) PCT Pub. No.: WO2020/068973
PCT Pub. Date: Apr. 2, 2020

(65) Prior Publication Data
US 2021/0377912 A1      Dec. 2, 2021

Related U.S. Application Data

(60) Provisional application No. 62/736,296, filed on Sep. 25, 2018, provisional application No. 62/736,788, (Continued)

(51) Int. Cl.
*H04W 72/02*   (2009.01)
*H04L 1/1812*  (2023.01)
(Continued)

(52) U.S. Cl.
CPC .......... *H04W 72/02* (2013.01); *H04L 1/1819* (2013.01); *H04L 1/1896* (2013.01); *H04W 72/20* (2023.01); *H04W 72/542* (2023.01)

(58) Field of Classification Search
CPC ... H04W 72/02; H04W 72/20; H04W 72/542; H04L 1/1819; H04L 1/1896
See application file for complete search history.

(56) References Cited

U.S. PATENT DOCUMENTS 8,913,479 B2   12/2014   Bhushan et al.
9,143,304 B2    9/2015   Lee et al.
(Continued)

FOREIGN PATENT DOCUMENTS

CN     107645710 A    1/2018
EP     3442141 A1     2/2019
(Continued)

OTHER PUBLICATIONS

Huawei et al., "Sidelink control channel design of NR V2X," 3GPP TSG RAN WG1 Meeting #94, R1-1808937, Gothenburg, Sweden (Aug. 20-24, 2018).

(Continued)

*Primary Examiner* — Natasha W Cosme
(74) *Attorney, Agent, or Firm* — Flaster Greenberg, P.C.

(57) ABSTRACT

A WTRU apparatus and method for operation thereby are provided. The method may comprise receiving, from a network, a mapping rule which indicates HARQ feedback characteristics to employ for a QoS level and a channel load. The WTRU may determine a QoS level of data buffered for transmission and may further determine a channel load of a channel. Based on the QoS level and channel load, HARQ feedback characteristics may be determined. The WTRU may then transmit an SCI to another WTRU which indicates the HARQ feedback characteristics. In an embodiment, the (Continued)

mapping rule may indicate that a HARQ feedback format is to be used for HARQ feedback of the data. The data may be transmitted and HARQ feedback of the data may be received in accordance with the HARQ feedback format. Groupcast data may be transmitted to a plurality of WTRUs and feedback my be received.

18 Claims, 19 Drawing Sheets

Related U.S. Application Data filed on Sep. 26, 2018, provisional application No. 62/787,991, filed on Jan. 3, 2019.

(51) Int. Cl.
*H04L 1/1867* (2023.01)
*H04W 72/20* (2023.01)
*H04W 72/542* (2023.01)

(56) References Cited

U.S. PATENT DOCUMENTS

| | | | |
|---|---|---|---|
| 10,285,146 B2 | 5/2019 | Urabayashi et al. | |
| 10,715,373 B2 | 7/2020 | Kim et al. | |
| 10,728,852 B2 | 7/2020 | Zhang et al. | |
| 10,764,866 B2 | 9/2020 | Loehr et al. | |
| 10,868,643 B2 | 12/2020 | Boudreau et al. | |
| 11,076,013 B2 | 7/2021 | Sun et al. | |
| 11,140,640 B2 | 10/2021 | Tooher et al. | |
| 2013/0083749 A1 | 4/2013 | Xu et al. | |
| 2013/0242906 A1 | 9/2013 | Sun et al. | |
| 2014/0086173 A1 | 3/2014 | Sadeghi et al. | |
| 2014/0105164 A1 | 4/2014 | Moulsley et al. | |
| 2014/0192740 A1 | 7/2014 | Ekpenyong et al. | |
| 2014/0321406 A1 | 10/2014 | Mariner | |
| 2014/0337372 A1 | 11/2014 | Lee et al. | |
| 2015/0071050 A1 | 3/2015 | Iranzo Molinero | |
| 2015/0365926 A1 | 12/2015 | Long | |
| 2015/0365977 A1 | 12/2015 | Tabet et al. | |
| 2016/0029331 A1 | 1/2016 | Seo et al. | |
| 2016/0219620 A1 | 7/2016 | Lee et al. | |
| 2016/0294498 A1 | 10/2016 | Ma et al. | |
| 2017/0279522 A1 | 9/2017 | Yi | |
| 2017/0295601 A1* | 10/2017 | Kim | H04W 72/20 |
| 2017/0303214 A1 | 10/2017 | Lim et al. | |
| 2017/0318598 A1 | 11/2017 | Islam et al. | |
| 2017/0359791 A1 | 12/2017 | Onggosanusi et al. | |
| 2018/0029023 A1 | 2/2018 | Koseoglu et al. | |
| 2018/0048511 A1 | 2/2018 | Hakola et al. | |
| 2018/0167171 A1* | 6/2018 | Wu | H04L 1/1816 |
| 2018/0191473 A1 | 7/2018 | Ashraf et al. | |
| 2018/0198649 A1 | 7/2018 | Lindoff et al. | |
| 2018/0199341 A1 | 7/2018 | Baldemair et al. | |
| 2018/0206271 A1 | 7/2018 | Chatterjee et al. | |
| 2018/0255586 A1 | 9/2018 | Einhaus et al. | |
| 2018/0279388 A1 | 9/2018 | Miao et al. | |
| 2018/0376304 A1* | 12/2018 | Cheng | H04W 4/40 |
| 2018/0376439 A1 | 12/2018 | Urabayashi | |
| 2019/0029003 A1 | 1/2019 | Takeda et al. | |
| 2019/0037606 A1 | 1/2019 | Takeda et al. | |
| 2019/0044782 A1 | 2/2019 | Zeng et al. | |
| 2019/0052503 A1 | 2/2019 | Hayashi et al. | |
| 2019/0059075 A1 | 2/2019 | Hayashi et al. | |
| 2019/0149384 A1 | 5/2019 | Kim et al. | |
| 2019/0174530 A1 | 6/2019 | Kim et al. | |
| 2019/0208481 A1 | 7/2019 | Tang | |
| 2019/0230696 A1 | 7/2019 | Kim et al. | |
| 2020/0099499 A1 | 3/2020 | Yeo et al. | |
| 2020/0177356 A1 | 6/2020 | Kim et al. | |
| 2020/0214049 A1 | 7/2020 | Deenoo et al. | |
| 2020/0228383 A1 | 7/2020 | Kim et al. | |
| 2020/0287654 A1 | 9/2020 | Xi et al. | |
| 2021/0219250 A1 | 7/2021 | Tang | |
| 2021/0368487 A1 | 11/2021 | Nam et al. | |

FOREIGN PATENT DOCUMENTS

| | | |
|---|---|---|
| EP | 3490316 A1 | 5/2019 |
| KR | 2016-0036458 A | 4/2016 |
| WO | 2009062115 A2 | 5/2009 |
| WO | 2010050731 A2 | 5/2010 |
| WO | 2011132926 A2 | 10/2011 |
| WO | 2015000917 A2 | 1/2015 |
| WO | 2015172098 A1 | 11/2015 |
| WO | 2016047513 A1 | 3/2016 |
| WO | 2016130175 A1 | 8/2016 |
| WO | 2017035305 A1 | 3/2017 |
| WO | 2017135020 A1 | 8/2017 |
| WO | 2017135312 A1 | 8/2017 |
| WO | 2017156224 A1 | 9/2017 |
| WO | 2017196042 A1 | 11/2017 |
| WO | WO 2018/004322 A1 | 1/2018 |
| WO | 2018/029023 A1 | 2/2018 |
| WO | 2018018417 A1 | 2/2018 |
| WO | 2018031664 A1 | 2/2018 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital Inc., "Discussion on Physical Layer Procedures for NR V2X Sidelink," 3GPP TSG RAN WG1 #96, R1-1902596, Athens, Greece (Feb. 25-Mar. 1, 2019).

Interdigital, Inc., "Discussion on Physical Layer Procedures for NR V2X Sidelink," 3GPP TSG RAN WG1 #96, R1-1902619, Athens, Greece (Feb. 25-Mar. 1, 2019).

Interdigital, Inc., "Discussion on Uu-based Sidelink Resource Allocation and Configuration," 3GPP TSG RAN WG1 Meeting #95, R1-1813243, Spokane, USA (Nov. 12-16, 2018).

Interdigital, Inc., "Discussion On Uu-based Sidelink Resource Allocation and Configuration," 3GPP TSG RAN WG1 Meeting #95, R1-1813231, Spokane, USA (Nov. 12-16, 2018).

Interdigital, Inc., "Discussion On Uu-based Sidelink Resource Allocation and Configuration," 3GPP TSG RAN WG1 #96, R1-1902603, Athens, Greece (Feb. 25-Mar. 1, 2019).

(56) References Cited

OTHER PUBLICATIONS

Interdigital, Inc., "Enhancement of Uu Interface for NR Sidelink," 3GPP TSG RAN WG1 Meeting #94bis, R1-1811215, Chengdu, China (Oct. 8-12, 2018).
Interdigital, Inc., "NR Sidelink Resource Allocation for Mode 1," 3GPP TSG RAN WG1 #96b, R1-1905409, Xi'an, China (Apr. 8-12, 2019).
Interdigital, Inc., "NR Sidelink Resource Allocation for Mode 1," 3GPP TSG RAN WG1 #96b, R1-1905401, Xi'an, China (Apr. 8-12, 2019).
Interdigital, Inc., "On NR Sidelink Mode 1 Resource Allocation," 3GPP TSG RAN WG1 #97, R1-1907092, Reno, USA (May 13-17, 2019).
Interdigital, Inc., "On Physical Layer Procedures for NR V2X Sidelink," 3GPP TSG RAN WG1 #96b, R1-1905405, Xi'an, China (Apr. 8-12, 2019).
Interdigital, Inc., "On Physical Layer Procedures for NR V2X Sidelink," 3GPP TSG RAN WG1 #97, R1-1907096, Reno, USA (May 13-17, 2019).
Interdigital, Inc., "On Physical Layer Procedures," 3GPP TSG RAN WG1 Meeting #95, R1-1813227, Spokane, USA (Nov. 12-16, 2018).
Interdigital, Inc., "On Uu-based Sidelink Resource Allocation and Configuration," 3GPP TSG RAN WG1 Ad-Hoc Meeting 1901, R1-1900801, Taipei, Taiwan (Jan. 21-25, 2019).
Interdigital, Inc., "Physical Layer Procedures for NR V2X Sidelink," 3GPP TSG RAN WG1 Ad-Hoc Meeting 1901, R1-1900794, Taipei, Taiwan (Jan. 21-25, 2019).
Interdigital, Inc., "Support of NR Sidelink Unicast and Groupcast," 3GPP TSG RAN WG1 Meeting #94bis, R1-1811209, Chengdu, China (Oct. 8-12, 2018).
MCC Support, "Final Report of 3GPP TSG RAN WG1 #94 v1.0.0 (Gothenburg, Sweden, Aug. 20-24, 2018)," 3GPP TSG RAN WG1 Meeting #94bis, R1-1810051, Chengdu, China (Oct. 8-12, 2018).
Samsung, "Mode 4 behaviour in shared resource pool," 3GPP TSG-RAN WG2 Meeting #102, R2-1808674, Busan, Korea (May 21-25, 2018).
Third Generation Partnership Project, "Technical Specification Group Services and System Aspects; Enhancement of 3GPP support for V2X scenarios; Stage 1 (Release 15)," 3GPP TS 22.186 V15.2.0 (Sep. 2017).
Third Generation Partnership Project, "Technical Specification Group Services and System Aspects; Enhancement of 3GPP support for V2X scenarios; Stage 1 (Release 16)," 3GPP TS 22.186 V16.2.0 (Jun. 2019).
Third Generation Partnership Project, "Technical Specification Group Services and System Aspects; Study on enhancement of 3GPP Support for 5G V2X Services (Release 16)," 3GPP TR 22.886 V16.2.0 (Dec. 2018).
Third Generation Partnership Project, "Technical Specification Group Radio Access Network; NR; Physical layer procedures for control (Release 15)," 3GPP TS 38.213 V15.0.0 (Dec. 2017).
Third Generation Partnership Project, "Technical Specification Group Radio Access Network; NR; Physical layer procedures for control (Release 15)," 3GPP TS 38.213 V15.2.0 (Jun. 2018).
Third Generation Partnership Project, "Technical Specification Group Radio Access Network; NR; Physical layer procedures for control (Release 15)," 3GPP TS 38.213 V15.6.0 (Jun. 2019).
Third Generation Partnership Project, "Technical Specification Group Radio Access Network; NR; Medium Access Control (MAC) protocol specification (Release 15)," 3GPP TS 38.321 V15.2.0 (Jun. 2018).
Third Generation Partnership Project, "Technical Specification Group Radio Access Network; NR; Medium Access Control (MAC) protocol specification (Release 15)," 3GPP TS 38.321 V15.1.0 (Mar. 2018).
Third Generation Partnership Project, "Technical Specification Group Radio Access Network; NR; Medium Access Control (MAC) protocol specification (Release 15)," 3GPP TS 38.321 V15.6.0 (Jun. 2019).
Third Generation Partnership Project, "Technical Specification Group Radio Access Network; NR; Radio Resource Control (RRC) protocol specification (Release 15)," 3GPP TS 38.331 V15.6.0 (Jun. 2019).
Third Generation Partnership Project, "Technical Specification Group Radio Access Network; NR; Radio Resource Control (RRC) protocol specification (Release 15)," 3GPP TS 38.331 V15.2.1 (Jun. 2018).
Third Generation Partnership Project, "Technical Specification Group Radio Access Network; NR; Multiplexing and channel coding (Release 15)," 3GPP TS 38.212 V15.6.0 (Jun. 2019).
Third Generation Partnership Project, "Technical Specification Group Radio Access Network; NR; Multiplexing and channel coding (Release 15)," 3GPP TS 38.212 V15.2.0 (Jun. 2018).
Third Generation Partnership Project, "Technical Specification Group Services and System Aspects; System Architecture for the 5G System; Stage 2 (Release 15)," 3GPP TS 23.501 V15.2.0 (Jun. 2018).
Third Generation Partnership Project, "Technical Specification Group Radio Access Network; Evolved Universal Terrestrial Radio Access (E-UTRA); Multiplexing and channel coding (Release 15)," 3GPP TS 36.212 V15.0.1 (Jan. 2018).
Third Generation Partnership Project, "Technical Specification Group Radio Access Network; Evolved Universal Terrestrial Radio Access (E-UTRA); Multiplexing and channel coding (Release 15)," 3GPP TS 36.212 V15.2.1 (Jul. 2018).
Third Generation Partnership Project, "Technical Specification Group Radio Access Network; Evolved Universal Terrestrial Radio Access (E-UTRA); Multiplexing and channel coding (Release 15)," 3GPP TS 36.212 V15.6.0 (Jun. 2019).
Third Generation Partnership Project, "Technical Specification Group Radio Access Network; NR and E-UTRA; Coexistence between NB-IOT and NR (Release 16)," 3GPP TR 37.824 V0.1.0 (Aug. 2019).
Third Generation Partnership Project, "Technical Specification Group Services and System Aspects; Proximity-based services (ProSe); Stage 2 (Release 15)," 3GPP TS 23.303 V15.1.0 (Jun. 2018).
Third Generation Partnership Project, "Technical Specification Group Services and System Aspects; System Architecture for the 5G System (5GS); Stage 2 (Release 15)," 3GPP TS 23.501 V15.7.0 (Sep. 2019).
Third Generation Partnership Project, "Technical Specification Group Services and System Aspects; System Architecture for the 5G System (5GS); Stage 2 (Release 16)," 3GPP TS 23.501 V16.2.0 (Sep. 2019).
Third Generation Partnership Project, "Technical Specification Group Services and System Aspects; Study on enhancement of 3GPP Support for 5G V2X Services (Release 15)," 3GPP TR 22.886 V15.1.0 (Mar. 2017).
Third Generation Partnership Project, "Technical Specification Group Services and System Aspects; Study on enhancement of 3GPP Support for 5G V2X Services (Release 16)," 3GPP TR 22.886 V16.1.0 (Sep. 2018).
Third Generation Partnership Project, "Technical Specification Group Services and System Aspects; Enhancement of 3GPP support for V2X scenarios; Stage 1 (Release 16)," 3GPP TS 22.186 V16.0.0 (Sep. 2018).
R2-165055, "UE Support for Multiple Numerologies with NR", Interdigital Communications, 3GPP TSG-RAN WG1 #95, Göteborg, Sweden, Aug. 22-26, 2016, 3 pages.
"Methods for Flexible Resource Usage", U.S. Appl. No. 62/400,950, filed Sep. 28, 2016, 88 pages.
"Methods for Flexible Resource Usage", U.S. Appl. No. 62/373,089, filed Aug. 10, 2016, 81 pages.
3GPP TR 22.886 V16.2.0, "Technical Specification Group Services and System Aspects", Third Generation Partnership Project, Study on enhancement of 3GPP Support for 5G V2X Services (Release 16), Dec. 2018, 76 pages.
3GPP TR 37.824 V0.1.0, ""Technical Specification Group Radio Access Network", Third Generation Partnership Project, NR and E-UTRA; Coexistence between NB-IOT and NR (Release 16),", Aug. 2019, 39 pages.

(56) References Cited

OTHER PUBLICATIONS

3GPP TR 38.913 V0.3.0 , "Technical Specification Group Radio Access Network", Third Generation Partnership Project, "Study on Scenarios and Requirements for Next Generation Access Technologies; (Release 14),", Mar. 2016, 30 pages.
3GPP TR 38.913 V14.2.0 , "3rd Generation Partnership Project", Technical Specification Group Radio Access Network; Study on Scenarios and Requirements for Next Generation Access Technologies; (Release 14), Mar. 2017, 38 pages.
3GPP TS 22.186 V16.2.0 , "Technical Specification Group Services and System Aspects", Third Generation Partnership Project, Enhancement of 3GPP support for V2X scenarios; Stage 1 (Release 16),, Jun. 2019, 18 pages.
3GPP TS 23.303 V15.1.0 , "3rd Generation Partnership Project", Universal Mobile Telecommunications System (UMTS); LTE; Proximity-based services (ProSe); Stage 2 (3GPP TS 23.303 version 15.1.0 Release 15), Jun. 2018, 130 Pages.
3GPP TS 23.501 V15.2.0 , "Third Generation Partnership Project", Technical Specification Group Services and System Aspects; System Architecture for the 5G System; Stage 2 (Release 15), Jun. 2018, 217 pages.
3GPP TS 23.501 V15.7.0 , "Technical Specification Group Services and System Aspects", Third Generation Partnership Project, System Architecture for the 5G System (5GS); Stage 2 (Release 15), Sep. 2019, 243 pages.
3GPP TS 23.501 V16.2.0 , "Technical Specification Group Services and System Aspects", Third Generation Partnership Project, System Architecture for the 5G System (5GS); Stage 2 (Release 16),, Sep. 2019, 391 pages.
3GPP TS 36.101 V14.0.0 , "Technical Specification Group Radio Access Network", Third Generation Partnership Project, Evolved Universal Terrestrial Radio Access (E-UTRA); User Equipment (UE) radio transmission and reception (Release 14),, Jun. 2016, 1057 pages.
3GPP TS 36.101 V14.4.0 , "3rd Generation Partnership Project", Technical Specification Group Radio Access Network; Evolved Universal Terrestrial Radio Access (E-UTRA); User Equipment (UE) radio transmission and reception (Release 14), Jun. 2017, 1449 pages.
3GPP TS 36.211 V13.0.0 , "3rd Generation Partnership Project", Technical Specification Group Radio Access Network; Evolved Universal Terrestrial Radio Access (E-UTRA); Physical channels and modulation (Release 13), Dec. 2015, 141 pages.
3GPP TS 36.211 V13.2.0 , "3rd Generation Partnership Project", 3rd Generation Partnership Project; Technical Specification Group Radio Access network; Evolved Universal Terrestrial Radio Access (E-UTRA); Physical Channels and Modulation (Release13), Jun. 2016, pp. 1-170.
3GPP TS 36.211 V13.6.0 , "3rd Generation Partnership Project", Technical Specification Group Radio Access Network; Evolved Universal Terrestrial Radio Access (E-UTRA); Physical channels and modulation (Release 13), Jun. 2017, 171 pages.
3GPP TS 36.211 V14.3.0 , "3rd Generation Partnership Project", Technical Specification Group Radio Access Network; Evolved Universal Terrestrial Radio Access (E-UTRA); Physical channels and modulation (Release 14), Jun. 2017, 195 pages.
3GPP TS 36.212 V13.2.0 , "Third Generation Partnership Project", Technical Specification Group Radio Access Network; Evolved Universal Terrestrial Radio Access (E-UTRA); Multiplexing and channel coding (Release 13), Jun. 2016, 140 pages.
3GPP TS 36.212 V13.6.0 , "Technical Specification Group Radio Access Network", Third Generation Partnership Project, '; Evolved Universal Terrestrial Radio Access {E-UTRA); Multiplexing and channel coding {Release 13),, Jun. 2017, 140 pages.
3GPP TS 36.212 V14.3.0 , "Technical Specification Group Radio Access Network", Third Generation Partnership Project, Evolved Universal Terrestrial Radio Access (E-UTRA); Multiplexing and channel coding (Release 14),, Jun. 2017, 198 pages.
3GPP TS 36.213 V13.0.1 , "3rd Generation Partnership Project", Technical Specification Group Radio Access Network; Evolved Universal Terrestrial Radio Access (E-UTRA); Physical layer procedures (Release 13), 326 pages., Jan. 2016.
3GPP TS 36.213 V13.6.0 , "3rd Generation Partnership Project", Technical Specification Group Radio Access Network; Evolved Universal Terrestrial Radio Access (E-UTRA); Physical layer procedures (Release 13), Jun. 2017, 378 pages.
3GPP TS 36.213 V14.3.0 , "Third Generation Partnership Project", Technical Specification Group Radio Access Network; Evolved Universal Terrestrial Radio Access (E-UTRA); Physical layer procedures (Release 14), Jun. 2017, 460 pages.
3GPP TS 36.214 V13.2.0 , "Third Generation Partnership Project", Technical Specification Group Radio Access Network; Evolved Universal Terrestrial Radio Access (E-UTRA); Physical layer; Measurements (Release 13), Jun. 2016, 19 pages.
3GPP TS 36.214 V13.4.0 , "3rd Generation Partnership Project", Technical Specification Group Radio Access Network; Evolved Universal Terrestrial Radio Access (E-UTRA); Physical layer; Measurements (Release 13), Dec. 2016, 21 pages.
3GPP TS 36.214 V14.2.0 , "Technical Specification Group Radio Access Network", Third Generation Partnership Project, Evolved Universal Terrestrial Radio Access (E-UTRA); Physical layer; Measurements (Release 14),, Mar. 2017, 22 pages.
3GPP TS 36.300 V13.4.0 , "Third Generation Partnership Project", Technical Specification Group Radio Access Network; Evolved Universal Terrestrial Radio Access (E-UTRA) and Evolved Universal Terrestrial Radio Access Network (E-UTRAN); Overall description; Stage 2 (Release 13), Jun. 2016, 310 pages.
3GPP TS 36.300 V13.8.0 , "Technical Specification Group Radio Access Network", Third Generation Partnership Project, Evolved Universal Terrestrial Radio Access (E-UTRA) and Evolved Universal Terrestrial Radio Access Network (E-UTRAN); Overall description; Stage 2 (Release 13),, Jun. 2017, 314 pages.
3GPP TS 36.300 V14.3.0 , "Technical Specification Group Radio Access Network", Third Generation Partnership Project, Evolved Universal Terrestrial Radio Access (E-UTRA) and Evolved Universal Terrestrial Radio Access Network (E-UTRAN); Overall description; Stage 2 (Release 14),, Jun. 2017, 331 pages.
3GPP TS 36.321 V13.0.0 , "Third Generation Partnership Project", Technical Specification Group Radio Access Network; Evolved Universal Terrestrial Radio Access (E-UTRA); Medium Access Control (MAC) protocol specification (Release 13), Dec. 2015, 82 pages.
3GPP TS 36.321 V13.2.0 , "Third Generation Partnership Project", Technical Specification Group Radio Access Network; Evolved Universal Terrestrial Radio Access (E-UTRA); Medium Access Control (MAC) protocol specification (Release 13), Jun. 2016, 91 pages.
3GPP TS 36.321 V13.6.0 , "3rd Generation Partnership Project", Technical Specification Group Radio Access Network; Evolved Universal Terrestrial Radio Access (E-UTRA); Medium Access Control (MAC) protocol specification (Release 13), Jun. 2017, 93 pages.
3GPP TS 36.321 V14.3.0 , "Third Generation Partnership Project", Technical Specification Group Radio Access Network; Evolved Universal Terrestrial Radio Access (E-UTRA); Medium Access Control (MAC) protocol specification (Release 14), Jun. 2017, 107 pages.
3GPP TS 36.331 V10.19.0 , "3rd Generation Partnership Project", Technical Specification Group Radio Access Network; Evolved Universal Terrestrial Radio Access (E-UTRA); Radio Resource Control (RRC); Protocol specification (Release 10), Dec. 2015, 317 pages.
3GPP TS 36.331 V13.0.0 , "3rd Generation Partnership Project", Technical Specification Group Radio Access Network; Evolved Universal Terrestrial Radio Access (E-UTRA); Radio Resource Control (RRC); Protocol specification (Release 13), Dec. 2015, 507 pages.
3GPP TS 36.331 V13.2.0 , "Third Generation Partnership Project", Technical Specification Group Radio Access Network; Evolved Universal Terrestrial Radio Access (E-UTRA); Radio Resource Control (RRC); Protocol specification (Release 13), Jun. 2016, 623 pages.

(56) References Cited

OTHER PUBLICATIONS

3GPP TS 36.331 V13.6.1 , "Technical Specification Group Radio Access Network", Third Generation Partnership Project, Evolved Universal Terrestrial Radio Access {E-UTRA); Radio Resource Control {RRC); Protocol specification {Release 13),, Jul. 2017, 639 pages.
3GPP TS 36.331 V14.3.0 , "Third Generation Partnership Project", Technical Specification Group Radio Access Network; Evolved Universal Terrestrial Radio Access (E-UTRA); Radio Resource Control (RRC); Protocol specification (Release 14), Jun. 2017, 745 pages.
3GPP TS 38.211 V0.1.0 , "3rd Generation Partnership Project", Technical Specification Group Radio Access Network; NR; Physical channels and modulation (Release 15), Jun. 2017, 22 pages.
3GPP TS 38.212 V15.2.0 , "Technical Specification Group Radio Access Network", Third Generation Partnership Project, NR; Multiplexing and channel coding (Release 15),, Jun. 2018, 98 pages.
3GPP TS 38.212 V15.6.0 , "Technical Specification Group Radio Access Network", Third Generation Partnership Project, NR; Multiplexing and channel coding (Release 15),, Jun. 2019, 101 pages.
3GPP TS 38.213 V15.0.0 , "Third Generation Partnership Project", Technical Specification Group Radio Access Network; NR; Physical layer procedures for control (Release 15), Dec. 2017, 56 pages.
3GPP TS 38.213 V15.2.0 , "Third Generation Partnership Project", Technical Specification Group Radio Access Network; NR; Physical layer procedures for control (Release 15), Jun. 2018, 99 pages.
3GPP TS 38.213 V15.6.0 , "Technical Specification Group Radio Access Network", Third Generation Partnership Project, NR; Physical layer procedures for control (Release 15),, Jun. 2019, 107 pages.
3GPP TS 38.300 V0.4.1 , "Technical Specification Group Radio Access Network", Third Generation Partnership Project, NR; NR and NG-RAN Overall Description; Stage 2 (Release 15),, Jun. 2017, 55 pages.
3GPP TS 38.321 V0.2.0 , "Technical Specification Group Radio Access Network", Third Generation Partnership Project, NR; Medium Access Control (MAC) protocol specification (Release 15),, Aug. 2017, 36 pages.
3GPP TS 38.321 V15.1.0 , "3rd Generation Partnership Project", 3rd Generation Partnership Project; Technical Specification Group Radio Access Network; NR; Medium Access Control (MAC) protocol specification (Release 15), Mar. 2018, 67 Pages.
3GPP TS 38.321 V15.2.0 , "Third Generation Partnership Project", Technical Specification Group Radio Access Network; NR; Medium Access Control (MAC) protocol specification (Release 15), Jun. 2018, 73 pages.
3GPP TS 38.321 V15.6.0 , "Technical Specification Group Radio Access Network", Third Generation Partnership Project, NR; Medium Access Control (MAC) protocol specification (Release 15), Jun. 2019, 78 pages.
3GPP TS 38.331 V0.0.4 , "3rd Generation Partnership Project", Technical Specification Group Radio Access Network; NR; Radio Resource Control (RRC); Protocol specification (Release 15 ), Jun. 2017, 22 pages.
3GPP TS 38.331 V15.2.1 , "Technical Specification Group Radio Access Network", Third Generation Partnership Project, NR; Radio Resource Control (RRC) protocol specification (Release 15),, Jun. 2018, 303 pages.
Carlton, Alan , "Will 5G Say Farewell to OFDM?", Computer World Article, Mar. 14, 2016, 3 pages.
Intel Corporation , "3rd Generation Partnership Project (3GPP) TS TSG RAN WG1 Meeting #84bis", Busan, Korea, Overview of New Radio Access Technology Requirements and Designs, 8.1.1, Discussion and Decision,, Apr. 2016, 4 pages.
Nterdigital Communications , "UE Support for Multiple Numerologies with NR", 3GPP TSG-RAN WG1 #86, , Göteborg, Sweden, Aug. 22-26, 2016).
R1-155964 , "Technical Considerations on Subcarrier Spacing", 3GPP TSG RAN WG1 Meeting #82bis, Huawei et al., Malmo, Sweden, Oct. 5-9, 2015, 4 pages.
R1-160131 , "NB-IOT Uplink Shared Channel Design", 3GPP TSG RAN WG1 NB-IoT Ad-Hoc Meeting, Intel Corporation, Budapest, Hungary, Jan. 18-20, 2016, 9 pages.
R1-160458 , "Random Access procedure for NB-IoT", 3GPP TSG-RAN WG1 Meeting #84, Nokia Networks et al., St. Julian's, Malta, Feb. 15-19, 2016, 3 pages.
R1-1609425 , "Discussion on UE behavior on mixed numerology carrier", Huawei et al.:, 3GPP Draft; , 3rd Generation Partnership Project (3GPP), Mobile Competence Centre ; 650, Route Des Lucioles ; F-06921 Sophia-Antipolis Cedex ; France vol. RAN WGl , No. Lisbon, Portugal, Oct. 10, 2016-Oct. 14, 2016, 1 page.
R1-1610022 , "UE Support for Multiple Numerologies for NR", 3GPP TSG-RAN WG1 #86bis, InterDigital Communications, Lisbon, Portugal, Oct. 10-14, 2016, 5 pages.
R1-161006 , "Correction on HARQ-ACK bit concatenation for PUCCH format 4 and 5", 3GPP TSG-RAN1 Meeting #84, Lenovo, St Julian's, Malta, Feb. 15-19, 2016, 25 pages.
R1-1610089 , "DL Control Channel Framework for NR", InterDigital Communications, 3GPP TSG-RAN WG1 #86bis, Lisbon, Portugal, Oct. 10-14, 2016, pp. 1-5.
R1-161009 , "Random Access Procedure for NB-IoT", 3GPP TSG RAN WG1 Meeting #84, Lenovo, St Julian's, Malta,, Feb. 15-19, 2016, 4 pages.
R1-161022 , "Random access procedure for NB-PDSCH", 3GPP TSG RAN WG1 NB-IoT Ad-Hoc Meeting, NTT Docomo, St Julian's, Malta, Feb. 15-19, 2016, 3 pages.
R1-1610229 , "Performance comparison of nonlinear precoding schemes for NR MU-MIMO", 3GPP TSG-RAN WG1 #86bis, Mitsubishi Electric, Lisbon, Portugal, Oct. 10-14 2016, 12 pages.
R1-1610351 , "A Framework for Initial Access for NR", 3GPP TSG-RAN WG1 #86bis, InterDigital Communications, Lisbon, Portugal, Oct. 10-14, 2016, 4 pages.
R1-1610352 , "Random Access and Support for Multiple Numerologies for NR", 3GPP TSG-RAN WG1 #86bis, InterDigital Communications, Lisbon, Portugal, Oct. 10-14, 2016, 3 pages.
R1-1611651 , "On numerology determination during initial access", 3GPP TSG RAN WG1 Meeting #87, Huawei, HiSilicon, Reno, USA, Nov. 14-18, 2016, 3 pages.
R1-162379 , "Overview of new radio access technology requirements and designs", 3GPP TSG RAN WG1 Meeting #84bis, Intel Corporation, Busan, Korea, Apr. 11-15, 2016, 4 pages.
R1-164032 , "Discussion on frame structure for NR", 3GPP TSG RAN WG1 Meeting #85, Huawei, HiSilicon, Nanjing, China, May 23-27, 2016, 8 pages.
R1-164261 , "Forward compatibilty for numerology and frame structure design", 3GPP TSG-RAN WG1 Meeting #85, Zte et al., Nanjing, China, May 23-27, 2016, 7 pages.
R1-166586 , "Considerations on Initial Access Design", Xinwei, 3GPP TSG RAN WG1 Meeting #86, , Gothenburg, Sweden, Aug. 22-26, 2016), 6 pages.
R1-166796 , "Overview on issues for NR initial access", 3GPP TSG RAN WG1 Meeting #86, Samsung, Gothenburg, Sweden, Aug. 22-26, 2016, 4 pages.
R1-167327 , "Forward Compatible Control Channel Framework for NR", InterDigital Communications, 3GPP TSG-RAN WG1 #86, Goteborg, Sweden, Aug. 22-26, 2016, pp. 1-5.
R1-167328 , "UE Support for Multiple Numerologies with NR", 3GPP TSG-RAN WG1 #86, InterDigital Communications, Göteborg, Sweden, Aug. 22-26, 2016, 4 pages.
R1-167439 , "Use of multiple numerologies in NR", Panasonic, 3GPP TSG RAN WG1 Meeting #86, Gothenburg, Sweden, Aug. 22-26, 2016, 9 pages.
R1-167705 , "Design on NR DL Synchronization", 3GPP TSG RAN WG1 Meeting #86, Intel Corporation, Gothenburg, Sweden, Aug. 22-26, 2016, 7 pages.
R1-167847 , "Discussion on Sync Signals Supporting Different Numerologies", 3GPP TSG RAN WG1 Meeting #86, Convida Wireless, Gothenburg, Sweden, Aug. 22-26, 2016, 5 pages.
R1-1703781 , "WF on resource allocation for data transmission", 3GPP TSG RAN WG1 Meeting #88, Huawei et al., Athens, Greece, Feb. 13-17, 2017, 2 pages.

(56) References Cited

OTHER PUBLICATIONS

R1-1706582, "WF on bandwidth part", 3GPP TSG RAN WG1 Meeting #88bis, Huawei et al., Spokane, USA, Apr. 3-7, 2017, 3 pages.
R1-1706745, "Way Forward on bandwidth part in NR", 3GPP TSG-RAN WG1 #88bis, MediaTek et al., Spokane, USA, Apr. 3-7, 2017, 2 pages.
R1-1709010, "DL data scheduling", 3GPP TSG RAN WG1 Meeting #89, InterDigital, Hangzhou, P.R. China, May 15-19, 2017, 3 pages.
R1-1709519, "WF on bandwidth part configuration", 3GPP TSG RAN WG1 Meeting #89, Oppo et al., Hangzhou, P.R. China, May 15-19, 2017, 3 pages.
R1-1709791, "WF on DL PRB Bundling Size Value Set", 3GPP TSG RAN WG1 RAN1 #89, Xinwei et al., Hangzhou, China, May 15-19, 2017, 3 pages.
R1-1709802, "Way Forward on bandwidth part for efficient wideband operation in NR", R1-17xxxxx, 3GPP TSG-RAN WG1 #89, Ericsson et al., Hangzhou, China, May 15-19, 2017, 2 pages.
R1-1710953, "On frequency-domain resource allocation for NR", 3GPP TSG RAN WG1 NR Ad-Hoc#2, InterDigital, Inc., Qingdao, P.R. China, Jun. 27-30, 2017, 5 pages.
R1-1711788, "Way forward on further details of bandwidth part operation", 3GPP TSG-RAN WG1 Ad-Hoc #2, Intel et al., Qingdao, P.R. China, Jun. 27-30, 2017, 4 pages.
R1-1711802, "Way Forward on Further Details for Bandwidth Part", 3GPP TSG-RAN WG1 NR Ad-Hoc Meeting, MediaTek et al., Qingdao, China, Jun. 27-30, 2017, 2 pages.
R1-1711812, "WF on configuration of a BWP in wider bandwidth operation", 3GPP TSG RAN1 NR Ad-Hoc#2, Qingdao, LG Electronics et al., P.R. China, Jun. 27-30, 2017, 2 pages.
R1-1711843, "Outputs of offline discussion on RBG size/number determination", 3GPP TSG RAN WG1 NR Ad-Hoc#2, Oppo et al., Qingdao, P.R. China, Jun. 27-30, 2017, 5 pages.
R1-1711853, "Activation/deactivation of bandwidth part", 3GPP TSG RAN1 NR Ad-Hoc#2, Ericsson et al., Qingdao, P. R. China, Jun. 27-30, 2017, 2 pages.
R1-1711855, "Way forward on PRB indexing", 3GPP TSG-RAN WG1 Ad-Hoc #2, Intel et al., Qingdao, P.R. China, Jun. 27-30, 2017, 2 pages.
R1-1715307, "Way Forward on Bandwidth Part Operation", 3GPP TSG-RAN WG1 Meeting #90, MediaTek et al., Prague, Czech Republic, Aug. 21-25, 2017, 2 pages.
R1-1808937, "Sidelink control channel design of NR V2X II, 3GPP Draft", "Huawei et al /, 3rd Generation Partnership Project (3GPP), Mobile Competence Centre; 650, Route Des Lucioles; F-06921 Sophia-Anti Polis Cedex France; vol. RAN WGI, No. Gothenburg, Sweden;; Aug. 10, 2018 (Aug. 10, 2018), XP051516312", Aug. 20, 2018-Aug. 24, 2018, 4 pages.
R1-1810051, "Final Report of 3GPP TSG RAN WG1 #94 v1.0.0 (Gothenburg, Sweden, Aug. 20-24, 2018)", 3GPP TSG RAN WG1 Meeting #94bis, MCC Support, Chengdu, China, Oct. 8-12, 2018, 194 pages.
R1-1811209, "Support of NR Sidelink Unicast and Groupcast", 3GPP TSG RAN WG1 Meeting #94bis, InterDigital Inc., Chengdu, China, Oct. 8-12, 2018, 5 pages.
R1-1811215, "Enhancement of Uu Interface for NR Sidelink", 3GPP TSG RAN WG1 Meeting #94bis, InterDigital Inc., Chengdu, China, Oct. 8-12, 2018, 4 pages.
R1-1813227, "On Physical Layer Procedures", 3GPP TSG RAN WG1 Meeting #95, InterDigital Inc., Spokane, USA, Nov. 12-16, 2018, 5 pages.
R1-1813231, "Discussion on Uu-based Sidelink Resource Allocation and Configuration", 3GPP TSG RAN WG1 Meeting #95, InterDigital Inc., Spokane, USA, Nov. 12-16, 2018, 5 pages.
R1-1813243, "Discussion on Power Saving Techniques", 3GPP TSG RAN WG1 Meeting #95, InterDigital, Inc., Spokane, USA, Nov. 12-16, 2018, 5 pages.
R1-1900794, "Physical Layer Procedures for Nr V2X Sidelink", 3GPP TSG RAN WG1 Ad-Hoc Meeting 1901, InterDigital Inc., Taipei, Taiwan, Jan. 21-25, 2019, 10 pages.
R1-1900801, "On Uu-based Sidelink Resource Allocation and Configuration", 3GPP TSG RAN WG1 Ad-Hoc Meeting 1901, InterDigital Inc., Taipei, Taiwan, Jan. 21-25, 2019, 5 pages.
R1-1902596, "Discussion on Physical Layer Procedures for NR V2X Sidelink", 3GPP TSG RAN WG1 #96, InterDigital Inc., Athens, Greece, Feb. 25-Mar. 1, 2019, 9 pages.
R1-1902603, "Discussion On Uu-based Sidelink Resource Allocation and Configuration", 3GPP TSG RAN WG1 #96, InterDigital Inc., Athens, Greece, Feb. 15-Mar. 1, 2019, 4 pages.
R1-1902619, "On UE Power Saving Techniques", Interdigital, Inc. 3GPP TSG RAN WG1 #96, Athens, Greece, Feb. 25-Mar. 1, 2019, 9 pages.
R1-1905401, "NR Sidelink Resource Allocation for Mode 1", 3GPP TSG RAN WG1 #96bis, InterDigital Inc., Xi'an, China, Apr. 8-12, 2019, 4 pages.
R1-1905405, "On Physical Layer Procedures for NR V2X Sidelink", 3GPP TSG RAN WG1 #96bis, InterDigital Inc., Xi'an, China, Apr. 8-12, 2019, 9 pages.
R1-1907092, "On NR Sidelink Mode 1 Resource Allocation", 3GPP TSG RAN WG1 #97, InterDigital, Inc., Reno, USA, May 13-17, 2019, 4 pages.
R1-1907096, "On Physical Layer Procedures for NR V2X Sidelink", 3GPP TSG RAN WG1 #97, InterDigital, Inc., Reno, USA, 13-17, 2019, 9 pages.
R2-166856, "Control Plane Functions and transport mechanism for Interworking between NR and LTE", 3GPP TSG-RAN WG2 #95bis, InterDigital Communications, Kaohsiung, Taiwan, Oct. 10-14, 2016, 5 pages.
R2-1808674, "Mode 4 behaviour in shared resource pool 3GPP Draft", Samsung / Mode 4 Behaviour in Shared Resource Pool, 3rd Generation Partnership Project (3GPP), Mobile Competence Centre; 650, Route Des Lucioles; F-06921 Sophia-Anti Polis Cedex, France, vol. RAN No. Busan, Korea, May 21, 2018-May 25, 2018, 1 page.
Rao, et al., "Protocol Signaling Procedures in LTE", Radisys White Paper, Sep. 2011, 11 pages.
RWS-150009, "5G—key component of the Networked Society", 3GPP RAN Workshop on 5G, Ericsson, Phoenix, AZ, USA, Sep. 17-18, 2015, 55 pages.
Technical Specification, "Evolved Universal Terrestrial Radio Access (E-UTRA); User Equipment (UE) radio transmission and reception (3GPP TS 36.101 version 14.4.0 Release 14)", Third Generation Partnership Project, Jun. 2017, 27 pages.
Tripathi, et al., "LTE E-UTRAN and its Access Side Protocols", Radisys White Paper, Sep. 2011, 17 pages.
TS 22.186 V15.2.0, "Enhancement of 3GPP support for V2X scenarios", 3rd Generation Partnership Project; Technical Specification Group Services and System Aspects; Stage 1 (Release 15), Sep. 2017, 16 pages.
TS 36.213 V13.2.0, "3rd Generation Partnership Project (3GPP)", Technical Specification Group Radio Access Network, Evolved Universal Terrestrial Radio Access (E-UTRA), Physical Layer Procedures (Release 13), Jun. 2016, 383 pages.
TS 38.331 V15.6.0, "3rd Generation Partnership Project (3GPP)", Technical Specification Group Radio Access Network; NR; Radio Resource Control (RRC) protocol specification (Release 15), Jun. 2019, 519 Pages.
TS-0001, "oneM2M Functional Architecture", oneM2M-V3.7.0, Jul. 2017.
WO 2017/135020 A1, US 2018/376439 A1.
WO 2017/135312 A1, US 2019/052503 A1.
WO 2017/196042 A1, US 2020/228383 A1.
WO 2018/018417 A1, US 2019/208481 A1.
WO 2016/047513 A1, U.S. Pat. No. 10,285,146 B2.
WO 2011/132926 A2, U.S. Pat. No. 9,143,304 B2.
Third Generation Partnership Project (3GPP), "Study on Enhancement of 3GPP Support for 5G V2X Services", Release 15, Technical Specification Group Services and System Aspects; 3GPP TR 22.886 v15.1.0, Mar. 2017, 58 pages.

(56) References Cited

OTHER PUBLICATIONS

Third Generation Partnership Project (3GPP), "Final Report of 3GPP TSG RAN WG1 #94 v1.0.0, (Gothenburg, Sweden, Aug. 20-24, 2018)", MCC Support, 3GPP TSG RAN WG1 Meeting #94bis, R1-1810051, Chengdu, China, Oct. 8-12, 2018, 194 pages.

\* cited by examiner

METHODS, DEVICES, AND SYSTEMS FOR SUPPORTING HARQ ON V2X

CROSS REFERENCE TO RELATED APPLICATIONS

This application is the U.S. National Stage, under 35 U.S.C. § 371, of International Application No. PCT/US2019/052945 filed Sep. 25, 2019, which claims the benefit of U.S. Provisional Application No. 62/736,296 filed on Sep. 25, 2018, U.S. Provisional Application No. 62/736,788 filed on Sep. 26, 2018 and U.S. Provisional Application No. 62/787,991 filed on Jan. 3, 2019, the contents of each of which are hereby incorporated by reference herein.

SUMMARY

A wireless transmit/receive unit (WTRU) apparatus and method for operation thereby are provided. The method may comprise receiving, from a network, a mapping rule which indicates hybrid automatic repeat request (HARQ) feedback characteristics to employ for a quality of service (QoS) level and a channel load. The WTRU may determine a QoS level of data buffered for transmission and may further determine a channel load of a channel. Based on the QoS level and channel load, HARQ feedback characteristics may be determined. The WTRU may then transmit sidelink control information (SCI) to another WTRU which indicates the HARQ feedback characteristics. In an embodiment, the mapping rule may indicate that a HARQ feedback format is to be used for HARQ feedback of the data. The data may be transmitted and HARQ feedback of the data may be received in accordance with the HARQ feedback format. Groupcast data may be transmitted to a plurality of WTRUs and feedback may be received. In an embodiment, the WTRU may determine whether groupcast sidelink data was successfully received by a group member of a group of WTRUs, based on a feedback resource and an in-group identifier of the group member.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
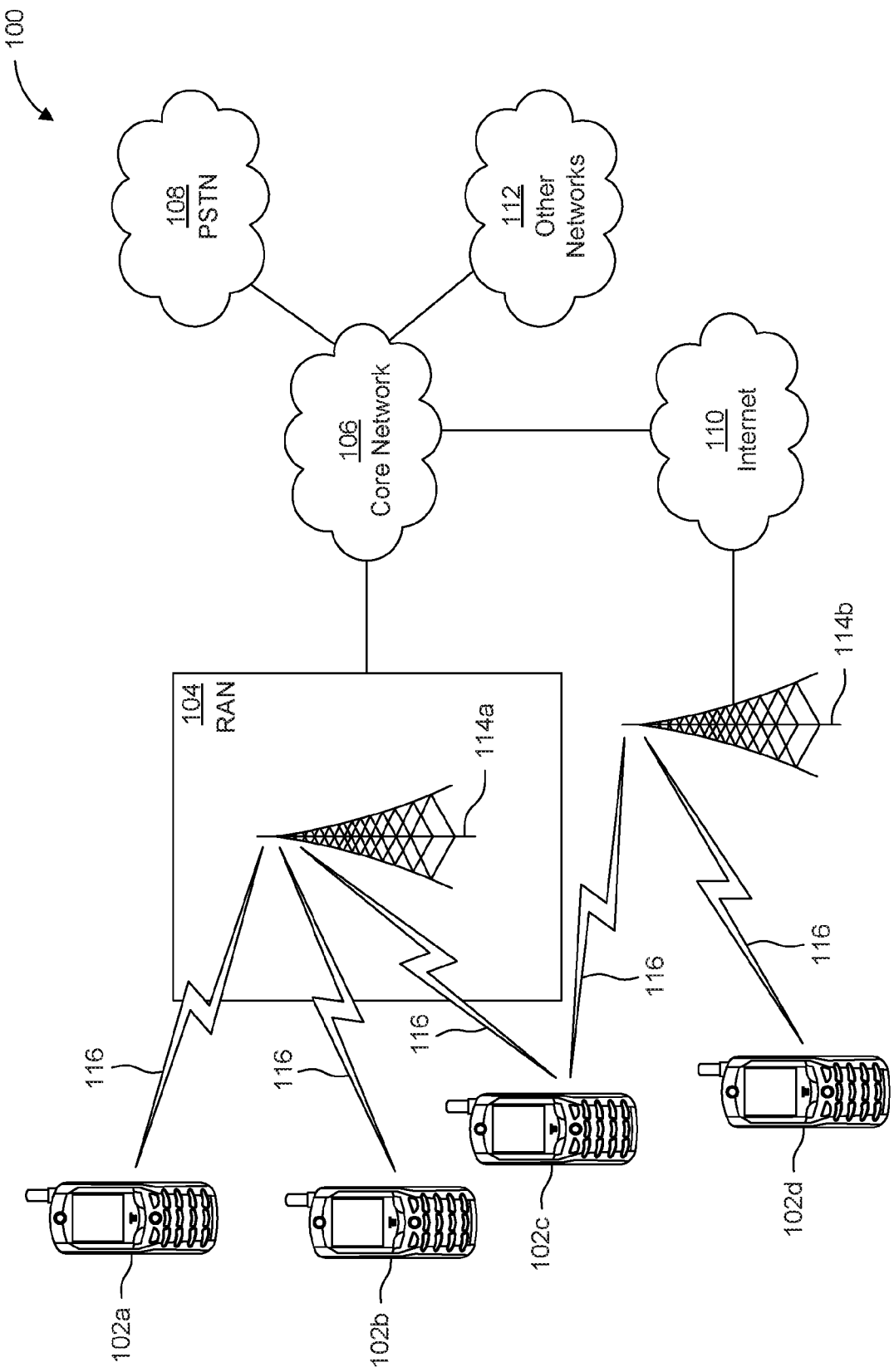
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
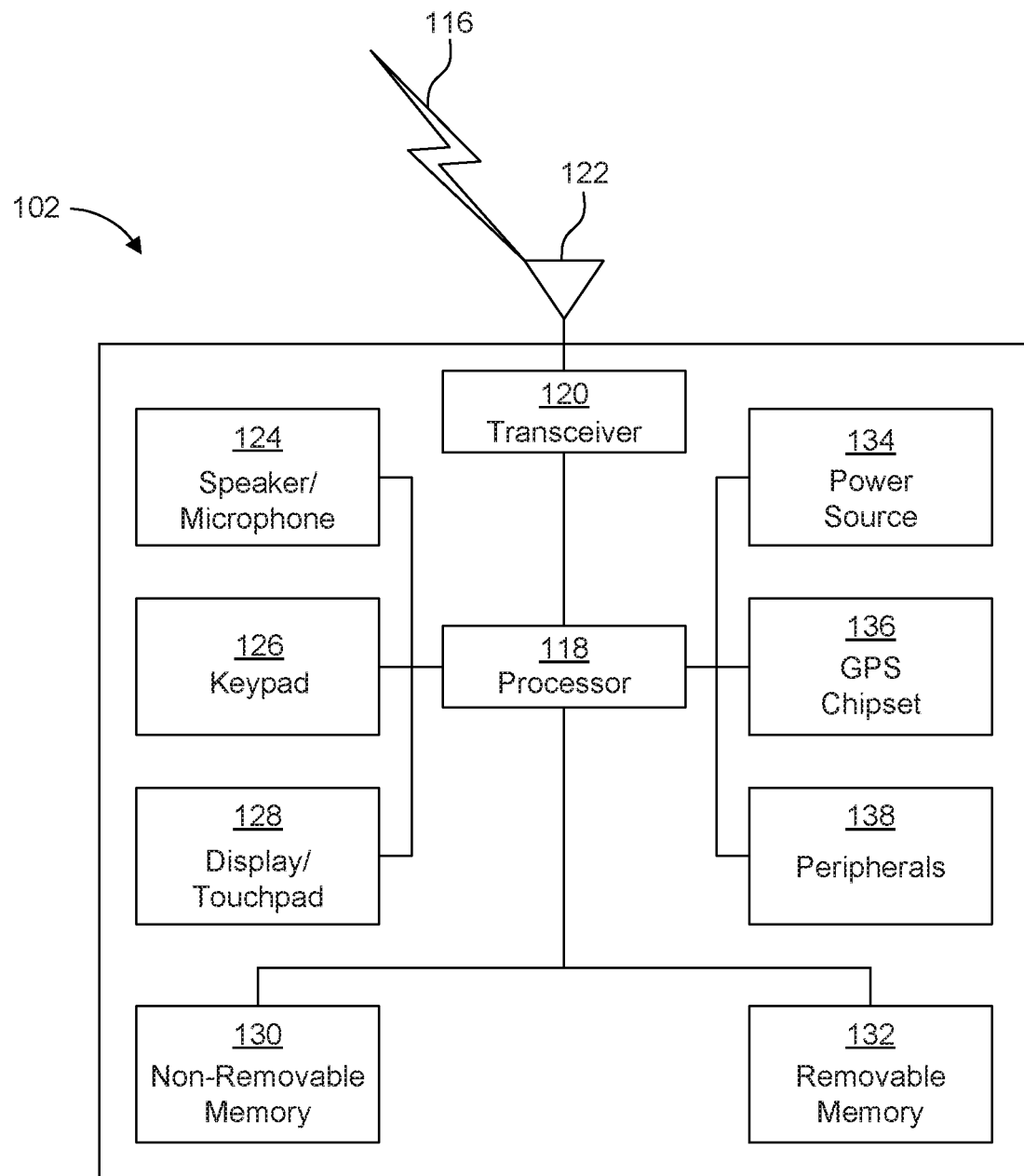
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
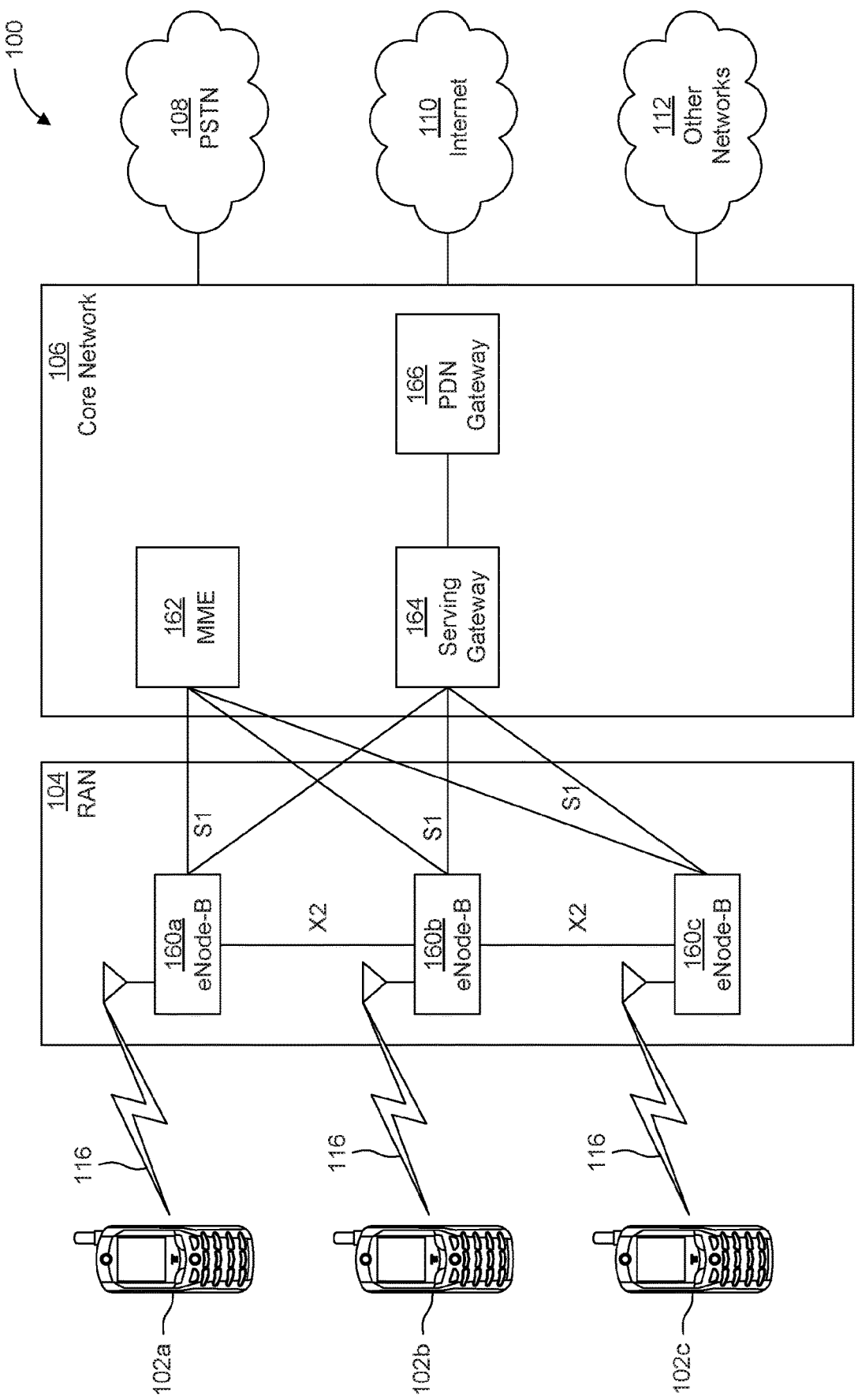
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
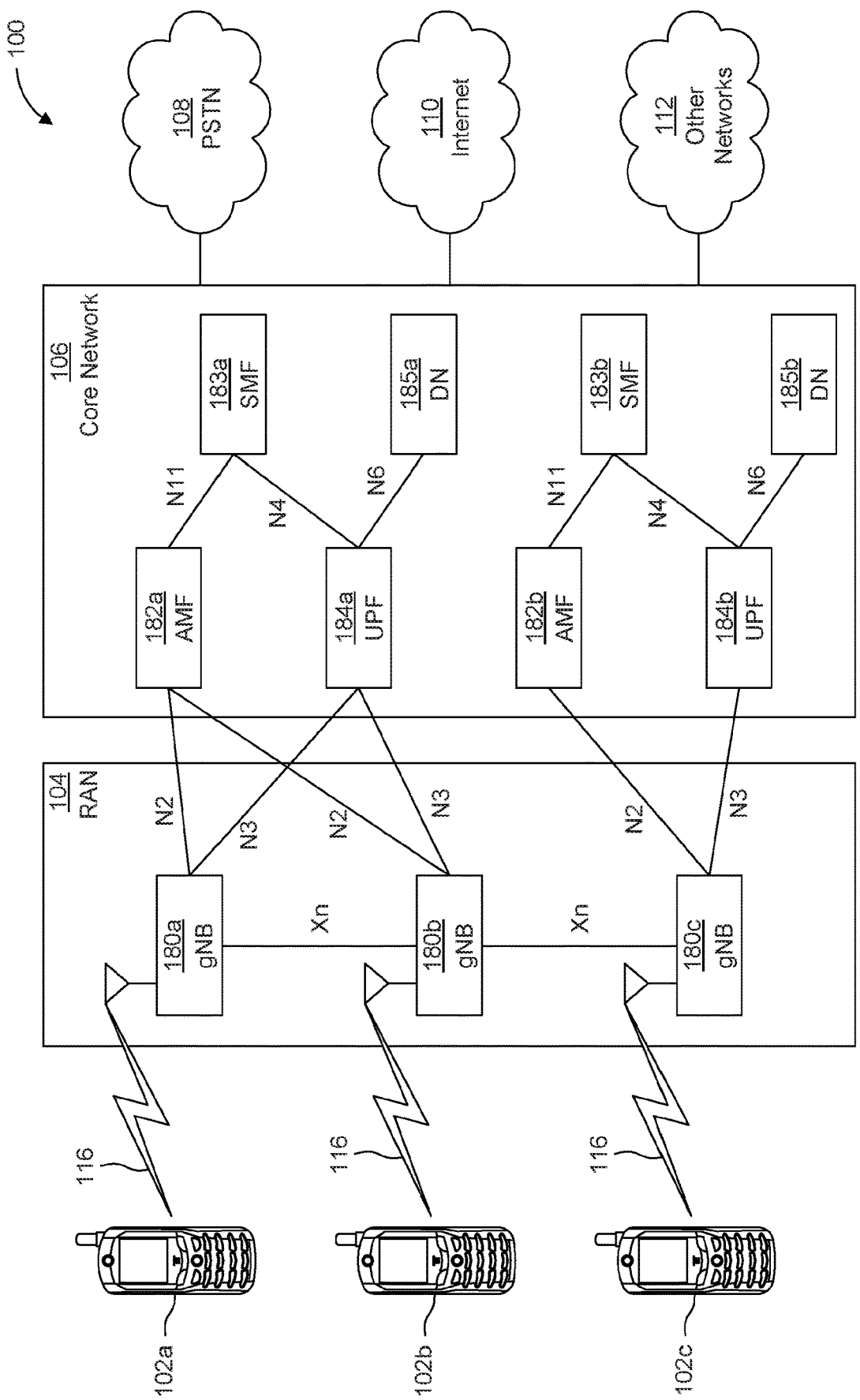
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3rd Generation Partnership Project (3GPP) access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

LTE supports vehicular communications in which V2X WTRUs may communicate with each other directly. LTE V2X was designed to support broadcast type communication. Unicast and groupcast communication are also supported by V2X, but not at the physical (PHY) layer. Instead, unicast and groupcast type communication is supported using a layer 2 (L2) destination identifier (ID). A receiving WTRU processes packets received on an RX resource pool and filters the packets based on the destination ID. For unicast, the WTRU is required to check whether its ID is on the destination ID of each one of the packets that were received. This is inefficient as the packet must be processed at the PHY and moved up the stack before the WTRU may confirm the destination ID.

Since unicast communication is not supported at the physical layer in LTE V2X, sidelink link adaptation is also not supported in LTE V2X. Further, LTE does not support a feedback channel to adapt transmission parameters, for example, a number of retransmissions, power control parameters or the like. Additionally, in LTE V2X channel state information reporting was not standardized. To increase the reliability of the transmissions, LTE V2X supports blind retransmissions, where a transport block is repeated without receiving HARQ feedback from the receiver of the transport block.

The first drop of NR Rel-15 was completed in December 2017. NR supports a number of use cases, including enhanced mobile broadband (eMBB), ultra-reliable and low latency communications (URLLC) and massive machine type communication (MMTC). 3GPP has started a study item to study support for enhanced V2X (eV2X) communications in NR. eV2X in NR is expected to support new services for both safety and non-safety scenarios. For example, eV2X is expected to support automated/remote driving, sensor sharing and vehicle platooning. Each service has different performance requirements.

NR V2X is expected to support new use cases. In particular, the following use cases are to be supported:

Vehicles platooning enables vehicles to dynamically form a group travelling together. All the vehicles in the platoon receive periodic data from the leading vehicle in order to carry on platoon operations. This information allows the distance between vehicles to become small, i.e., the gap distance translated to time may be very low (sub second). Platooning applications may allow the vehicles following to be autonomously driven. In vehicles platooning, a group of vehicles may be operated in a closely linked manner so that the vehicles move like a train with virtual strings attached between vehicles. To maintain vehicle distance, the vehicles may share status information among themselves. By using platooning, the distances between vehicles, and the number of required drivers, may be reduced. This may lower overall fuel consumption.

Advanced driving enables semi-automated or fully-automated driving. Longer inter-vehicle distance is assumed. Each vehicle and/or RSU shares data obtained from its local sensors with vehicles in proximity, thus allowing vehicles to coordinate their trajectories or maneuvers. In addition, each vehicle shares its driving intention with vehicles in proximity. The benefits of this use case group are safer traveling, collision avoidance and improved traffic efficiency.

Extended sensors enables the exchange of raw or processed data gathered through local sensors or through live video data shared among vehicles, remote sensor units (RSUs), devices of pedestrians and V2X application servers. The vehicles may enhance the perception of their environment beyond what their own sensors may detect and have a more holistic view of the local situation.

Remote driving enables a remote driver or a V2X application to operate a remote vehicle for those passengers who cannot drive themselves or for a remote vehicle located in a dangerous environment. For a case where variation is limited and routes are predictable, such as public transportation, driving based on cloud computing may be used. In addition, access to a cloud-based back-end service platform may be considered for this use case group.

The new QoS requirements for NR V2X are captured in TS 22.186. New key performance indicators (KPIs) were specified with the following parameters: payload (Bytes); transmission rate (message/sec); maximum end-to-end latency (ms); reliability (%); data rate (Mbps); and minimum required communication range (meters). These QoS characteristics may be represented with a 5G quality of service indicator (5QI) as defined in technical specification (TS) 23.501. In V2X, the 5QI is renamed V2X quality indicator (VQI) and accounts for the QoS parameters related to V2X.

For unicast cases, the PC5 QoS parameters are negotiated at the establishment of one-to-one communication procedure, so the one-to-one communication establishment procedure defined in TS 23.303 is enhanced to support PC5 QoS parameter negotiation between two WTRUs. After the PC5 QoS parameter negotiation procedure, the same QoS is used in both directions.

During the RAN1 #94 meeting, RAN1 agreed to study sidelink enhancement for unicast and/or groupcast communication for NR V2X. At least the following was agreed to be studied: HARQ feedback; CSI acquisition; open loop and closed loop power control; link adaptation; and multi-antenna transmission schemes.

Furthermore, it was agreed to support at least mode 1 where the network schedules sidelink resource(s) to be used by WTRU for sidelink transmissions and mode 2 where a WTRU determines sidelink resource(s) within sidelink resource pool(s) configured or pre-configured by the network. The two agreed modes have an impact on HARQ feedback supported for sidelink communication.

Sidelink HARQ feedback for unicast and/or groupcast communication has the potential to increase the reliability of data transmissions as well as reduce the latency as compared to the case where packet error detection is handled at higher layers, for example, the radio link control (RLC) layer. However, supporting HARQ on sidelink may come with the cost of high load on sidelink channels. For the autonomous mode, where the WTRUs autonomously select sidelink resources, supporting a feedback channel will increase the probability of collisions among WTRUs. Furthermore, the available resource for sidelink data transmission will be reduced since HARQ feedback will be transmitted on the same sidelink bandwidth.

In a network controlled resource allocation, a WTRU may need to request the sidelink resource for retransmission and feedback transmission and/or send the feedback to the network. In such a case, an overhead may be created on the Uu link. Embodiments which support sidelink HARQ feedback for both autonomous mode and network controlling mode, while reducing the load on sidelink channels may be employed.

A HARQ feedback channel format may be used by a WTRU for a transmission. In one embodiment, HARQ feedback may be transmitted with a timing relation per QoS. For example, the QoS of a data packet may indicate when HARQ feedback is transmitted. Feedback may be transmitted on one or more resource pools. For all of the embodiments disclosed herein, the timing between a WTRU's sidelink transmission, the WTRU's sidelink retransmission and/or the timing between the WTRU's sidelink transmission and HARQ feedback, whether signaled by the WTRU, or implicitly determined by the WTRU, may be derived from the QoS associated with the data transmission. Specifically, the WTRU may use the VQI, or may derive a packet delay budget (PDB) and/or priority from the VQI to determine this timing relationship. Based on such relationship, the WTRU may perform resource selection, retransmission, HARQ transmission or indication of timing as applicable in each embodiment.

HARQ feedback may be transmitted on a physical sidelink control channel (PSCCH). A WTRU may transmit HARQ feedback in sidelink control information (SCI). In one embodiment, a WTRU may use the same SCI format defined for scheduling sidelink data to transmit a HARQ feedback. With this embodiment, blind decoding effort is reduced at the WTRU receiving HARQ feedback, since a WTRU is not required to monitor multiple SCI formats potentially with different sizes. A WTRU may use an identifier to differentiate the SCI carrying scheduling information and the SCI carrying the HARQ feedback. For example, a WTRU may use one bit in the SCI to indicate the intention of SCI transmission, for example, using a 0 value for HARQ feedback and a 1 value for scheduling information. A WTRU using such SCI to carry HARQ feedback may repeat the HARQ acknowledgement (HARQ-ACK) bits to reach the configured size of the SCI. For example, if the SCI size is N bits and the WTRU is transmitting one-bit feedback, the WTRU may repeat the HARQ feedback bit N times. Alternatively, padding may be used to fill the remaining un-used bitfield. Alternatively, the WTRU may include the HARQ feedback for multiple transmissions into a single SCI in order to fill the SCI size. The WTRU receiving HARQ feedback may first check the identifier bit(s) and then decode the SCI accordingly. The SCI bitfield interpretation may thus depend on the identifier carried in the SCI.

In an embodiment, a WTRU may transmit the HARQ feedback using a new SCI format. With this embodiment, the reliability parameter of the HARQ-ACK feedback is kept separate from the SCI scheduling data. For example, a HARQ-ACK feedback could target a different block error rate (BLER) than targeted for tge SCI scheduling the data. Thus, the two signals may be transmitted using different SCI formats. The new SCI format may have fixed size or variable size depending on the HARQ feedback. In case of a variable size, a WTRU transmitting the feedback may determine the size of the SCI based on the length of the feedback size of the number of bits or symbols used. The WTRU receiving the HARQ feedback may attempt to decode the SCI assuming a SCI size based on the expected HARQ feedback size.

In an embodiment, a WTRU may transmit HARQ feedback along with scheduling information using one SCI. A WTRU may be configured with an SCI format which includes HARQ feedback information and scheduling information. A WTRU may indicate the transmission parameters of the data transmission and the HARQ feedback in the same control message. To support the case where the HARQ is not transmitted in the SCI, a bit field may be configured in the SCI to indicate the presence/absence of the feedback. For example, a WTRU may be configured with a two-way unicast link and may transmit a HARQ feedback at the same time as transmitting a packet. The WTRU may then use the SCI scheduling the packet to feed the HARQ acknowledgement of a prior received packet. In another example, a WTRU may select a resource for HARQ retransmission and transmit the scheduling information of the selected resources to the transmitting WTRU, i.e. the WTRU receiving the feedback.

HARQ feedback may be provided on a new physical channel. In some embodiments, a WTRU may be configured with a new physical channel to transmit HARQ-ACK feedback. Such channel may consist or may be comprised of a number of physical resource blocks (PRBs), a starting PRB, a number of symbols and a starting symbol within a slot. A WTRU may be (pre-)configured with multiple resources, each one may contain different number of PRBs, symbols and starting positions. A WTRU may autonomously select a transmission parameter for HARQ feedback, for example, a set of PRBs, symbols and a duration based on one or more of the following or any combination of: a number of HARQ-ACK bits; reliability of the data associated with the feedback; latency of the data associated with the feedback; communication range; measurement results; slot structure; and/or an ID which uniquely identifies the unicast/multicast link for which HARQ feedback is being transmitted and/or HARQ process within a link.

Using a number of HARQ-ACK bits, for example, a WTRU may select a number of PRBs and/or symbols depending on the HARQ codebook payload. Using the reliability of the data associated with the feedback, for example, a WTRU may be configured to transmit HARQ feedback of high reliable data with a high number of PRBs to meet a lower BLER. Using the latency of the data associated with the feedback, for example, a WTRU may transmit the feedback over a fewer number of symbols to meet the latency requirement of the data associated with the received packet.

A WTRU may be configured to perform measurements prior to selecting the HARQ resource parameters to determine the HARQ physical channel parameters. For example, a WTRU may measure a high load in the HARQ feedback resources, by measuring the channel busy ratio (CBR) and thus the WTRU may select fewer PRBs to transmit the feedback. In another example, a WTRU may select the starting OFDM symbol to avoid colliding with other transmissions.

With a slot structure, a WTRU may select the starting symbol and duration for HARQ feedback based on a slot format indication received from the network or other WTRU. An ID may also be used which uniquely identifies the unicast/multicast link for which HARQ feedback is being transmitted and/or HARQ process within a link. For example, a WTRU may select the resource(s) for HARQ feedback on a specific link based on a unique ID in order to avoid collision with other HARQ feedback of other WTRU(s). The WTRU expecting the feedback may determine the HARQ-ACK feedback resource and parameters based on the same conditions described above for the WTRU transmitting the feedback.

HARQ feedback may be based on a sequence-based signal. In some embodiments, a WTRU may be configured to transmit HARQ feedback using sequence based signals such as pseudo-random sequences. In one embodiment, a WTRU may be configured with a $2^N$ bit sequence length to carry N bits of HARQ feedback. In another embodiment, a WTRU may be configured with a $2^N$ bit sequence length to carry N1 bits of HARQ feedback such that N is greater than N1 and a repetition of HARQ-ACK bits may be used by the WTRU to ensure a higher reliability of the feedback.

In some embodiments, a WTRU may be configured to generate a specific sequence for HARQ feedback, for example, based on one or a combination of geographical distance between the transmitter and the receiver WTRUs, group ID within a groupcast communication (in-group ID), and/or measurement results.

If the WTRU generates a specific sequence for HARQ feedback based on geographical distance between the transmitter and the receiver WTRUs, i.e., between the WTRU expecting the feedback and the WTRU transmitting the feedback, the WTRU may, for example, be configured with a mapping table or function between the distance and sequence and/or offset to generate the HARQ feedback. For example, the WTRU may be configured with a set of sequences $\{S_1, S_2, \ldots, S_N\}$ having a length of M. The WTRU may select a sequence depending on the distance between the transmitter and the receiver. As an example, a WTRU may be configured with a mapping table which provides a mapping between distance and sequence as shown in Table 1. A WTRU may be configured with 3 sequences, each sequence corresponding to a distance threshold. In another example, as shown in Table 2, a WTRU may be configured with one sequence of length M and may apply an offset $N_i$ to the sequence based on the distance from the transmitter. Alternatively, a WTRU may select a sequence from a set of sequences and may apply different offsets to the selected sequence for different distances. Distance may be measured in terms of signal timing or signal power, for example, a timing advance or transmission power level. Distance may also be a measure of actual distance in terms of location, position and the like.

If the WTRU generates a specific sequence for HARQ feedback based on a group ID used within or for a groupcast communication, the WTRU may, for example, be configured with a mapping rule between group ID, sequence and/or offset and may select the sequence and/or offset based on a group ID or other ID.

If the WTRU generates a specific sequence for HARQ feedback based on measurement results, the WTRU may, for example, be configured with a set of sequences and may select a sequence from the set of sequences based on the measurement results, such as CBR results. For example, the WTRU may be configured with an association between a CBR threshold, a threshold for a different measurement, a sequence and/or an offset.

TABLE 1

Mapping rule configuration between distance and sequence

| Distance | Sequence |
|---|---|
| $d \leq d_1$ | $S_1$ |
| $d_1 < d \leq d_2$ | $S_2$ |
| $d_2 < d$ | $S_3$ |

TABLE 2

Mapping rule configuration between distance and offset

| Distance | Offset |
|---|---|
| $d \leq d_1$ | $N_1$ |
| $d_1 < d \leq d_2$ | $N_2$ |
| $d_2 < d$ | $N_3$ |

In some embodiments, a WTRU may be configured to determine and/or estimate the distance based on one or a combination of power level of the SCI, power level of reference signals within sidelink control and/or data transmission, geographic location indication, position reference signal and/or sidelink synchronization signals received by the transmitter.

If the WTRU is configured to determine and/or estimate the distance based on a power level of the SCI, in some examples, the WTRU may be configured with a transmit power of the SCI, and based on the received power of the SCI, the WTRU may determine the path loss and the distance between the transmitter and the receiver.

If the WTRU is configured to determine and/or estimate the distance based on a geographic location indication, in some examples, the WTRU may receive an indication from the transmitter about its geographic zone/location, for example, by an explicit indication in the SCI, or implicitly using a resource pool, for example, the WTRU may determine the geographic location based on the resources used by the transmitter.

HARQ feedback may be transmitted on a physical sidelink shared channel (PSSCH). In some embodiments, a WTRU may transmit sidelink HARQ feedback on sidelink data channel. A WTRU may autonomously determine the number of resource elements to be used from the resources selected for data transmission. For example, rate matching or puncturing parameters may be autonomously determined by the WTRU transmitting the feedback. A WTRU may determine the number of resource elements based on one or more of the following: the reliability requirement of the HARQ feedback; the reliability requirement of the data to be multiplexed with the HARQ feedback; and/or the latency associated with the feedback channel. For example, a WTRU may select a first symbol from data transmission resources in a front loaded HARQ feedback method. In one embodiment, a WTRU may be configured from the network with a number of resource elements to be used from the sidelink data channel.

A WTRU transmitting the feedback may indicate, using a bit field in the SCI, whether HARQ feedback is piggybacked on the data channel. A WTRU receiving the feedback may then determine the number of resource element(s) based on the conditions mentioned above.

HARQ feedback may be transmitted on a physical uplink control channel (PUCCH) or physical uplink shared channel (PUSCH). In some embodiments, the following examples may apply for both a WTRU generating HARQ-ACK, i.e., receiving a transport block, or for a WTRU receiving the HARQ-ACK, i.e., the WTRU transmitting the transport block.

In some embodiments, a WTRU may be configured to transmit the HARQ feedback of a sidelink transmission to the network. A WTRU operating in Mode 1, where the network schedules the resource to the WTRU, may be configured to transmit the sidelink feedback to the gNB. For example, a WTRU may be configured with a PUCCH resource to transmit HARQ feedback for a given unicast communication. Mode 1 WTRUs using sidelink unicast links may be known to the network. In such a case, the network may relay the HARQ feedback of the sidelink communication to the destination WTRU. The destination WTRU may receive from the network an explicit HARQ feedback using a downlink control message, for example, using an explicit bit field in the DCI scheduling a sidelink grant, or alternatively the WTRU may receive an implicit indication. Such implicit indication may include: a WTRU receiving a sidelink grant from the network indicating a new transmission or a retransmission for the HARQ process which the network is expecting the feedback, or that no sidelink grant for retransmission was received by a WTRU, for example.

A WTRU may be configured, for example, using radio resource control (RRC) signaling, with a PUCCH resource set to transmit the HARQ-ACK(s) of one or multiple sidelink transport block(s). In some embodiments, a WTRU, after receiving a DCI from the gNB which schedules a sidelink resource for data and/or sidelink control, determines the PUCCH resource as, or based on the PUCCH resource set on which the sidelink feedback should be relayed to the network. It is noted that the PUCCH resource set may be configured by the network; e.g., using RRC or a system information block (SIB). The DCI may carry an explicit indication, for example, one or more bits and/or a field of the PUCCH resource within the PUCCH resource set. Alternatively, the DCI may implicitly indicate the PUCCH resource. For example, the timing indication of a PUCCH transmission may implicitly indicate the PUCCH resource. In some examples, each PUCCH resource within the PUCCH resource set may be associated with timing offset. The timing offset may be in units of slot, symbol or group of symbols.

In some embodiments, a WTRU may be configured to autonomously select the PUCCH resource from the PUCCH resource set. It is noted that the PUCCH resource set may be configured by the network; for example, using RRC signaling or a SIB. A WTRU may select a PUCCH resource depending on one or a combination of a QoS characteristic of the transport block, a reference signal received power (RSRP) measured from the serving cell, and/or the timing between the reception of the sidelink grant and sidelink HARQ feedback reception from a sidelink WTRU.

In an example based on The QoS characteristic of the transport block, for packets with short PDB, a WTRU may select a PUCCH format having a short duration, for example, a PUCCH with a duration of 2 symbols. For packets with high reliability requirements, a WTRU may select a PUCCH format which is more reliable, for example, the WTRU may select a PUCCH with a longer duration. The QoS characteristic may include at least priority, reliability, latency and/or required communication range. In an example based on the RSRP measured from the serving cell, a WTRU with high RSRP may select a short PUCCH format.

In some embodiments, a WTRU may be configured to transmit the HARQ feedback only for NACK states. In such cases, a WTRU may select a PUCCH resource based on the number of NACK(s) to be reported for sidelink transport block(s). For example, a V2X WTRU may be configured with multiple unicast sessions with a HARQ protocol enabled in more than one unicast session. After receiving sidelink feedback from other sidelink WTRUs which includes a number of NACKs, for example, M1 NACKs, a WTRU may select the PUCCH resource based on the number of received NACKS reaching a threshold, for example, M1 NACKs to be reported for sidelink transport blocks. It is noted that if no NACKs are received, M1=0 in this example.

In some embodiments, a WTRU may apply a combination of autonomous resource selection and dynamic indication from the network to select the PUCCH resource.

In one example embodiment, a WTRU receiving a grant for a sidelink transmission and one or more retransmissions may determine whether it needs to perform retransmission in the grant associated with the retransmission(s) based on the occurrence of a subsequent grant for resources in the same time slot as the retransmission or lack thereof. Specifically, if a WTRU receives a DCI for sidelink resources that occur in the same time slot as the retransmission resources, the WTRU may assume an ACK for the initial transmission and use the new grant for transmission of new data. If the WTRU does not receive a grant for a resource in the same time slot as a retransmission, the WTRU assumes NACK for the initial transmission and uses the granted retransmission resource to transmit the retransmission.

A HARQ feedback resource format determination may be made based on one or more factors. A WTRU may be configured to autonomously determine the channel format for HARQ feedback, including whether on sidelink data channels or sidelink control channels or the SCI format. A WTRU may determine the HARQ channel format and/or SCI format based on one or more of the following. A WTRU may determine the HARQ channel format and or SCI format based on reliability of the HARQ feedback. For example, a WTRU may be indicated from the transmitter WTRU on the target BLER of the feedback. Such indication may be explicitly carried in a bitfield of the SCI or may be implicitly determined form: a resource pool used to transmit the sidelink control and/or sidelink data. For example, a resource pool may be associated with a given BLER target; bandwidth part used for transmitting the sidelink control and/or sidelink data; SCI format used to carry scheduling information of the data to be acknowledged; modulation and coding scheme (MCS) table and/or MCS index used for the data to be acknowledged; unicast link characteristics, for example, two WTRUs when establishing a radio bearer, set up a reliability parameter associated with link. If a WTRU is transmitting data to a WTRU that is expecting the HARQ feedback at the time of HARQ-ACK transmission, for example, the WTRU may transmit sidelink HARQ feedback on the PSSCH.

Using measurement results, for example, a WTRU may be configured to perform measurements to select a resource for an SCI transmission and may then determine that there is a high load on the sidelink control channel. The WTRU may then decide to combine the HARQ feedback and the SCI scheduling data in the same message. The HARQ feedback timing or channel determination may be a function of the feedback reliability. For example, a WTRU may select the new HARQ channel format with fewer symbols instead of transmitting the feedback with data due to long duration of data transmission. Further, a WTRU may determine the HARQ channel format and/or SCI format based on HARQ codebook size, for example, a WTRU may select the SCI format based on the number of HARQ-ACK bits to be transmitted; via an indication from another WTRU, for example, a WTRU acting as a local manager or a WTRU which is expecting the feedback; and/or geolocation information, for example, a WTRU may be configured to use specific HARQ format within a specific location.

Table 3 illustrates an example mapping between reliability, channel load and HARQ feedback channel format. In an example, when reliability of a data transmission is considered low, no feedback may be used regardless of the channel load. When a data transmission is determined to be of medium reliability, a HARQ format 0 may be used only in the case of low channel load. When a data transmission is determined to need high reliability, HARQ format 1 may be used when the channel load is low, HARQ format 2 may be used when the channel load is medium and HARQ format 3 may be used when the channel load is high.

TABLE 3

Feedback format selection based on reliability and channel load

|  | Low Channel Load | Medium Channel Load | High Channel Load |
|---|---|---|---|
| Low Reliability | No feedback | No feedback | No feedback |
| Medium Reliability | HARQ format 0 | No feedback | No feedback |
| High Reliability | HARQ format 1 | HARQ format 2 | HARQ format 3 |

Figure 2:
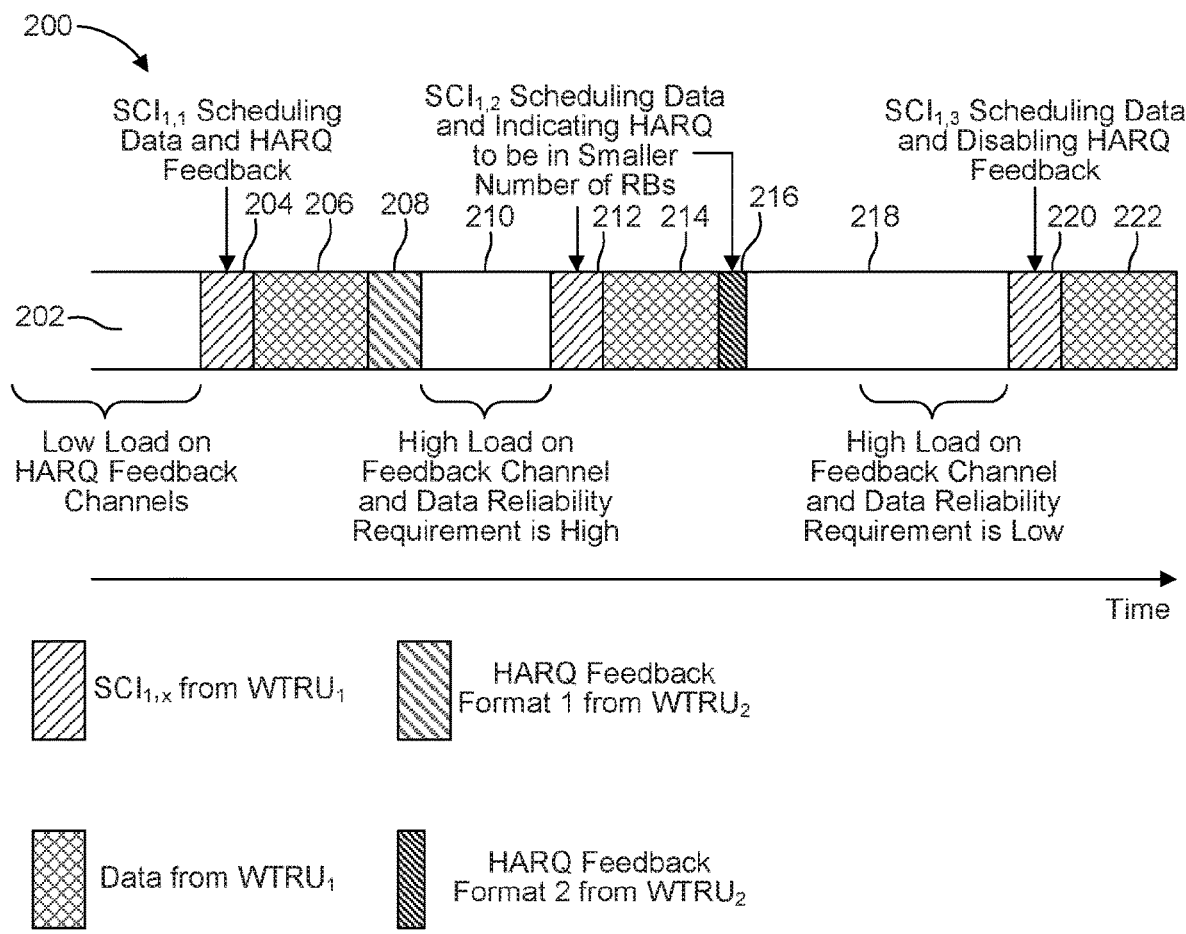
FIG. 2 is a timing diagram illustrating example hybrid automatic repeat request (HARQ) feedback determination methods.

FIG. 2 is a timing diagram 200 illustrating example HARQ feedback determination methods. In the example shown in FIG. 2, the WTRU may determine that one or more HARQ feedback channels have low load at time instance 202. Because of the low load on the HARQ feedback channels, the WTRU may transmit an SCI 204 which indicates the low load. Subsequently the WTRU may transmit data 206 and receive HARQ feedback 208 from another WTRU. Due to the load experienced, the HARQ feedback may be in a first format which spans a longer time period than a second format.

At time instance 210, the WTRU may measure a high load on the feedback channel. In the example shown, the data reliability requirement may be high and thus the WTRU may choose to use a shorter HARQ feedback format accordingly. Thus, the WTRU transmits an SCI 212 indicating that a shorter HARQ feedback format should be used. Data is transmitted 214 by the WTRU and HARQ feedback is received 216 subsequently in the shorter HARQ feedback format. In an embodiment, the shorter HARQ feedback format may be one format which is shorter than another format. In an embodiment, the shorter HARQ feedback format may be the shortest format available. A short HARQ feedback format may be defined by a number of resource units employed by the format.

At time instance 218, the WTRU may measure a high load on the feedback channel while determining that a data reliability requirement is low. In this case, the WTRU may determine to avoid HARQ feedback altogether and may indicate that in a transmitted SCI 220. A data transmission 222 may follow and the WTRU may receive no HARQ feedback. In this example, the communicating WTRUs may revert to using HARQ feedback again after a time period or after a feedback channel is measured subsequently. While FIG. 2 illustrates two HARQ feedback formats, other formats or numbers of formats may be employed as may be necessary.

Figure 3:
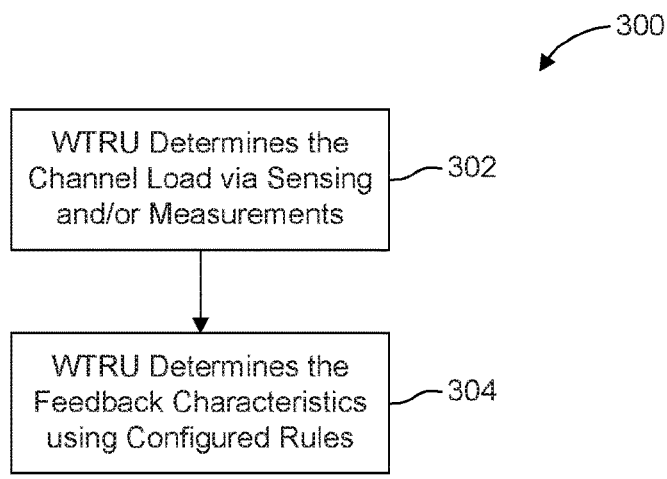
FIG. 3 is a flow diagram illustrating a method performed by a transmitting WTRU.

FIG. 3 is a flow diagram 300 illustrating a method performed by a transmitting WTRU. The WTRU may determine 302 the channel load via sensing or performing other measurements. In an embodiment, the WTRU may sense a fixed or variable number of symbols of a slot to determine a CBR. The WTRU may then determine 304 feedback characteristics, for example, characteristics of a buffered packet, using rules which may be configured by the network. Rules may be configured via RRC or other signaling methods.

HARQ feedback may be provided for groupcast type communication. A WTRU may be configured to transmit HARQ-ACK feedback while operating in a groupcast mode. A WTRU may be communicating with a group of WTRUs on sidelink. Each one of the WTRUs may be transmitting and/or receiving groupcast data. Instead of sending HARQ feedback for each groupcast packet on different channel(s), a WTRU may combine HARQ feedback in one HARQ codebook and transmit the HARQ codebook on a single channel. In order for a WTRU belonging to a group to determine its HARQ-ACK feedback within the HARQ codebook, different HARQ process IDs may be assigned to different WTRUs in an embodiment. In an example scenario, N WTRUs are communicating in a groupcast mode and using M HARQ processes. Each WTRU may be configured to use [M/N] HARQ processes. In one example embodiment, a WTRU may determine its set of HARQ processes based on its ID within the group. For example, WTRUs within the group are identified with ID i, i ∈ {1, . . , N}. A WTRU with an ID i may use the HARQ processes $$IDs\ k + (i-1)\left\lfloor \frac{M}{N} \right\rfloor,$$

$$k \in \left\{ 0, \dots, \left\lfloor \frac{M}{N} \right\rfloor - 1 \right\}.$$

In another example, a WTRU within the group or the network may allocate the HARQ processes IDs to other WTRUs within a group.

A WTRU may be configured to aggregate groupcast HARQ-ACK feedback based on one or more of the following triggers: HARQ-ACK timing of the groupcast packets are the same; a measurement result, for example, a WTRU may measure the CBR on feedback channel and determine that there is a high load on the HARQ feedback channels, and consequently use this method in that case; an indication from groupcast manager WTRU; and/or an indication from the network.

A HARQ-ACK codebook may be used for unicast transmission. In one embodiment, a WTRU may be configured to combine sidelink HARQ-ACK feedback for multiple transport blocks into one HARQ-ACK codebook. A WTRU may determine when to combine the feedback based on one or more of the following: HARQ-ACK timing of different transport blocks are the same, for example, a WTRU may combine two HARQ-ACK feedbacks if they have to be transmitted on the same slot; a priority requirement of the HARQ-ACK feedback of different transport block are the same, for example, a WTRU may combine feedback for two or more transport blocks if the feedback targets a same BLER; and a latency requirement.

Figure 4:
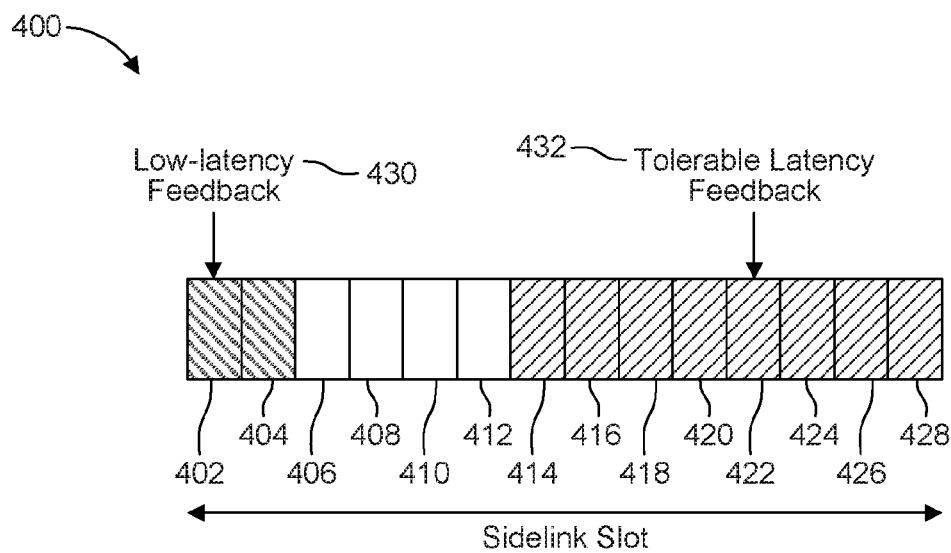
FIG. 4 is a diagram of a sidelink slot illustrating separation of two sidelink HARQ acknowledgement (HARQ-ACK) feedback transmissions.

FIG. 4 is a diagram of a sidelink slot 400 in which feedback is transmitted. As shown in FIG. 4, the slot 400 spans 14 symbols 402-428. The WTRU may determine to transmit low-latency feedback 430 in a first symbol 402 and second symbol 404 of the slot 400. Alternatively, other symbols may be selected, for example, a second symbol 404 and third symbol 406. Following the low-latency feedback, other control information or data, which may or may not include feedback information, may be transmitted in a fixed or variable number of symbols, for example, symbols 406-412. Tolerable latency feedback 432, for example, feedback which is not as urgent as the low-latency feedback 430, may be transmitted at or near the end of the sidelink slot 400, for example, in symbols 414-428. Alternatively, other symbols may be selected. Other slot configurations may differ in size.

Using a latency requirement or threshold, for example, a WTRU may not combine two HARQ-ACK feedbacks even if they have to be transmitted on the same slot due to different latency requirements. A WTRU may then transmit the low latency feedback 402 on fewer symbols at the beginning of the slot, and transmit the second feedback 404 on longer duration as shown in FIG. 4.

A transmitting WTRU or receiving WTRU may perform resource selection/allocation of the feedback and retransmissions. In some embodiments, a WTRU transmitting the HARQ feedback may be configured to select one or more HARQ feedback resources. In one embodiment, a WTRU transmitting the feedback may select the HARQ resource(s) from a set of resources known by the WTRU that is expecting to receive the feedback. For example, a HARQ sidelink resource set may be associated with sidelink data transmission. Such association may be (pre)configured from the network or indicated by the WTRU transmitting the data. On the receiver side, a WTRU may blindly decode all the HARQ resources within the resource set. A WTRU transmitting feedback may include its ID in the HARQ feedback to allow the receiving WTRU to determine the resource used for HARQ feedback. For example, a WTRU may scramble a cyclic redundancy check (CRC) attached to the HARQ codebook with its ID or destination WTRU ID. Alternatively, a WTRU transmitting the feedback may indicate the selected resource explicitly to the WTRU monitoring for the HARQ feedback.

In another embodiment, a WTRU expecting to receive the HARQ feedback may be configured to select the HARQ feedback resource and transmit a resource indication to the WTRU that will be transmitting the feedback. Such indication may be transmitted along with SCI indicating data resource transmission and/or implicitly derived from the time and/or frequency location of the data resource. In this embodiment, a WTRU may further reserve the resource by sending a control signal indicating the transmission time, frequency, channel or the like of HARQ feedback. Other sidelink WTRUs may avoid selecting the reserved resource at the indicated time. In such embodiment, a transmitting WTRU performing resource selection may attempt to ensure an availability of the resources for data transmission and for HARQ feedback via a resource selection mechanism. In one example, the transmitting WTRU selecting resources for the HARQ feedback may select from one of a subset of time/frequency resources for the HARQ transmission. The subset of resources may be implicitly associated with the timing of the data transmission, while the actual resource to be used for the HARQ feedback may be explicitly indicated in the SCI, for example using an index, bitmap or the like.

In some embodiments, a WTRU may receive a resource assignment for HARQ transmission from another WTRU. For example, a local manager WTRU may be configured to assign a HARQ feedback channel and/or resources for other WTRUs. In another example, platoon leader WTRU may assign HARQ feedback for platoon members WTRUs. In one example embodiment, a WTRU may be configured to request a HARQ feedback resource from another WTRU. Such request may be transmitted using a special SCI format designed for this purpose. The assigned HARQ feedback resources may be configured to the WTRU in semi-persistent manner or may dynamically change.

A WTRU selecting the HARQ feedback resource, either the transmitting WTRU, the receiving WTRU or another WTRU, may reserve the HARQ resource for the expected duration of a unicast transmission. In an embodiment, the WTRU selecting the HARQ feedback resource may be a local manager or platoon manager. The resource selected may be used for subsequent HARQ-ACK feedback transmitted during the unicast session. Alternatively, the WTRU may be configured to dynamically (re)select a resource upon one or more feedback transmissions. A WTRU may (re)select the resource based on one or more of the following triggers and conditions: collision detection, interference detection, feedback reliability, feedback priority, timer expiration; indications received from a network or other WTRU, geolocation information, channel state information or other information.

In cases where a WTRU may (re)select a resource based on collision detection, for example, a WTRU may determine that one or more other WTRU(s) is or are using the resource based on SCI sensing, for example, by receiving an SCI which indicates the same resource. In such case, a WTRU may compare its expected feedback priority or the priority of the data to be acknowledged with the reliability of the colliding feedback. In some embodiment, the WTRU may determine to override the other transmission when the feedback to be transmitted is of higher priority.

In cases where a WTRU may (re)select the resource based on interference detection, example, a WTRU may select the HARQ feedback resource if the energy sensed on the time-frequency resource of the feedback is detected at or above a configured threshold.

In cases where a WTRU may (re)select the resource based on feedback reliability, for example, a WTRU may select a HARQ feedback resource and keep using it for subsequent HARQ-ACK feedback transmissions if the reliability requirement of the subsequent HARQ feedback is lower than the reliability of the HARQ feedback transmitted at first. A WTRU may be configured to reselect the HARQ feedback resource if the BLER requirements of feedback or data associated with the feedback is lower than the BLER for which the resource was selected. In another example, a WTRU may be configured with multiple resource pools for HARQ-ACK transmission, each resource pool may be associated with a BLER target or a set of BLER targets.

In cases where a WTRU may (re)select the resource based on feedback priority, for example, a WTRU may be configured with a mapping rule between a HARQ process ID and a priority of the feedback. A WTRU may determine the priority of the HARQ feedback using the HARQ process ID.

In cases where a WTRU may (re)select the resource based upon an expiration of a timer, for example, a WTRU may be configured to reselect the HARQ resource periodically using the timer. The WTRU may start a timer when a feedback resource is first selected. Upon expiry of the timer, the resource may be reselected.

In some cases a WTRU may (re)select the resource based on an indication from the network to reselect the HARQ feedback resource. In cases where a WTRU may (re)select the resource based on an indication from another WTRU, for example, the WTRU may include a local manager or platoon leader to reselect the HARQ feedback resource.

In cases where a WTRU may (re)select the resource based on geolocation information changing, for example, a WTRU may be configured with multiple resource pools, each one corresponding to a geolocation area. A WTRU may (re)select the resource for HARQ feedback if the WTRU moves to a geographic different location.

In cases where a WTRU may (re)select the resource based on a channel state of the data transmission of previous transmission(s), for example, a WTRU may reselect the HARQ feedback if the signal to noise ratio (SNR) or signal to interference plus noise ratio (SINR) of the data transmission is below a threshold, assuming a channel reciprocity.

A HARQ feedback resource assignment may be made by the network and provided to a WTRU transmitting feedback. In some embodiments, a WTRU transmitting the feedback may receive a resource assignment for HARQ transmission from the network. A WTRU may be configured to request a sidelink HARQ feedback transmission resource from the network. In one example embodiment, a WTRU may transmit a sidelink HARQ request using a scheduling request (SR) signal. For example, a WTRU may be configured with an SR PUCCH resource for a sidelink HARQ resource request. A WTRU may be configured with a multiple bit SR to indicate the number of HARQ-ACK bits needed for sidelink transmission. Alternatively, a WTRU may be configured with multiple SR PUCCH configurations, each one to request different number of sidelink HARQ bits. In an example embodiment, a WTRU may transmit the sidelink HARQ resource request using a buffer status report (BSR). For example, a WTRU may be configured to use a given logical channel group ID for sidelink HARQ feedback request and the BSR size associated with that logical channel group (LCG) ID reflect the number of bits needed for HARQ transmission. A WTRU may be configured with multiple LCGs, each one associated with a sidelink HARQ reliability.

A HARQ feedback resource assignment may be made by the network and provided to a WTRU receiving feedback. In another embodiment, a WTRU expecting to receive feedback may receive a resource assignment for HARQ transmission from the network and may subsequently transmit the resource indication to the WTRU that will be transmitting the feedback. A WTRU may transmit the request along with sidelink data resource request. For example, a WTRU may be configured to map logical channel IDs requiring HARQ feedback to certain logical channel group ID(s). The WTRU may further indicate to the network the HARQ QoS characteristics, for example, reliability and latency using a same MAC Control Element (MAC CE) or the network may assume the same QoS characteristics as those indicated or included in the BSR. A WTRU may implicitly request a sidelink HARQ resource by indicating the type of communication, for example, unicast, multi-cast or groupcast.

In another embodiment, the data transmitting WTRU, i.e. the WTRU expecting to receive HARQ feedback, may receive multiple semi-persistent scheduling (SPS) configurations for a unicast link. Each configuration may include one or more resources for HARQ feedback. The data receiving WTRU, i.e. the WTRU transmitting the feedback, may obtain the SPS configurations via the transmitting WTRU or via the network directly. In the case where the transmitting WTRU conveys the SPS configurations to the receive WTRU, such a message may be sent during a unicast establishment stage. This approach may be motivated to avoid frequently sending HARQ feedback information between the data transmitting and receiving WTRUs.

In an embodiment, a WTRU may be configured to determine a HARQ-ACK feedback transmission timing. A WTRU may indicate the timing as an offset from the first transmission of the HARQ process ID or as an offset from the time in which an SCI is transmitted or received. Alternatively, a WTRU may indicate a time window in which HARQ may be transmitted. A WTRU may be (pre-)configured with one or more sets of allowable HARQ timing configuration(s) and may determine, based on one or more of the following, the applicable timing: QoS characteristics of the packet, transport block size, transmission time of the first/previous transmission, subcarrier spacing, channel structure of sidelink data, indication from the network, and/or timing configuration of the transmission of the PUCCH resource scheduled by the network to relay the sidelink feedback to the network.

For example, regarding QoS characteristics of the packet, a WTRU may be configured to determine the HARQ timing of a transport block based on the VQI parameter of the TB packet. The QoS characteristics may include, for example, at least packet delay budget (PDB) and reliability. Regarding transmission time of the first/previous transmission, for example, a WTRU may receive from its higher layers a packet with a required PDB.

Figure 5:
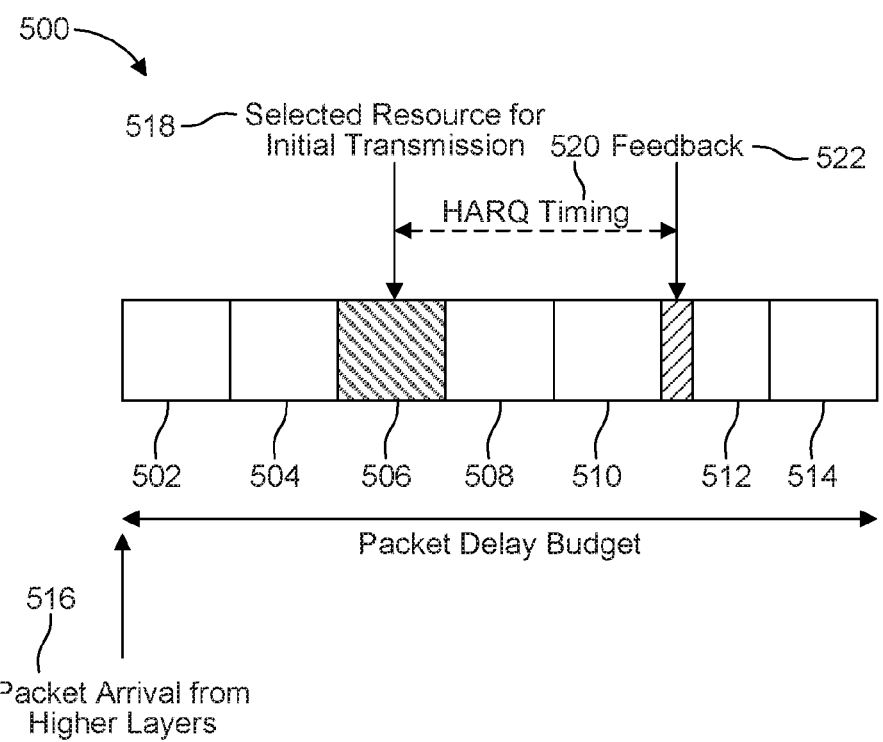
FIG. 5 is a timing diagram illustrating an exemplary HARQ timing determination made based on a transmission time of a first transmission.

FIG. 5 is a transmission timing diagram 500 which illustrates a transmission timing over a plurality of slots 502-514. When a WTRU receives 516 a packet having a PDB, the WTRU may perform measurements and may select 518 a sidelink resource, for example, slot 506, for an initial transmission. In an embodiment, the resource selected may be a resource which follows the measurements by 2 slots, i.e. following slots 502, 504. To meet the required PDB for this packet, a WTRU may determine the HARQ timing 520 accordingly. In this embodiment, HARQ timing 520 is an offset from the initial selected resource 518. The WTRU may then transmit feedback 522 in accordance with the determined HARQ timing 520. HARQ timing 520 may span slots 508, 510 and the feedback transmission may begin at or near the first symbol of slot 512.

Regarding an indication from the network, for example, a WTRU operating in network controlled mode may receive a sidelink grant for an initial transmission and any potential retransmission(s). A WTRU may determine the HARQ timing based on the time difference between the first transmission and the retransmission(s).

Regarding a timing configuration of the transmission of the PUCCH resource scheduled by the network to relay the sidelink feedback to the network, for example, a WTRU may receive a sidelink grant along with a PUCCH resource to carry the sidelink HARQ feedback. A WTRU may thereafter indicate the sidelink HARQ feedback timing to the receiving WTRU in such way that the sidelink feedback will be received prior to the PUCCH transmission.

In one example embodiment, a WTRU that is expecting to receive sidelink feedback may determine the HARQ timing and transmit an indication to the WTRU that it will be transmitting the feedback. For example, in a network controlled mode, the timing indication may be configured from the network and the WTRU receiving the sidelink grant may transmit the indication to the WTRU to transmit the HARQ feedback. In another embodiment, a WTRU may autonomously determine the feedback timing and transmit the HARQ at the determined time.

A WTRU may be configured to autonomously select a resource for HARQ retransmission(s). In one embodiment, a WTRU receiving the data, i.e. a WTRU that is transmitting HARQ-ACK feedback of the data, may determine the resource for retransmission and indicate it to the transmitter of the data. A WTRU may select the retransmission resource based on one or more of the following: measurement results; channel state; and/or whether the WTRU detects a higher priority transmission colliding with the resource used for initial/previous transmissions.

For example, a WTRU may determine that the resource used for a first or previous transmission is used by other WTRUs. Alternatively, a WTRU may indicate to other WTRUs that the resource is being used by the transmitting WTRU. This approach may mitigate the hidden node problem. For example, a WTRU may determine that the channel condition experienced in the first or previous transmission(s) is not adequate with the transmission parameters. In one embodiment, a WTRU may determine whether it detects a higher priority transmission colliding with the resource used for the initial or previous transmissions. A WTRU may then determine the transmission parameters for one or more subsequent transmission(s). The transmission parameters may include one or more of the following: modulation and coding scheme (MCS); PRB allocation; power control parameters and redundancy version (RV).

In one embodiment, the WTRU may use the same transmission parameters used for an initial transmission for any HARQ retransmission(s). Alternatively, the WTRU may change the transmission parameters of the HARQ retransmission(s) to guarantee the QoS requirement of the packet. In one example, if the priority of the initial transmission is high, the WTRU may change the MCS, increase the resource size and/or increase the transmit power. This approach may be motivated to guarantee that the high priority packet may reach the destination on time. In another example, the WTRU may reduce the reliability and/or priority of the HARQ retransmission(s) as compared to the initial transmission. This approach may be motivated to support the packet prioritization scenario, where the WTRU may deprioritize a retransmission if it has the same priority with an initial transmission.

In another embodiment, a WTRU transmitting data, i.e. a WTRU expecting to receive feedback of the data reception, may select the resource for retransmission and indicate it to the receiving WTRU. A WTRU may reserve the resource for transmission and retransmission(s) at the same time. Depending on the HARQ state, the reserved resources may be used for retransmission or for a new transmission. For example, the data may be successfully decoded the packet at the first transmission and the reserved resource may be used for a new transmission either by the transmitting WTRU or the receiving WTRU.

In another embodiment, a WTRU may receive the sidelink resources for retransmission(s) along with one or more resources for an initial transmission from the network. A WTRU may be configured to request the resource and indicate a need for retransmission(s) resources. Alternatively, a WTRU may indicate to the network the QoS characteristics associated with sidelink data to be transmitted and the network may determine if a retransmission is needed or not.

A WTRU may receive the sidelink resource for retransmission from another WTRU, for example, a local manager or platoon leader. A WTRU may be configured to send a sidelink resource request for one or more retransmission(s) to another WTRU. A WTRU may send a QoS parameter along with the sidelink resource request. The local manager WTRU may assign the resource based on the QoS characteristics. For example, a local manager WTRU may receive a scheduling request and a VQI associated with a transmission. Based on the VQI, a local manager may assign one or more resources, a HARQ feedback format and transmission parameters. The transmission parameters may include one or more of the following: MCS; PRB allocation; power control parameters; and/or RV.

HARQ retransmissions may be made for groupcast communication. In the case of groupcast communication, a WTRU may be configured to determine whether or not to perform HARQ retransmission(s) based on the HARQ feedback status received from one or more WTRUs which are members of the groupcast link and the QoS requirement of the packet. For example, if the priority of the packet is high, the WTRU may perform a HARQ retransmission if it receives at least one HARQ NACK. Alternatively, if the priority of the packet is low, the WTRU may perform HARQ retransmission if it receives at least X HARQ NACKs. The value of X may depend on the priority of the packet and the number of WTRUs in the groupcast. For example, if there are a small number of WTRUs in the groupcast, there may be less need for HARQ retransmission as compared to a very large number of WTRUs, assuming the HARQ retransmission is also groupcast.

HARQ process management may be performed by a receiving WTRU or the transmitting WTRU, i.e. the WTRU transmitting HARQ ACK/NACK feedback or the WTRU receiving the HARQ ACK/NACK feedback.

HARQ feedback may be enabled and disabled by either the transmitting WTRU or the receiving WTRU. In some embodiments, a WTRU may be configured to manage the HARQ protocol. In first embodiment, a WTRU may be configured to enable/disable HARQ feedback transmission. For example, a WTRU may send an indication to the receiving WTRU that the HARQ protocol is not supported for an entire unicast session. In another example, a WTRU may send an indication to the receiving WTRU to not send feedback for a given HARQ process ID. Such indication may be transmitted by the WTRU explicitly using a bit field in the SCI or implicitly using one of the following indicators:

One or more HARQ process ID(s) may be reserved for HARQ-less transmissions. For example, the ID 0 may be used for all transmissions which does not require HARQ feedback. The receiving WTRU may flush the buffer after receiving the decoding the TB. Another indicator includes a QoS requirement of the unicast link. Another indicator includes a transmission resource used for initial transmission. For example, a transmitting WTRU may be configured with a set of resource pool(s) and a sub-set of the resource pool(s) may be used for HARQ-less transmission. The receiving WTRU may determine whether HARQ-ACK is needed based on the resource pool used for initial transmission. A WTRU may be provided with a HARQ feedback timing indication. For example, a WTRU may be configured to determine the number of retransmissions for a given HARQ process and whether a HARQ feedback is needed or not based on measurement results and QoS characteristics. For example, a WTRU may detect a high load on the feedback channel if the CBR is above a configurable threshold on the feedback channel and the WTRU may determine to postpone the HARQ retransmissions for a preconfigured period. In another example, a WTRU may determine to drop retransmissions if the CBR is above the threshold. In another example, a WTRU may be configured with multiple thresholds each threshold corresponding to a specific action, for example, to: drop the retransmission, reduce the number of retransmission or postpone the retransmissions. For example, a WTRU may determine the number of retransmissions based on the reliability of the packet.

In embodiments, a WTRU may be configured to autonomously manage the HARQ soft buffer. A WTRU may flush a HARQ process from its buffer if it reaches a configured number of retransmissions. In such case, the WTRU may send an indication to the receiving WTRU, i.e. the WTRU sending the HARQ-ACK feedback, using, for example, a bit field in the SCI for a given HARQ process.

In some embodiments, a WTRU may be configured to flush from its buffer some HARQ processes even before reaching the maximum number of allowed retransmissions. For example, a WTRU may be operating at its maximum buffer size and a high priority packet arriving from higher layers need to be transmitted. A WTRU may be configured to flush HARQ processes IDs having a lower priority packet. In such case, a WTRU may be preconfigured with mapping rule to associate a high priority data to a set of HARQ processes. For example, a WTRU may be configured to map high priority data to lower HARQ IDs.

In other embodiments, a WTRU may be configured to flush a HARQ process from its buffer after receiving an indication from the network. Such indication may be sent using a DCI format scheduling a sidelink transmission resource. For example, a WTRU may receive from the network a sidelink resource assignment per HARQ process ID. The gNB may use a new data indicator (NDI) bit to indicate whether the HARQ process to be flushed or not.

In some embodiments, a WTRU may be configured to implicitly indicate the HARQ status of given HARQ process. In one example embodiment, a WTRU may be configured to assume a NACK if the HARQ feedback is not received within a pre-configured time. Alternatively, a WTRU may assume an ACK if the feedback is not received in preconfigured time. In another embodiment, a WTRU may be configured to determine whether a transport block was correctly decoded based on channel quality information (CQI) reporting. For example, two WTRUs communicating in a unicast mode may be configured to send a CQI reporting to each other. The WTRU transmitting the HARQ feedback may drop the HARQ feedback and transmit the CQI report if the CSI resource configuration associated with the CQI report is quasi-collocated with the data resource used for the data transmissions. A WTRU expecting the feedback may thus determine that implicit feedback was sent if it receives a CQI reporting.

Figure 6:
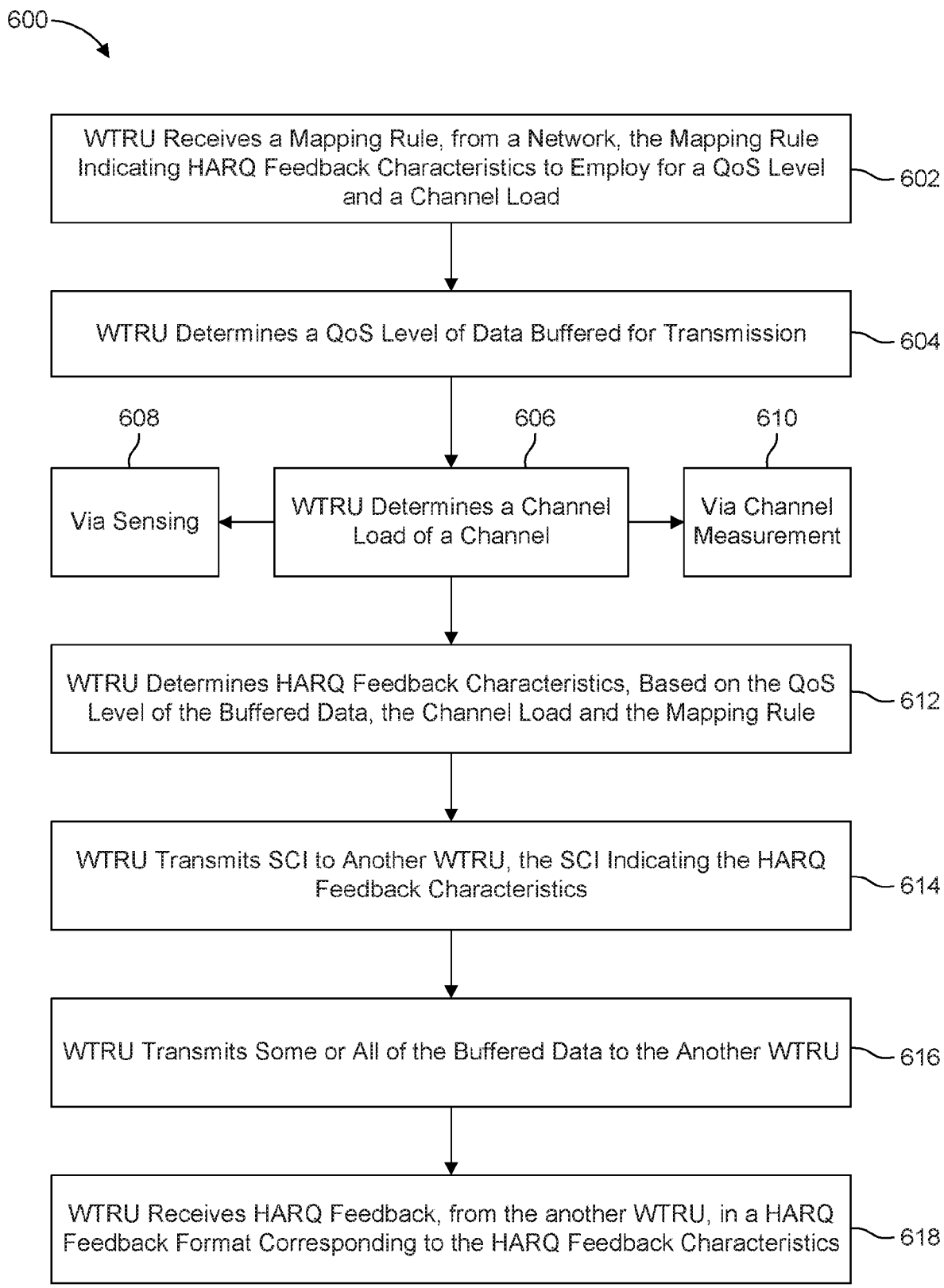
FIG. 6 is a flow diagram illustrating sidelink control information (SCI) transmission, data transmission and HARQ feedback reception for sidelink communication.

FIG. 6 is a flow diagram 600 illustrating SCI transmission, data transmission and HARQ feedback reception for sidelink communication. In an embodiment, a WTRU may receive 602, from a network, a mapping rule indicating HARQ feedback characteristics to employ for given a QoS level and channel load. The WTRU may determine 604 a QoS level of data buffered for transmission. The WTRU may also determine 606 a channel load of a channel. This determination may be performed via sensing 608 or via channel measurement 610. Based on the QoS level of the buffered data, the channel load and the mapping rule, the WTRU may determine 612 HARQ feedback characteristics. The WTRU may transmit 614 an SCI indicating the HARQ feedback characteristics, to another WTRU. The WTRU may then transmit 616 some or all of the buffered data to the another WTRU on resources indicated by the SCI. Feedback of the data transmission may be received 618, from the another WTRU, in a HARQ feedback format corresponding to the HARQ feedback characteristics.

V2X has been discussed in the context of a variety of wireless technologies, including, for example, 5G, long term evolution (LTE) and new radio (NR). For example, the vehicle blockage scenario has been examined for 5G V2X. Vehicle blockage may result in a reduction in signal strength, especially for high carrier frequency (e.g., above 6 GHz). To mitigate the reduction in signal strength, vehicle blockage may be treated as a separate state in addition to the line-of-sight state and non-line-of-sight states.

In LTE V2X, a vehicle may be in a transmission mode 3 or a transmission mode 4. A mode 3 user or vehicle may directly use resources allocated by a base station for sidelink communication among vehicles or between, for example, a vehicle and a pedestrian. A mode 4 user may obtain a list of candidate resources allocated by a base station and may select a resource from among the candidate resources for the sidelink communication. In NR V2X, a mode 1 user may be similar to the mode 3 user of LTE V2X, and the mode 2 user may include the mode 4 user in NR V2X. As used herein, the terms user and wireless transmit/receive unit (WTRU) may be used interchangeably and may refer to either a vehicle or a user of a vehicle.

In LTE, downlink control information (DCI) format 5A and several sidelink control information (SCI) format 1 fields may be used to schedule the physical sidelink shared channel (PSSCH). The payload of DCI format 5A includes carrier indicator bits (e.g., 3 bits), lowest index of the sub-channel allocation to the initial transmission bits (e.g., $\lceil \log_2(N_{subchannel}^{SL}) \rceil$ bits), SCI format 1 fields, including frequency resource location of initial transmission and retransmission and time gap between initial transmission and retransmission, and an sidelink index (e.g., 2 bits) that may only be present for cases with time division duplex (TDD) operation with uplink-downlink configuration 0-6.

When the format 5A cyclic redundancy check (CRC) is scrambled with a sidelink SPS V2X radio network temporary identifier (SL-SPS-V-RNTI), the following fields may be present: a sidelink SPS configuration index (e.g., 3 bits) and an activation/release indication (e.g., 1 bit).

If the number of information bits in a format 5A mapped onto a given search space is less than the payload size of format 0 mapped onto the same search space, zeros may be appended to format 5A until the payload size equals that of format 0 including any padding bits appended to format 0. Further, if the format 5A CRC is scrambled by SL-V-RNTI and the number of information bits in format 5A mapped onto a given search space is less than the payload size of format 5A with CRC scrambled by SL-SPS-V-RNTI mapped onto the same search space, and format 0 is not defined on the same search space, zeros may be appended to format 5A until the payload size equals that of a format 5A with a CRC scrambled by SL-SPS-V-RNTI.

In LTE, SCI format 1 may be used for scheduling PSSCH. The payload of SCI format 1 may include: priority bits (for example, 3 bits), resource reservation bits (for example, 4 bits), frequency resource location of initial transmission and retransmission —$\lceil \log_2(N_{subchannel}^{SL}(N_{subchannel}^{SL}1)/2) \rceil$ time gap between initial transmission and retransmission (for example, 4 bits), modulation and coding scheme (for example, 5 bits), and retransmission index (for example, 1 bit). Reserved information bits may be added until the size of SCI format 1 is equal to 32 bits. The reserved bits may be set to zero.

In LTE, resource selection for a mode 4 WTRU may include determining the transmission window between $[n+T_1, n+T_2]$ by selecting proper $T_1$ and $T_2$ values based on latency requirements. A candidate resource may be denoted by $R_{x,y}$, and the set of candidate resources may be denoted by S. The set of candidate resources may be determined by sensing a received signal strength indicator (RSSI). The total number of candidate resources is $M_{total}$. The set $S_A$ may be determined from S based on the RSRP level of candidate resources. Specifically, if a candidate resource in S has an RSRP level above a certain threshold, then it is saved to $S_A$. A resource $R_{x,y}$ may be removed from the candidate resource set $S_A$ if it conflicts with its own transmissions or reserved resources of other WTRUs (e.g., mode 3 reserved resources). If the number of remaining candidate resources in $S_A$ is no more than $0.2*M_{total}$ then the set $S_A$ may be determined again based on the RSRP level of candidate resources with a smaller threshold. Otherwise, the set $S_A$ of resources may be ranked based on received signal strength indication (RSSI) values averaged over the past several slots. The first $0.2*M_{total}$ ranked resources (e.g., $S_B$) may be reported to higher layers for the final resource selection.

In LTE V2X, sidelink may be broadcast, and, therefore, no feedback may be needed. In NR V2X, the sidelink may, however, be unicast or groupcast, and, therefore, feedback is needed, for example, to achieve more reliable transmissions and/or achieve higher spectral efficiency for a given channel condition. The feedback may include, for example, HARQ-ACK information, CQI, and multiple-input multiple-output (MIMO)-related parameters (e.g., pre-coding matrix indicator (PMI) and/or rank indicator (RI)). Embodiments described herein may define the resource and/or resource pool for transmitting such required feedback information, provide a corresponding acquisition scheme, provide for the content of the feedback, and provide procedures for the feedback channel. For groupcast sidelink, a sharing mechanism for feedback resources among all group members is also described.

For NR unicast or groupcast sidelink, the HARQ-ACK or CSI feedback may be needed to ensure reliable transmissions or retransmissions. The feedback information may include HARQ-ACK, CSI, or other information. The resources for feedback may have various relationships with the resources for control and/or data transmissions. Here, the control information may refer to SCI transmitted on the physical sidelink control channel (PSCCH).

One option for the feedback resources may to use an exceptional resource pool. In LTE V2X, an exceptional resource pool was designed for sidelink data transmissions in certain special conditions, for example, when T310 or T311 is running. For NR V2X, the exceptional resource pool may be used to transmit feedback.

Another option for the feedback resources may be to use a new resource pool. This feedback resource pool may be associated with a resource pool for data transmissions or may be associated with a set of resource pools for data transmissions.

Figure 7:
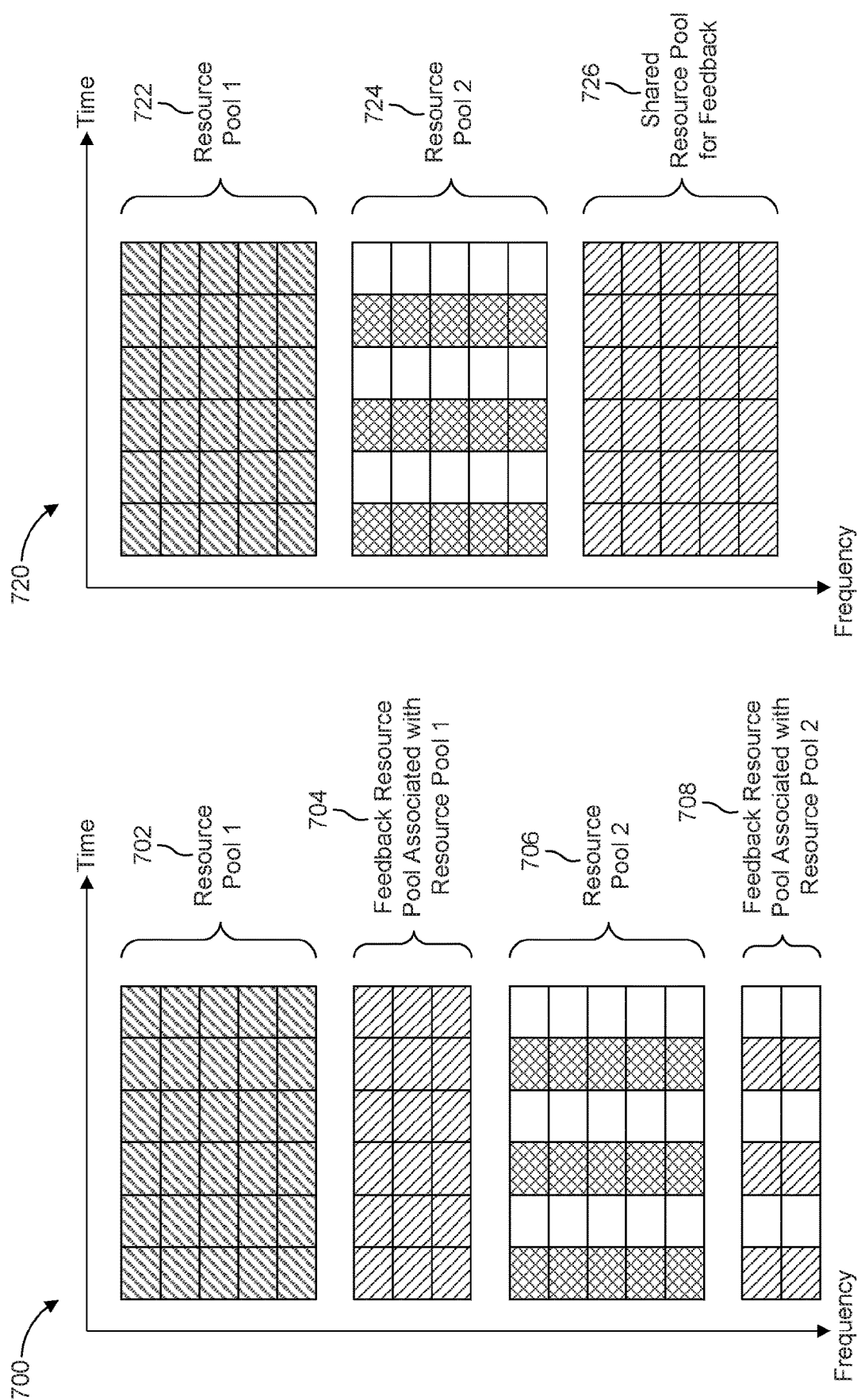
FIG. 7 is a diagram of example dedicated and shared resource pools for feedback.

FIG. 7 is a diagram of example dedicated and shared resource pools for feedback. The left hand side 700 of FIG. 7 shows an example in which a resource pool, resource pool 1 702 used for scheduling assignment (SA) and data, has an associated and dedicated feedback resource pool 704. Also shown is another resource pool, resource pool 2 706, used for SA and data resources, which has an associated and dedicated feedback resource pool 708. The association relationship between a resource pool and a feedback resource pool may be defined in one or more resource pool configurations. The right side 720 of FIG. 7 shows another example in which resource pool 1 722 and resource pool 2 724 share a common feedback resource pool 726.

Separating the feedback resource pool from the resource pool for data transmissions may allow for an optimal design of the feedback resource pool, which may fit the contents and procedures of the feedback information. However, this may require the WTRU to have the capability to dynamically switch between different pools.

Each resource in the feedback resource pool may have a different size in terms of both frequency domain and time domain than the resources in the pool for data transmissions. A single resource size fitting the format of feedback information, for example, HARQ-ACK bits, may be applied. For example, the NR physical uplink control channel (PUCCH) format for one or two HARQ-ACK bits may be applied.

A subset of NR PUCCH formats may be reused for sidelink unicast and another subset of NR PUCCH formats may be reused for sidelink groupcast. The selection of NR PUCCH format(s) for sidelink may depend on data quality of service (QoS) requirements, including latency, reliability and priority. For example, for data having low latency requirements, the NR PUCCH formats 0 or 2 may be reused, as they occupy 1 to 2 orthogonal frequency-divisional multiplexing (OFDM) symbols, and resource selection for them may be easily achieved. For data having high reliability requirements and relaxed latency requirements, the NR PUCCH formats 1 or 3 may be reused. An example of HARQ feedback format selection criteria is illustrated by Table 3.

Another option for the feedback resources may be for the resource pool for feedback to be a separate region in the resource pool for data transmissions. Each feedback resource in this separate resource pool region may or may not be associated with a resource for data transmissions. For example, if the resource for data transmissions is selected as time t and starting sub-channel n, then the corresponding feedback resource in the resource pool region for feedback may be at time $t+t_{offset}$ and the starting sub-channel may be at $n+n_{offset}$. Here, the values of $t_{offset}$ and $n_{offset}$ may be fixed or configured, or the values may be indicated in the SCI for the initial data transmissions. Here, each sub-channel of a feedback resource may be smaller in terms of subcarrier number than that of an SA or data resource.

Figure 8:
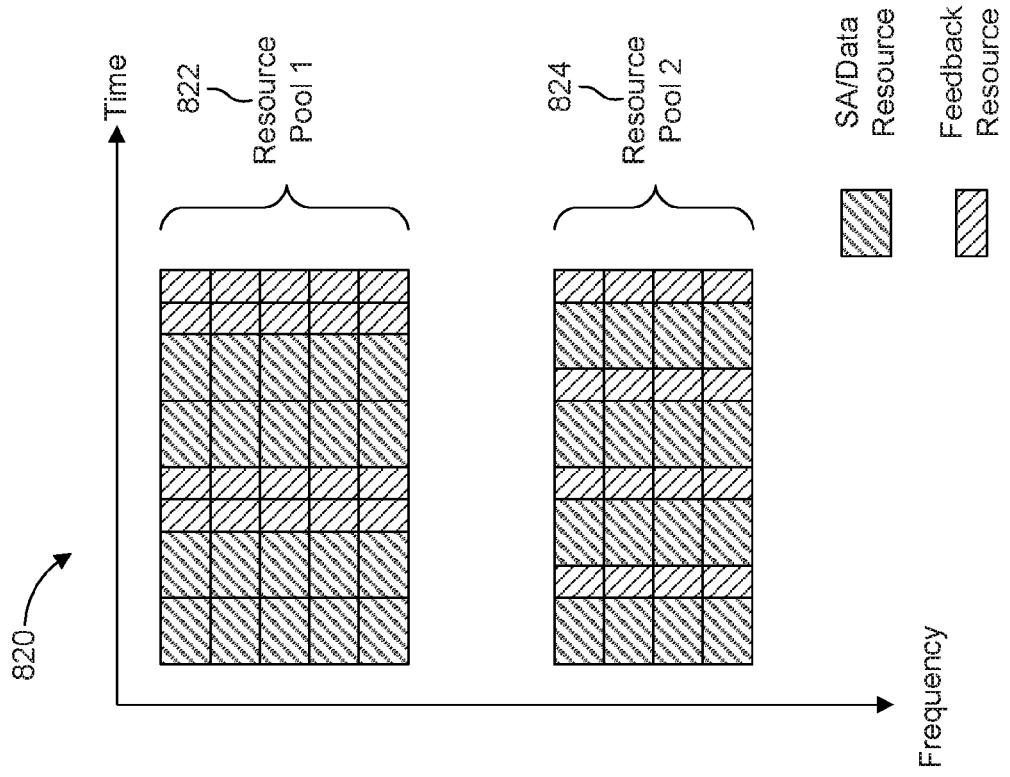
FIG. 8 is a diagram of example feedback resources where the resources are either frequency division multiplexing (FDM) or time division multiplexing (TDM) multiplexed with scheduling assignment (SA) or data resources.
Figure 8:
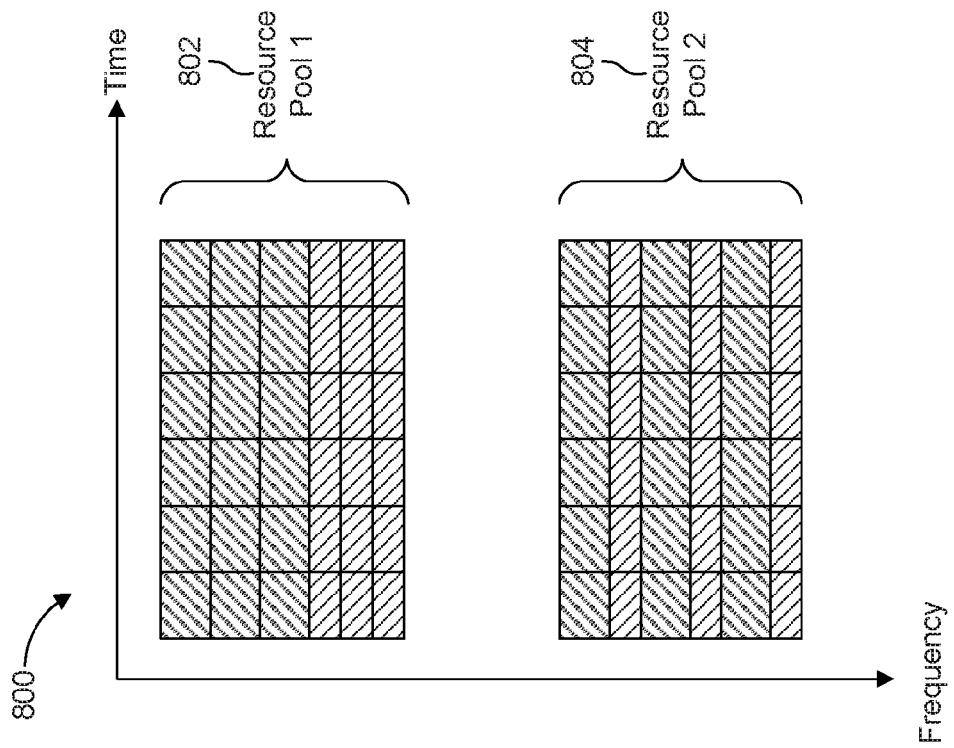

FIG. 8 is a diagram of example feedback resources where the resources are either FDM or TDM multiplexed with SA or data resources. In FIG. 8, the examples on the left hand side 800 show resource pool 1 802 and resource pool 2 804 having a certain feedback region, where feedback resources are FDM multiplexed with SA or data resources. In the top figure 802 on the left hand side 800, all feedback resources may be concentrated in a certain frequency domain region. In the bottom figure 804 on the left hand side 800, each feedback resource may be adjacent to an SA or data resource in the frequency domain. In this case, the SA or data resource and feedback resource may be considered as a hybrid resource. The examples on the right hand side 820 of FIG. 8 show examples where a resource pool (e.g., resource pool 1 822 and resource pool 2 824) has a certain feedback region where feedback resources are TDM multiplexed with SA or data resources. In the time domain, every single (resource pool 2 824) or multiple (resource pool 1 822) SA or data resource may be contiguously allocated before single or multiple feedback resources.

Since the feedback resource region may only be used for unicast or groupcast, and not for broadcast, the number of feedback resources may be less than the number of SA or data resources.

Figure 9A:
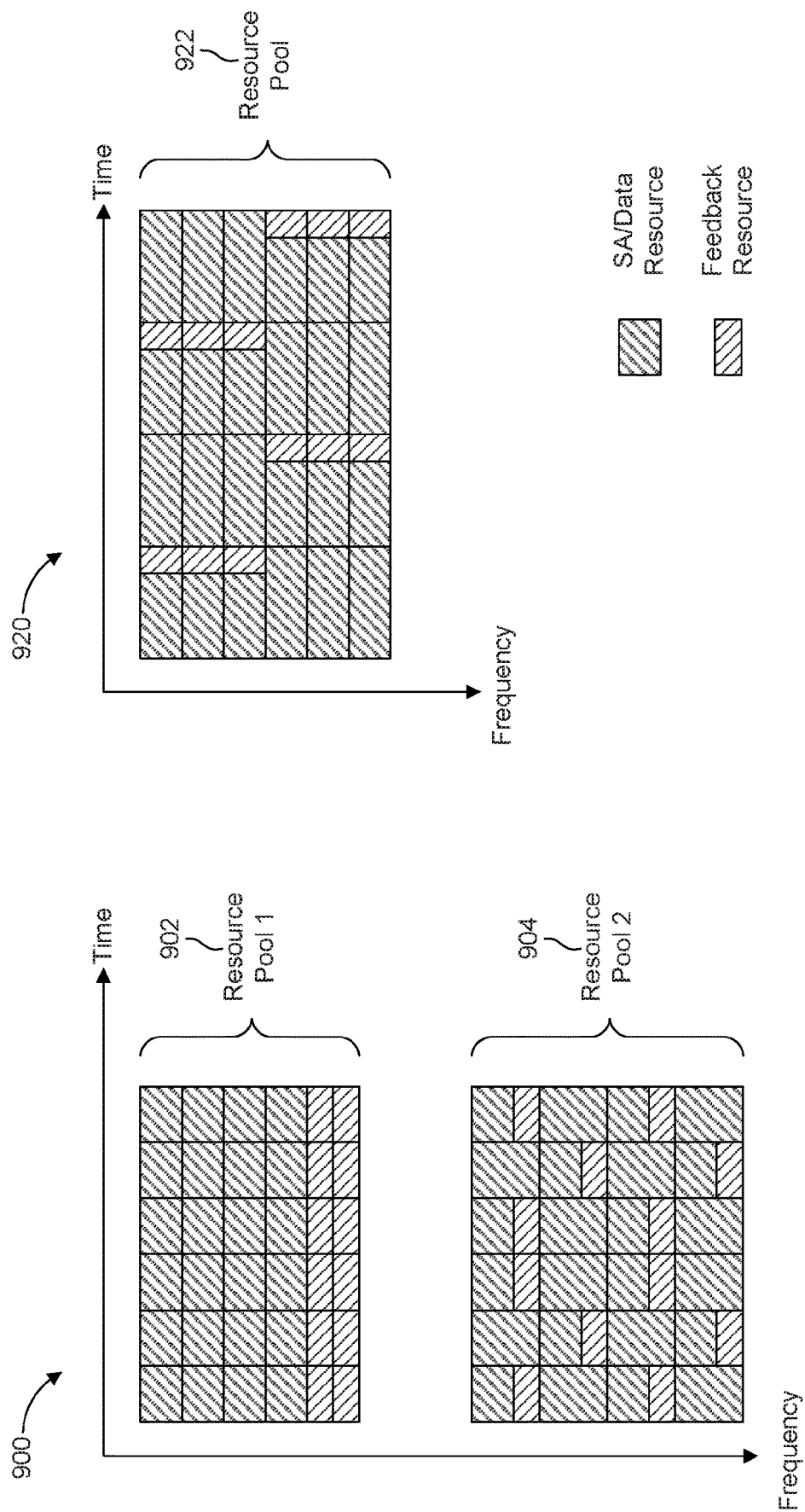
FIG. 9A is a diagram of example feedback resources where the resources are either FDM or TDM multiplexed with SA or data resources.

FIG. 9A is a diagram of example feedback resources where the resources are either FDM or TDM multiplexed with SA or data resources. In the examples shown, fewer feedback resources are used than SA or data resources. On the left hand side 900 of FIG. 9A, resource pool 1 902 and resource pool 2 904 illustrate FDM multiplexed feedback resources. As can be seen from resource pool 1, all feedback resources are configured to occupy frequencies which are different than resources used for data. In resource pool 2 904, feedback resources are interspersed or interleaved in frequency with data resources. Resource pool 2 904 also has a TDM multiplexing component, i.e. the feedback resources vary over time. Referring to the resource pool 922 on the right hand side 920 of FIG. 9A, feedback resources are both TDM and FDM multiplexed with data resources.

Figure 9B:
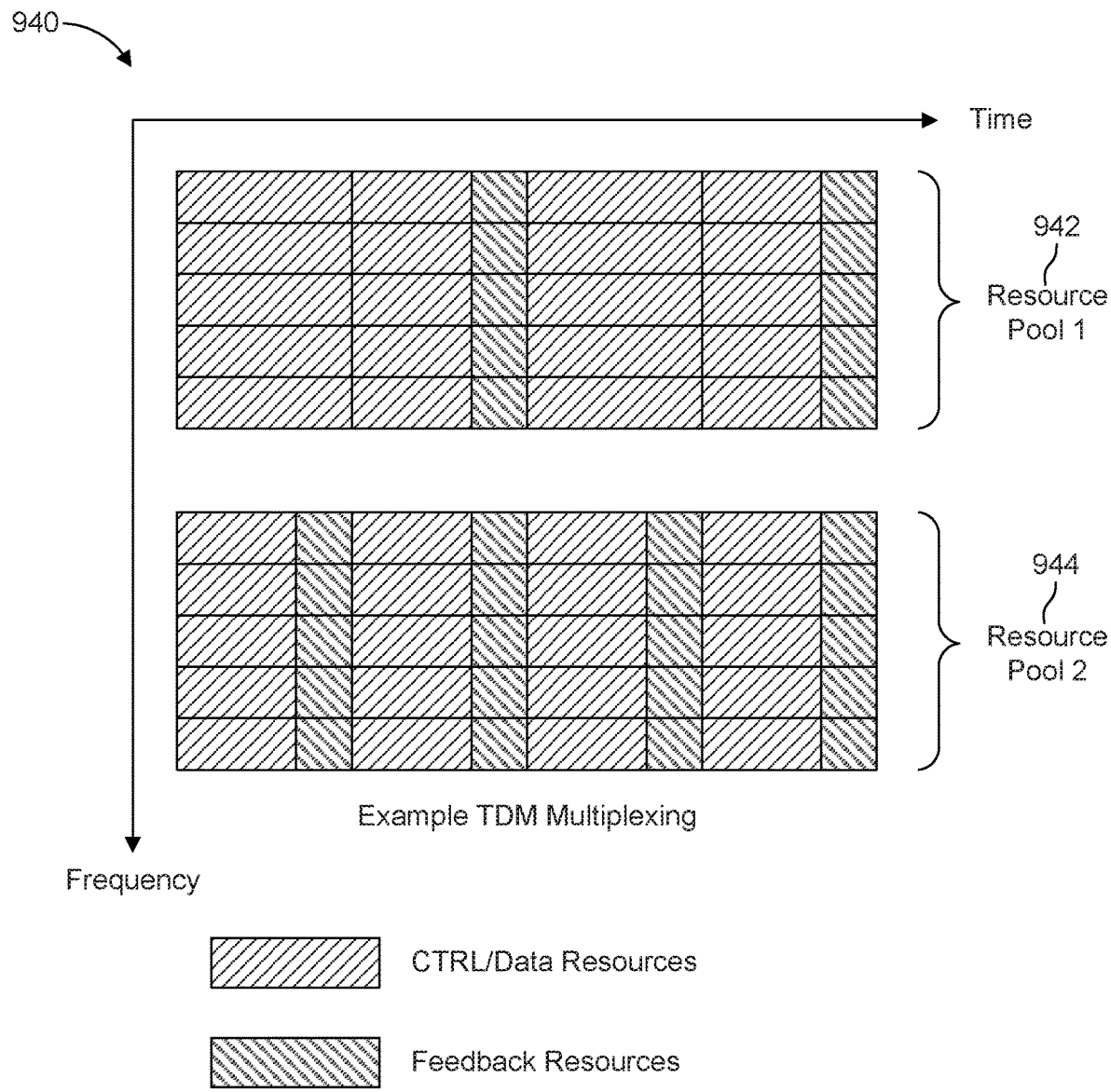
FIG. 9B is a diagram of example feedback resources where the resources are TDM multiplexed with control or data resources.
Figure 10:
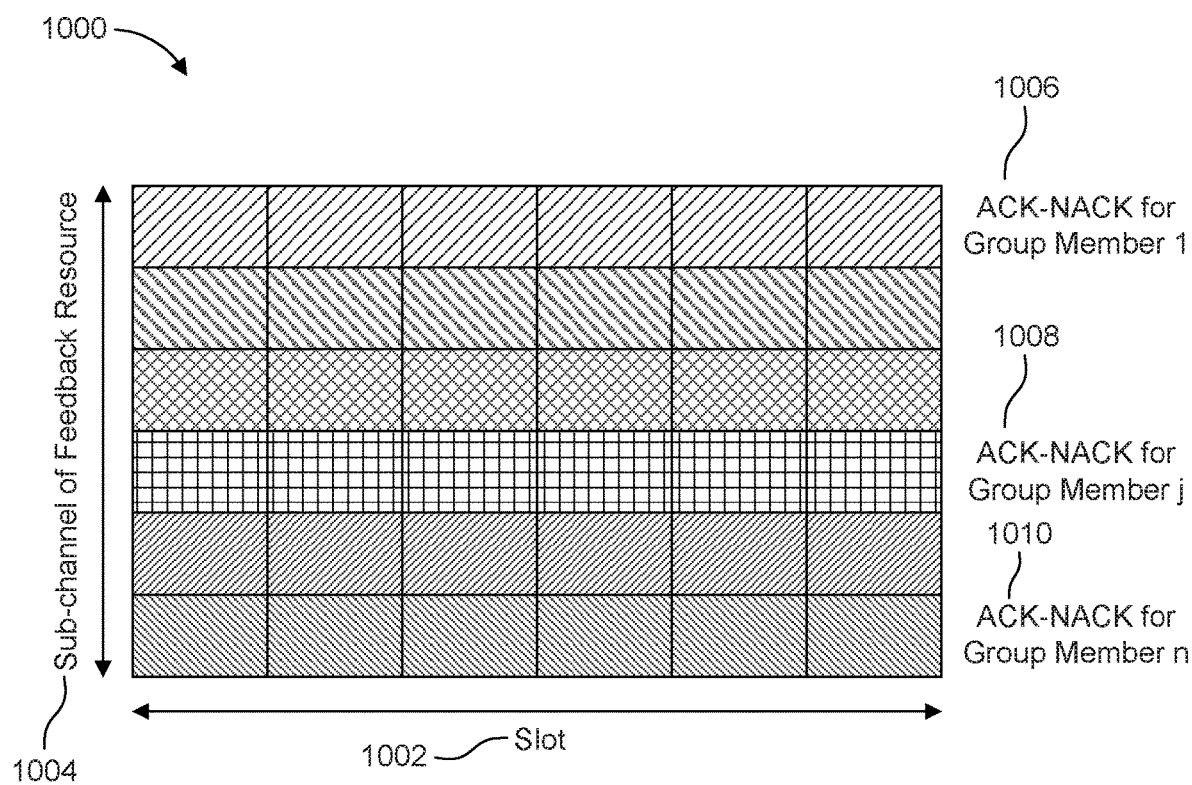
FIG. 10 is a diagram of an example single FDM feedback resource shared by group members.

FIG. 9B is a diagram of example feedback resources 940 where the resources are TDM multiplexed with control or data resources. In resource pool 1 942, feedback resources are configured at the end of in every other slot, in time. In resource pool 2 944, feedback resources are configured at the end of each slot. Feedback resources may span all symbols of a slot, a portion of the symbols or the like.

Different schemes for SA or data resources and feedback resources may be configured via radio resource control (RRC) signaling. This semi-static method of resource configuration may fit the data type and QoS requirements. For example, during a certain time and/or in a certain area, the unicast data or groupcast data may dominant, and more feedback resources may be assigned. For another time and/or in another area, the broadcast data may be dominant, and less feedback resources may be assigned. This flexibility may facilitate resource utilization.

Each SA or data resource may have a fixed association with a feedback resource. Alternatively, the association between an SA or data resource and a feedback resource may be dynamically indicated in an SCI or may be semi-statically configured via RRC signaling in one or more resource pool configurations.

In NR V2X sidelink groupcast, when a transmitting WTRU sends the groupcast data, it may expect that each receiving group member sends HARQ-ACK feedback. More than one feedback resource may be needed for group-based HARQ-ACK feedback. Feedback resources selected may be a function of HARQ characteristics indicated to the receiving WTRUs. A WTRU may send groupcast data and may expect feedback to be returned in a format which corresponds to Table 3 in examples. Each WTRU may send feedback in a format which may have been indicated in an SCI. Feedback may be received from WTRUs in a same format or different formats.

Some or all group members may share a common feedback resource and may multiplex feedback in different feedback formats based on HARQ characteristics. If all of the receiving WTRUs send their HARQ-ACK feedbacks in a common feedback resource, for example, in a given time slot, then due to half-duplex constraints, each receiving WTRU may not learn of other receiving WTRUs' feedback. However, not receiving other WTRU feedback may not cause essential issues to a receiving WTRU, and the sharing of a common feedback resource by some or all receiving WTRUs in the group may have the advantage of resource saving. Selection of a common feedback resource may be a function of one or more indicated HARQ characteristics.

In one example of resource sharing, the transmissions of the HARQ feedback from a group of WTRUs may be in the form of FDM. Each group member may be assigned a sub-resource for its HARQ feedback. The assignment of sub-resources to WTRUs may depend on a WTRU's ID in the group or may depend on a WTRU's RNTI. For example, the j-th member of a group may be assigned with the j-th sub-resource.

FIG. 1C is a diagram 1000 of a slot 1002 in which a single feedback resource is shared by a group of WTRUs. In this example, each WTRU has its own associated subcarriers. In FIG. 1C, the single feedback resource is a slot 1002 which spans a plurality of sub-channels 1004. In an example, an ACK-NACK for group member 1 1006 is transmitted on a first sub-channel; an ACK-NACK for group member j 1008 is transmitted on a jth sub-channel; and an In an example, an ACK-NACK for group member n 1010 is transmitted on an nth sub-channel.

Another way of sharing the resource may be performed such that the symbols containing HARQ information for a group member may be interleaved (in subcarrier) over the feedback resource. Different group members may have a different starting subcarrier for the same interleaving operation. The starting subcarrier for a group member may depend on a WTRU's ID or radio network temporary identifier (RNTI). If the feedback is across several symbols, then frequency hopping may also be applied.

In another example of resource sharing, the transmissions of the HARQ feedback from a group of WTRUs may be in the form of TDM. Each group member may be assigned one or more OFDM symbols in a feedback resource for its HARQ feedback. The assignment of symbols in the resource to a WTRU may depend on its ID in the group or its RNTI. For example, the j-th group member may be assigned the j-th symbol unit in a feedback resource.

Figure 11:
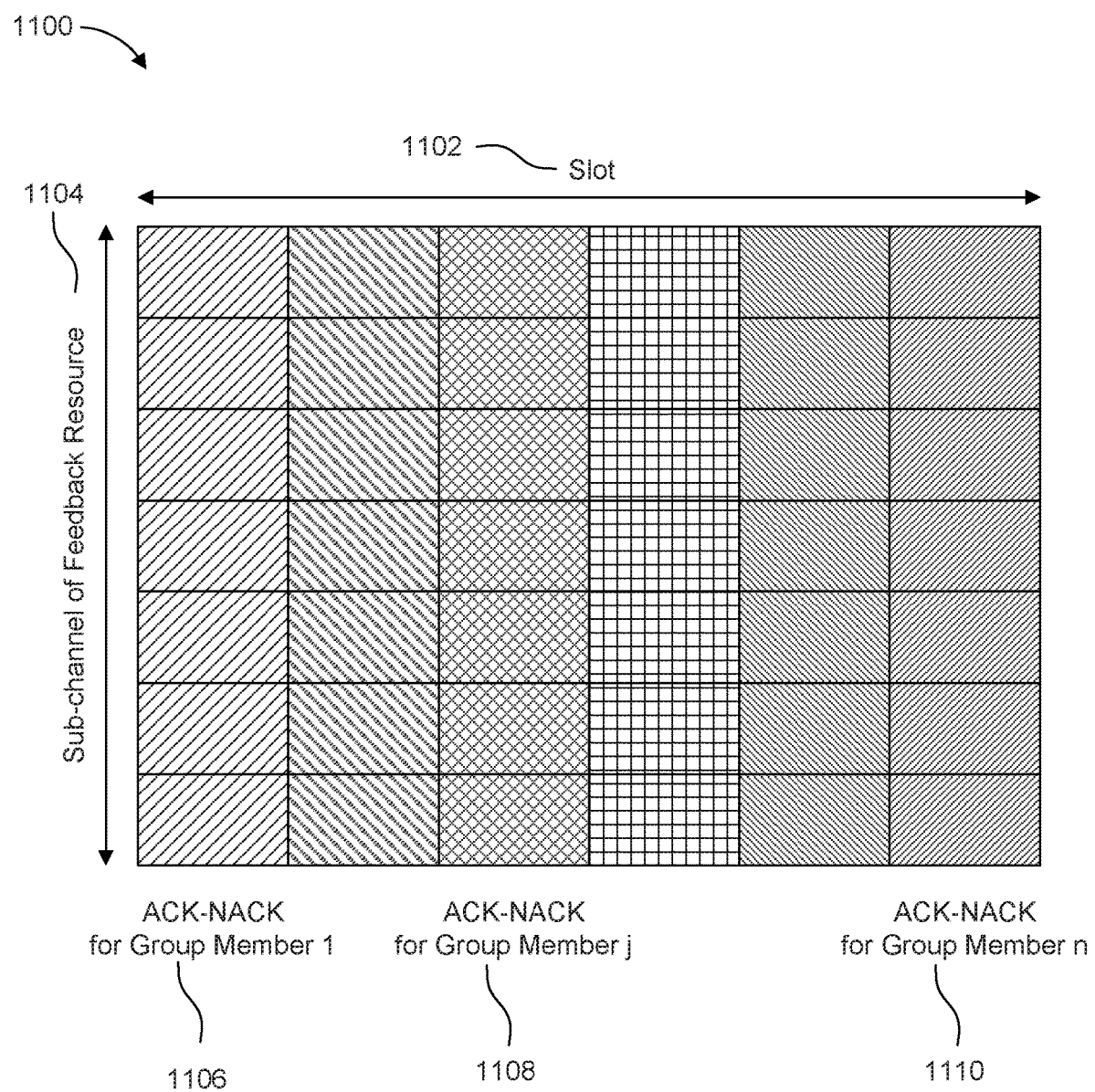
FIG. 11 is a diagram of an example single TDM feedback resource shared by group members.

FIG. 11 is a diagram 1100 of an example where a single feedback resource is shared by a group of WTRUs, where each WTRU has its own associated OFDM symbol(s). For example, the NR PUCCH format 2 consists of 1 or 2 OFDM symbols with no user multiplexing on the same time resources. In the diagram 1100 shown in FIG. 11, a plurality of ACK-NACKs may be transmitted in a slot 1102 comprised of a plurality of sub-channels 1104. An ACK-NACK for group member 1 1106 may be transmitted in a first OFDM symbol of the slot 1102. An ACK-NACK for group member j 1008 may be transmitted in a j-th subsequent OFDM symbol. An ACK-NACK for group member n 1110 may be transmitted in an n-th OFDM symbol. ACK-NACKs for a group member may span multiple symbols in embodiments. Symbol configuration and group member ordering may be a function of HARQ characteristics indicated in SCI.

In another example of resource sharing, the transmissions of the HARQ feedback from a group of WTRUs may be in the form CDM. Different codes or sequences may be used for different group members for their HARQ transmissions. The codes or sequences may be associated with a WTRU's ID in the group or RNTI. For example, the PUCCH format 0 is based on orthogonal sequences, and user multiplexing on the same resource is possible. The TDM, FDM or CDM schemes may be jointly applied.

In each of the examples illustrated, the allocation of the sub-resources for feedback of each WTRU may be associated with an ID in the group of the WTRU or an RNTI of the WTRU. On the other hand, the assignment of a WTRU's feedback to certain sub-resources may be determined by the transmitting WTRU and may be signaled to the receiving WTRU in the SCI of the transmissions. The dynamic signaling may be based on some configured feedback resource assignment rules.

In the case where some group members do not decode the data in the initial transmission, retransmission may occur. For retransmissions, a WTRU decoding data in initial or previous transmissions may not need to send feedback for retransmissions. Only a WTRU not decoding data in initial or previous transmissions may need to send feedback for the retransmissions. In this way, a WTRU may, at most, send a single ACK for each data transmission. The transmitting WTRU may only need to count the total number of ACKs it receives for each data transmission. If the total number of ACKs is equal to the group size minus 1, then it may stop retransmitting. Otherwise, it may continue retransmitting. The transmitting WTRU may not need to identify which WTRU does not decode the data in which (re)transmission.

Each group member may or may not send ACK or NACK feedback for one or more data transmissions. In an embodiment, a WTRU may use either an ACK or a NACK, which may be set as a default. For example, where ACK is set as default, a WTRU may not need to send any feedback bits if it decodes the data. A WTRU may only feedback NACK when it does not decode the data. For another example, where NACK is set as default, a WTRU may not need to send any feedback bits if it does not decode the data. A WTRU may only feedback ACK when it decodes the data.

In groupcast sidelink with feedback, a transmitting WTRU may or may not retransmit the same TB based on the group HARQ-ACK feedback. In general, a transmitting WTRU may retransmit when all the receiving WTRUs feedback NACKs, or a transmitting WTRU may not retransmit when all the receiving WTRUs feedback ACK. If some of the WTRUs feedback ACK, while other WTRUs feedback NACK, the transmitting WTRU may or may not retransmit the same transport block (TB). Suppose the percentage of NACKs in a transmission is P. If P>Thre, then the WTRU may retransmit the data. Otherwise, the WTRU may not retransmit the data. The value of Thre may depend on data QoS. For example, one of more of the following parameters may be considered in determining the retransmission: reliability, priority and latency. Regarding reliability, for data with a higher reliability requirement, the threshold may be lower; and for data with lower reliability requirement, the threshold may be higher. Regarding priority, for data with a higher priority, the threshold may be lower, and for data with a lower priority, the threshold may be higher. Regarding latency, for data with a lower latency requirement, the threshold may be higher, and for data with a higher latency requirement, the threshold may be lower. In the case of one or a few NACK feedbacks, the transmitting WTRU may even apply the unicast transmissions for the corresponding receiving WTRUs.

Figure 12:
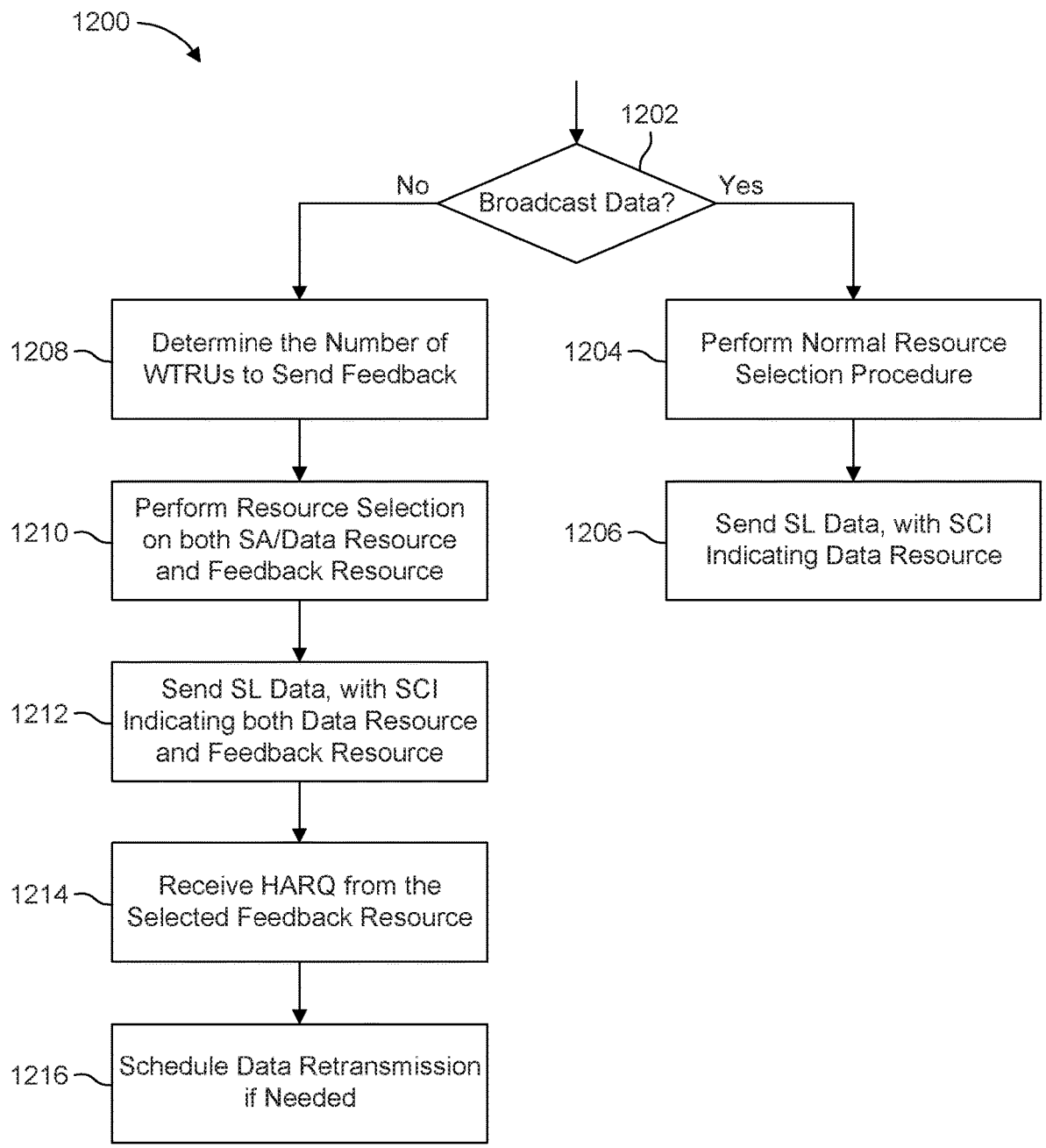
FIG. 12 is an flow diagram of an example method for an NR mode 2 WTRU to select resources and transmit sidelink data.

FIG. 12 is a flow diagram 1200 of an example NR mode 2 WTRU procedure for resource selection and sidelink data transmission. When a mode 2 WTRU has some sidelink data to send, it may first check whether the data is for broadcast 1202, which does not need any HARQ feedback from receiving WTRUs. If the data is for broadcast, then the WTRU performs 1204 the resource selection procedure and sends 1206 the sidelink data in the selected resource, for example as in LTE V2X. If the data is not for broadcast and is for groupcast or for unicast, which may need some HARQ feedback from receiving WTRUs, then the transmitting WTRU may first determine 1208 the number of group members that may send HARQ feedback. Based on this number, it may determine the resource size for the HARQ feedback. Then, it may perform the resource selection 1210 for both data and HARQ feedback. The WTRU may send 1212 the sidelink data and receive HARQ 1214 from the selected feedback resource. If necessary, the WTRU may schedule 1216 data retransmission. The transmitting WTRU may indicate HARQ characteristics for the data retransmission.

The resource for SA or data transmissions and the resource for feedback transmissions may be in different resource pools or different regions within the same resource pool. Hence, the resource selection procedures for different resource pools or different regions within the same resource pool may be independent. The resource selection window for a feedback resource may be delayed from the resource selection window for the data resource. The delay value may depend on a capability for decoding and processing of a receiving WTRU. For example, if the resource selection window for an SA or data resource is set as $[n+T_1, n+T_2]$, then the resource selection window for the feedback resource may be set as $[n+T_1+T_{1,offset}, n+T_2+T_{2,offset}]$, where $T_{1,offset}$ and $T_{2,offset}$ may be fixed, configured based on WTRU capability/category, or up to WTRU implementation.

Although the resource selection procedure for SA or data and for feedback may be performed independently, the final decision of the resource for data and the resource for HARQ feedback should be jointly made. This is to avoid the selected HARQ resource being ahead of the selected data resource, or the selected HARQ resource being very close to the selected data resource, so that the receiving WTRUs may generate the HARQ feedback within this short processing window.

When the resources for SA or data and feedback are determined, a mode 2 WTRU may send the sidelink SA or data on the selected resource. The SCI information may include the indication of both the SA or data resource and feedback resource. The transmitting WTRU may then receive the HARQ from the selected HARQ resources and may schedule data retransmissions if needed.

It is possible that the resource selection procedures for SA or data transmissions and feedback transmissions may be dependent. This scheme may be applicable if the SA or data resource and the feedback resource follow a certain pattern. For example, the selected feedback resource may have to be 4 slots after the selected data resource. Based on a given pattern, a pair of resources for SA or data and feedback should be identified together. In this case, the SCI may not indicate the location of feedback resources or may only indicate reduced information for feedback resources.

Figure 13:
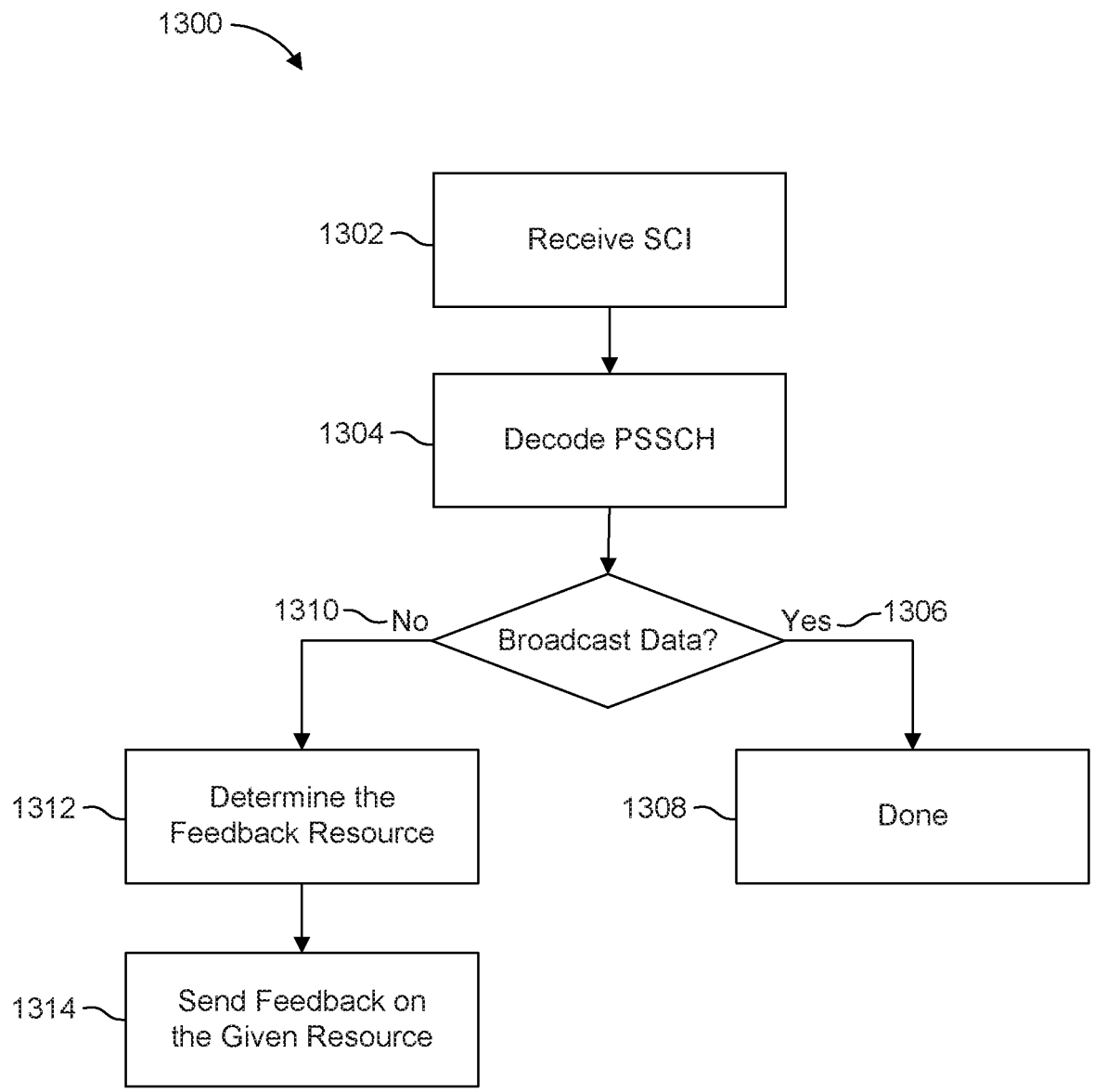
FIG. 13 is a flow diagram of an example method for a WTRU to receive sidelink data transmissions and/or send feedback.

FIG. 13 is a flow diagram 1300 of an example WTRU procedure for receiving sidelink data transmissions and/or sending feedback. A receiving WTRU may first receive SCI 1302 indicating HARQ feedback characteristics. Based on the SCI, it may find the resource for data transmissions or, additionally, the resource for feedback transmissions for unicast or groupcast. The receiving WTRU may then decode 1304 the PSSCH. If the data is determined to be broadcast data 1306, then the receiving WTRU may have no further action 1308. Otherwise 1310, it may need to determine 1312 the feedback resource. The feedback resource may be indicated in the received SCI, or the WTRU may be configured to follow a certain pattern based on the resources used for SA or data transmissions. Further, for groupcast, a receiving WTRU may determine the sub-resource for its feedback. The receiving WTRU may send 1314 the feedback on its assigned (sub-)resource.

In NR V2X, a gNB schedules resources for a mode 1 WTRU. The scheduling may be dynamic or semi-persistent (i.e., SPS scheduling). The SPS scheduling may be activated or deactivated by DCI.

In LTE V2X, the SPS scheduling is only for data transmissions as no feedback is needed in the case of broadcast sidelink transmissions. In NR V2X, both unicast and groupcast sidelink is supported. To facilitate the SPS scheduling for unicast or groupcast sidelink transmissions, a new SPS configuration may be provided that includes both the SA/data resource and feedback resource for unicast or groupcast sidelink transmissions. In the configured SPS resource, the periodicity of the feedback resources may be identical to that of the SA/data resources. This may ensure that each data transmission is associated with an ACK/NACK feedback.

Figure 14:
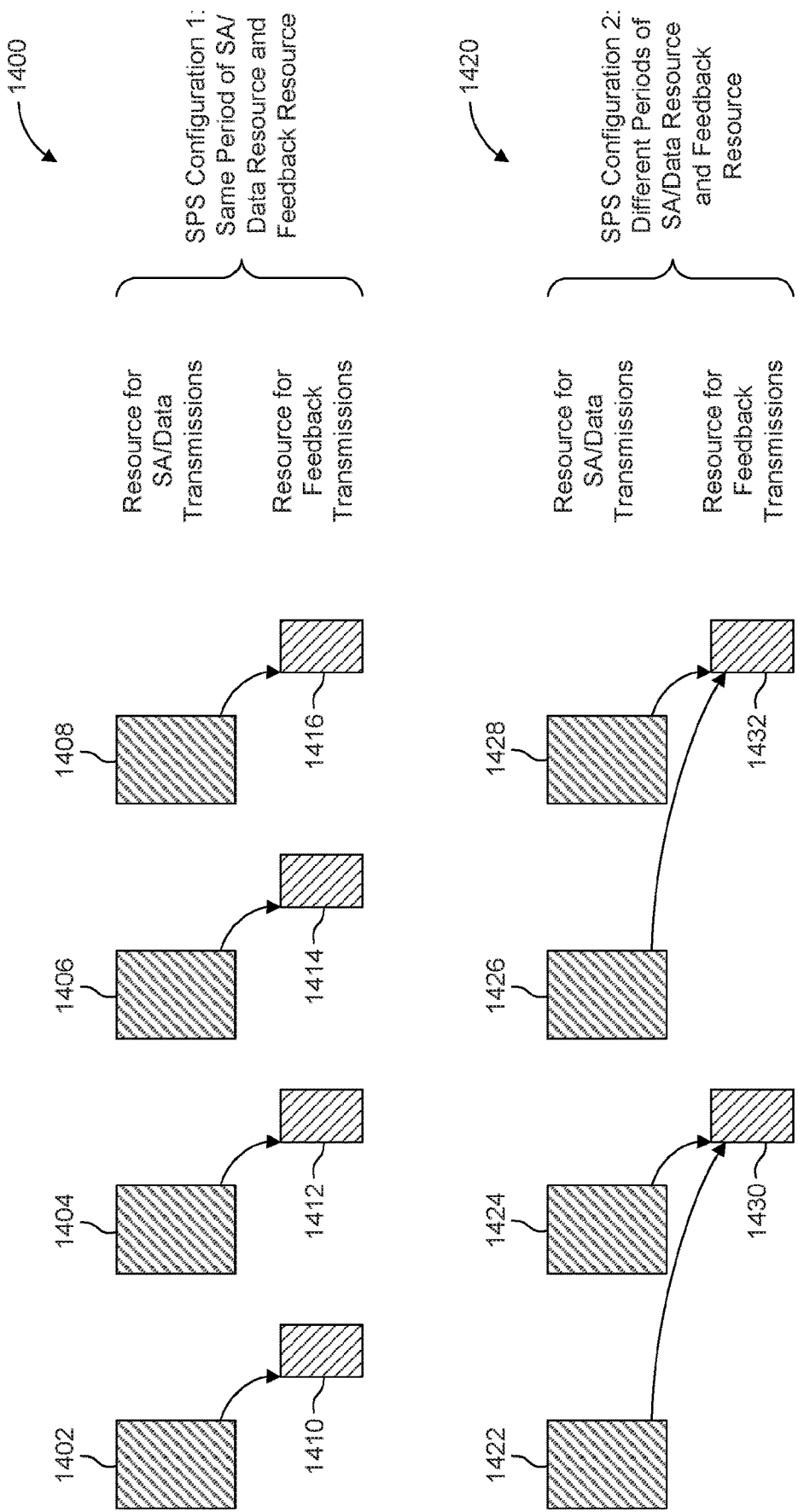
FIG. 14 is a diagram of a semi-persistent scheduling (SPS) configuration with both SA or data resources and feedback resource.

FIG. 14 is a diagram of example SPS configurations 1400, 1420 with both SA or data resources and feedback resources. The SPS configuration 1400 at the top of FIG. 14 illustrates the periodicity of the feedback resources being identical to that of the SA or data resources. In this example, resources for SA/data transmissions 1402-1408 area each followed by resources for feedback transmissions 1410-1416.

Alternatively, the periodicity of the feedback resources may be larger than that of the data transmission resources. This scheme may be supported by concatenated ACK/NACK bits in a single feedback resource for multiple TBs that are sent over several semi-persistent resources. This is illustrated in the bottom example, SPS configuration 1420. As shown in example SPS configuration 1420, resources for SA/data 1422-1428 are not always immediately followed by resources for feedback transmissions 1430, 1432. For example, resource 1430 follows resource 1422 and resource 1424. Resource 1432 follows resource 1426 and resource 1428.

Besides the period of the feedback resources, the initial feedback resource location may need to be specified. This may be in the form of the relative time and frequency offset between the data resource and the feedback resource. Other methods of indicating the feedback resources are also possible.

In another example, two associated SPS configurations may be configured separately. One SPS configuration may be designed for data transmissions, while the other SPS configuration may be for feedback transmissions. This configuration may have the advantage that, for broadcast traffic, only one SPS configuration is activated or deactivated. For unicast or groupcast traffic, both SPS configurations may be activated or deactivated. Hence, the DCI format may include the activation or deactivation of two or more SPS configurations simultaneously.

The above SPS configuration, considering the feedback resources, may be mainly used for NR mode 1 users. For NR mode 2 users, type-1 configured grant configurations may be used, which may be purely configured by RRC without layer 1 activation/deactivation. The two separate configurations (one for data transmission and one for feedback) may be applied to type-1 configured grant configurations.

For NR downlink transmissions, the feedback may contain one or more HARQ-ACK bits and a 4-bit CQI, where the used CQI table may contain 16 entries. The feedback CQI index may be useful for the downlink data transmissions in selecting or adapting the MCS index. Link adaptation may not exist in LTE V2X sidelink transmissions.

In NR V2X with unicast or groupcast sidelink transmissions, the HARQ-ACK bits may be fed back together with compact CQI. Instead of a 4-bit CQI for a given CQI table, a 1-bit compact CQI may be used to indicate the increase or decrease of the CQI index from the MCS index used for data transmissions. For example, the bit '0' may indicate the decrease of the CQI index from the used MCS index, and the bit '1' may indicate the increase of the CQI index from the used MCS index. The decrease of the CQI index may imply that the channel condition is bad and the coding rate or modulation order needs to be decreased to maintain the BLER level. The increase of the CQI index may imply that the channel condition is good, and the coding rate or modulation order may be increased to achieve higher spectral efficiency. The step of increase or decrease on the MCS table may be '1' each time or may be performed with other values.

Alternatively, 2-bit CQI adjustment may be used to indicate the increase or decrease or to maintain the CQI index with respect to the MCS index used for data transmissions. For example, the bits "00" may indicate the decrease of the CQI index, the bits "01" may indicate the maintenance of the current CQI index, and the bits "10" may indicate the increase of the CQI index.

The compact CQI index may be jointly used with ACK/NACK bits. For example, the increase of the CQI may occur only if the current data is successfully decoded or ACK-ed current transmissions. The decrease of the CQI may occur only if the current data is not decoded or NACK-ed current transmissions. The maintenance of the current CQI index may occur for either ACK or NACK of the current transmissions.

Thus, two levels of HARQ-ACKs are defined: ACK with increased CQI/MCS index and ACK with current CQI/MCS index. Where a TB is successfully decoded (i.e., ACK), the receiving WTRU may measure how much more spectral efficiency it could achieve. The determination between these two HARQ-ACK levels may depend on the channel estimation. For example, the channel estimation may indicate that the current channel is much better than the current MCS level. The determination between these two HARQ-ACK levels may also depend on the decoding complexity. For example, the number of iterations in low density parity check (LDPC) decoding may be less than a certain value, and the receiving WTRU may think the MCS index could be increased. Otherwise, the receiving WTRU may think the MCS index should be maintained. All these conditions may occur when the decoding of the current data is successful (i.e., ACK).

Similarly, two levels of HARQ-NACKs are defined: NACK with current MCS index and NACK with decreased MCS index. If a WTRU fails to decode a TB (i.e., NACK), the receiving WTRU may measure how far it is from successful data decoding. This may depend on the channel estimation or LDPC decoding complexity.

The two-level HARQ-ACK and two-level HARQ-NACK may be expressed as in Table 4.

TABLE 4

Exemplary joint HARQ-ACK and compact CQI feedback indication

| Bits | 00 | 01 | 10 | 11 |
|---|---|---|---|---|
| Meaning | NACK and decrease MCS level | NACK and maintain MCS level | ACK and maintain MCS level | ACK and increase MCS level |

Based on the above scheme, 2-bit ACK/NACK and compact CQI may be used for the feedback. The transmitter may have link adaptation based on the feedback. For unicast sidelink communication, the transmitter may simply adjust the MCS for the next transmission, such as under the condition that the next transmission occurs within a period from the feedback. This may be because if the time gap between the feedback and the next transmission is longer, then feedback information may no longer be valid due to the channel change.

For groupcast sidelink communication with feedback, the transmitter may have certain rules to adjust the MCS level. For example, if more than a certain number/percentage of receiving WTRUs decode the data and request to increase the MCS level, then the transmitting WTRU may increase the MCS level for the next transmission. If a certain number/percentage of receiving WTRUs could not successfully decode the data, then the transmitting WTRU may decrease the MCS level for the next transmission. If a certain number/percentage of receiving WTRUs could not decode the data and request to decrease the MCS level, then the transmitting WTRU may decrease the MCS level for the next transmission.

Based on Table 4, the transmitting WTRU may adjust its MCS level as follows:

If the percentage of "11" or "10" > Thres_1 or the percentage of "11" > Thres_2, then increase MCS level for the next transmissions
elseif the percentage of "00" or "01" > Thres_3 or the percentage of "00" > Thres_4, then decrease MCS level for the next transmissions
else
   maintain MCS level for the next transmissions.

The above decision rule may also be applied for independent ACK/NACK and CQI feedback. Based on the CQI feedback received from all the group members, the transmitting WTRU may decide whether to increase, decrease or maintain the MCS level for the future data transmissions. The MCS for its future data transmissions may be set as: an average CQI index of all of the fed back CQI indices, a certain percentile of the reported CQI indices, an increased CQI index (for one or more steps) if above a certain percentage of reported CQI indices is above the current MCS index, a decreased CQI (for one or more steps) if above a certain percentage of reported CQI indices is below the current MCS index, or the current MCS index otherwise. Where the MCS for future data transmissions is set as a certain percentile of the reported CQI indices, for example, for the reliability level of 99% data, the transmitting WTRU may set the MCS to the 90% highest CQI index among the reported CQI indices, and for the reliability level of 99.99% data, the transmitting WTRU may set the MCS to the 95% the highest CQI index among the reported CQI indices. Where CQI index is increased or decreased, the CQI index increase/decrease steps may also depend on data QoS.

The density of one or more reference signals, for example, a demodulation reference signal (DMRS) or a phase tracking reference signal (PTRS), used for sidelink transmissions may be dynamically adjusted. The reference signal density may be controlled by the transmitting WTRU. However, the receiving WTRU may feedback its desired reference signal pattern to the transmitting WTRU.

If a list of reference signal patterns (RSPs) is provided and ordered based on densities, a receiving WTRU may feedback an index of a specific RSP. Otherwise, it may compress the index information and feedback only the increase, decrease or maintenance of the current RSP index. Only 2 bits may be needed in this case.

The compact RSP index may be combined with a HARQ-ACK bit. For example, the decrease of the RSP index may occur only if the current data is successfully decoded or ACK-ed in current data transmissions. The increase of the RSP index may occur only if the current data is not decoded or NACK-ed current transmissions. The maintenance of the current RSP index may occur either ACK or NACK the current transmissions. In this way, only 2 bits may still be needed for both HARQ-ACK and RSP index.

For groupcast sidelink, the transmitting WTRU may adjust the RSP based on the statistics of the group feedback with an increase, decrease or maintenance of the current RSP index. Similar rules as for the link adaptation schemes described above may be used for RSP adaptation.

Other feedback parameters, such as power control related parameters, may be also included for reliable transmission. These parameters may be jointly or separately encoded with HARQ-ACK, CQI and/or RSP.

For groupcast sidelink, the group lead may reserve a set of resources for the entire group. Each group member may use the reserved resources for group communications. For vehicle platooning, the platoon lead may reserve SPS resources for the entire group. These SPS resources may also include the feedback resources as described. Alternatively, the platoon lead may be an NR mode 2 WTRU, which may select and reserve periodic resources for the entire group.

A reservation may need to be informed to all the group members. The usage of the reserved resources may be controlled by the group lead or may be distributed among group members.

For the centralized control case, the group lead may inform each group member as to which resource is assigned to it for its transmissions. Group-lead-based-scheduling may be semi-statically signaled and may be dependent on the needs of group transmissions.

For example, the group lead may be the first vehicle in a vehicle platoon and may have the best observation of the front road condition. Hence, it may occupy the largest percentage of the overall reserved resources among all the vehicles in the platoon. On the other hand, the last vehicle in a vehicle platoon may observe the backward road condition and, hence, may occupy a second largest percentage of the overall reserved resources among all the vehicles in the platoon. If a group member in a platoon is a truck or bus, it may have a better observation than other group members. It may occupy a third largest percentage of the overall reserved resources. It is possible that several group communication resource usage patterns are configured by the group lead. Then the selection among these resource usage patterns may be dynamically indicated by the group lead, for example, via SCI.

Each group member may be assigned a separate period for its groupcast. This assignment may be obtained from the group lead, for example, based on the location or type of each group member or based on the needs of each group member. It may be further adjusted by the group lead based on the request of each group member. For example, if a group member thinks it needs more resources for transmissions, it may indicate it to the group lead. The indication may be contained or indicated in the SCI or data of its transmissions.

Figure 15:
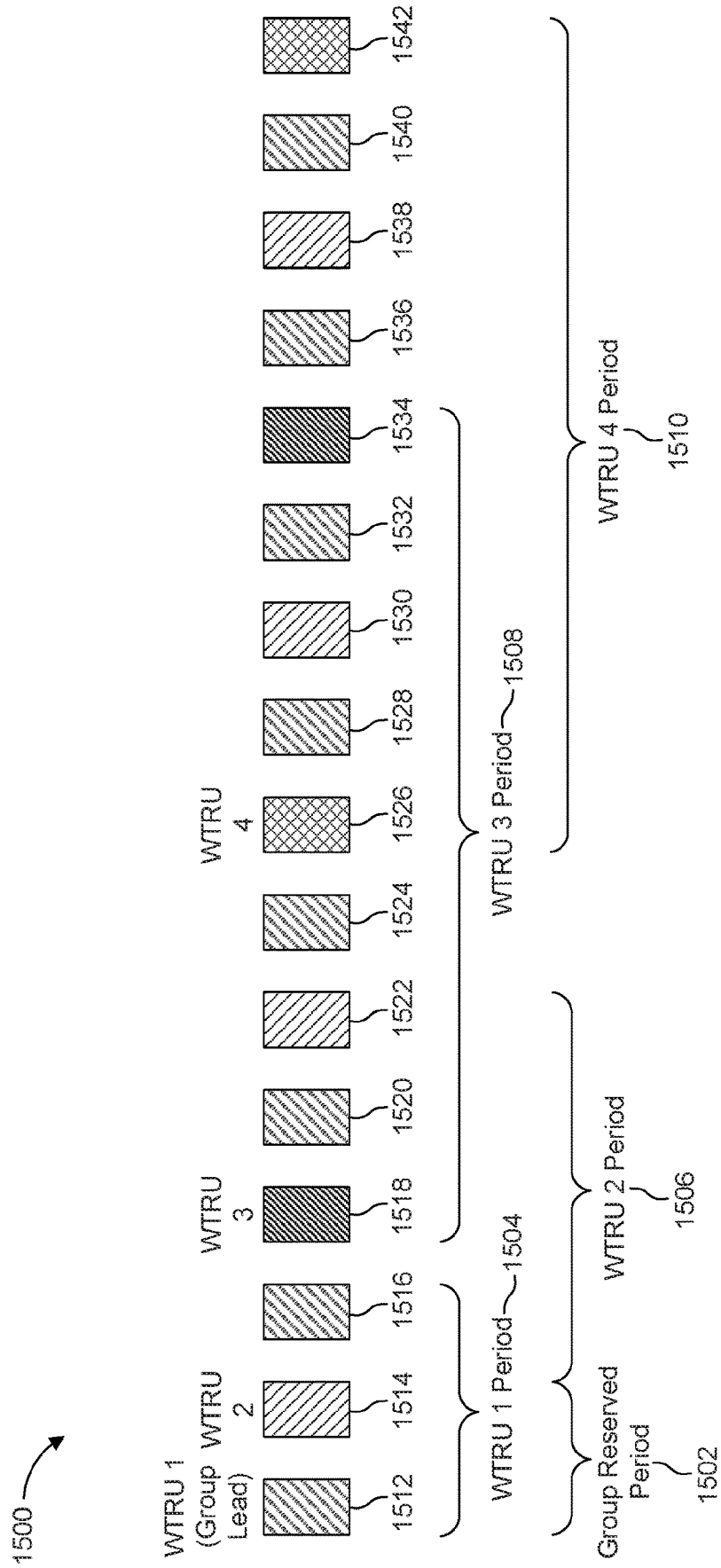
FIG. 15 is a diagram of an example group resource allocation with different resource allocations for different group members.

FIG. 15 is a diagram of an example group resource allocation 1500 with different resource allocations for different group members. A group reserved period 1502 is indicated in the example. The group lead, WTRU 1, occupies a period 1504 equal to a half of the reserved group resources 1512-1542. WTRU 2 which may be the last vehicle in the platoon occupies a period 1506 equal to a quarter of the reserved group resources. WTRU 3 and WTRU 4, which may be in the middle of the platoon, may occupy one eighth of the reserved group resources, i.e. WTRU 3 is configured with a period 1508 and WTRU 4 is configured with a period 1510. Other options for reserved periods may be applicable. In embodiments, platoons may occupy more or less WTRUs.

As shown in FIG. 15, WTRU 1 may transmit on resources 1512, 1516, 1520. 1524, 1528, 1532, 1536 and 1540. WTRU 2 may transmit on resources 1514, 1522, 1530 and 1538. WTRU 3 may transmit on resources 1518 and 1534. WTRU 4 may transmit on resources 1526 and 1542.

HARQ-ACK feedback may also be supported for unicast sidelink transmissions. For sidelink groupcast transmissions, the feedback may or may not be activated. This is because all of the group members may need to send HARQ-ACK feedback, which may occupy a lot of feedback resources. Also, the transmissions of feedback from group members may disable their monitoring and sensing of the channels, which may restrict the resource access in NR mode 2 sensing and resource selection procedures. Hence, an optimal design for feedback for groupcast sidelink transmissions may be desirable.

Feedback for groupcast sidelink transmissions may be needed in certain conditions, while feedback for groupcast sidelink transmissions may not be needed in other conditions. The conditions may be related to data QoS, as well as other factors. For data with high reliability requirements, feedback for group communication may be needed. This feedback may trigger retransmission of the missing data to certain receiving WTRUs, thus enhancing the reliability of the transmissions. For data with low latency requirements, the feedback for group communication may not be needed. This may be because the delay resulting from the HARQ-ACK feedback from all the group members and subsequent retransmissions may already exceed the latency requirements. For data with low latency requirements in group communications, the repetition without HARQ may be applied directly to ensure the reliable data transmissions. For data with high priority, feedback for group communication may be needed. This is because the data is important to the receivers, and the group feedback, though occupying more resources and causing large delays, may still be necessary to match the importance of the data.

For a group with a smaller number of members, feedback for group communication may be needed. This is because the resources used for feedback may be restricted, and the impact of the feedback may be limited. For a group of vehicles with high speed, feedback for group communication may be needed. This may be to alleviate the impact of the fast changing channel conditions. In embodiments, retransmission may be performed to select members of a group.

The enabling or disabling of the feedback in group communications may need to be signaled so that receiving WTRUs know whether or not to send HARQ feedback and transmitting WTRUs know whether or not to receive HARQ feedback.

The indication of the optional feedback may be provided in a semi-static manner, such as using RRC configuration. For example, the configuration may specify if the data reliability requirement is larger than a threshold, the data latency requirement is larger than a threshold, the data priority level is smaller than a threshold, the number of group members is larger than a threshold, and/or vehicle speed is higher than a threshold, then the group feedback is needed. Otherwise, the group feedback is not needed. Hence, it may be assumed that data reliability, latency and priority level, number of group members, as well as vehicle speed, are known to the receiving WTRUs. This information may be provided in SCI or may be provided at a higher layer to the receiving WTRUs.

In embodiments HARQ feedback may be enabled or disabled based on data latency requirement(s), data reliability requirement(s), a group size or group sizes and/or the traveling speed or velocity of a vehicle or other vehicles within a group. For example, speed may be determined based on a transmitter or receiver speed. Speed may be determined based on a speed in which a transmitter and receiver are accelerating towards or away from one another.

One way of indicating whether feedback is needed for groupcast is through the use of a group ID. For a certain group ID range, the feedback may be assumed, while for other group ID ranges, the feedback may not be assumed. The group ID assignment may occur during the process of group establishment. In the group establishment process, the group lead may know the group type, such as vehicle platooning, sensor information sharing, and/or maximum group size. In general, for groups with relatively dynamic formation (e.g., sensor information sharing) and/or large group size, the group ID may be in the range supporting no feedback. For groups with relatively static formation, for example, vehicle platooning and/or groups with a small group size, the group ID may be in the range supporting feedback.

The indication of the optional feedback may be provided dynamically, such as using an SCI indication. For example, a single bit in SCI may indicate whether group feedback is required. This indication may be combined with another field, for example, an RV indicated in the SCI. In another example, the HARQ process ID may be associated with the feedback indication. For the unified design between groupcast and unicast, the HARQ process ID may always be contained in the SCI. For example, the HARQ process ID equal to a default value, for example, a 0 value, may imply that no feedback is needed. For feedback in groupcast sidelink, the HARQ process ID may start from 1. Other options of implicitly indicating group feedback may be associated with the scrambling of the control or data transmissions or reference signals. For example, if one RNTI is used for scrambling the control, data or reference signals, then the group feedback may be needed. If the other RNTI is used for scrambling the control, data or reference signals, then the group feedback may not be needed. Another example may be that scrambling of RNTI at different portions of CRC bits may indicate whether feedback is needed.

In LTE V2X, the sidelink may be broadcast without feedback. The repeated transmission of a TB may be possible by configuring the number of repetitions to 0 or 1 in the SL-PSSCH-TxParameters IE. This may enable the support of at most 1 repetition-based retransmission of the same TB.

In NR V2X, the groupcast sidelink may or may not enable HARQ-ACK feedback. The number of repetitions may be adjusted, depending on whether HARQ-ACK feedback is supported. For example, if the HARQ-ACK feedback is supported in group communications, then the number of repetitions may be 0. This may be because the HARQ retransmission procedure already increases the reliability level. If the HARQ-ACK feedback is not supported in group communications, then the number of repetitions may be more than 0.

This repetition number may be configured to be dependent on HARQ-ACK feedback. Then, based on dynamic enabling or disabling of group HARQ-ACK feedback, the repetition number may be adjusted accordingly. Alternatively, the repetition number may be indicated in the physical layer (e.g., via explicit SCI indication or implicit indication with another field of SCI). In all the repeated transmissions of the same TB, the HARQ process ID may be included and set to a common value.

For sidelink unicast, the number of repetitions may be set as 0 since the HARQ-ACK scheme may always be applied. Alternatively, the number of repetitions may be set to a number greater than 0 even if the HARQ-ACK scheme is used. This may be to address some low latency and/or high reliability applications, where it may be desired to successfully deliver the data in the initial transmissions. For example, if the data reliability requirement is high and/or the data latency requirement is low, the repetition scheme may be applied. Otherwise, the repetition scheme may not be applied.

With the feedback in NR V2X sidelink unicast or groupcast, link adaptation may be possible. The transmitting WTRU may adjust its modulation and coding rate to fit the channel condition for either retransmissions or transmissions of new TBs. This link adaptation may ensure the BLER level reaches a given target, achieving reliable transmissions. On the other hand, repetition (without feedback) is supported in LTE V2X, with a maximum of 1 repetition. Though MCS remains the same between the repetitions, the chase combining gain may increase the effective SNR and achieve reliable transmissions. In NR V2X, the number of repetitions may be configurable or dynamically adjusted, for example, based on the data QoS. The dynamic adjustment of the number of repetitions may be performed jointly with link adaptation. For example, if the channel condition becomes worse, the MCS index may be reduced with lower coding rate and modulation order and/or the number of repetitions may be increased to increase the effective SNR.

In selecting between these two approaches, the transmitting WTRU may evaluate the gain resulting from the number of repetitions. For example, if the WTRU increases the number of repetitions from 0 to 1, then an effective SNR increases 3 dB. If the WTRU increases the number of repetitions from 1 to 2, then an effective SNR increases 1.76 dB. If the WTRU increases the number of repetitions from 2 to 3, then an effective SNR increases 1.25 dB.

On the other hand, the transmitting WTRU may evaluate the gain resulting from the MCS index reduction. This may depend on the BLER performance of the LDPC codes used for different MCS values and TBS. It may also depend on the target BLER level or data reliability requirement.

Figure 16:
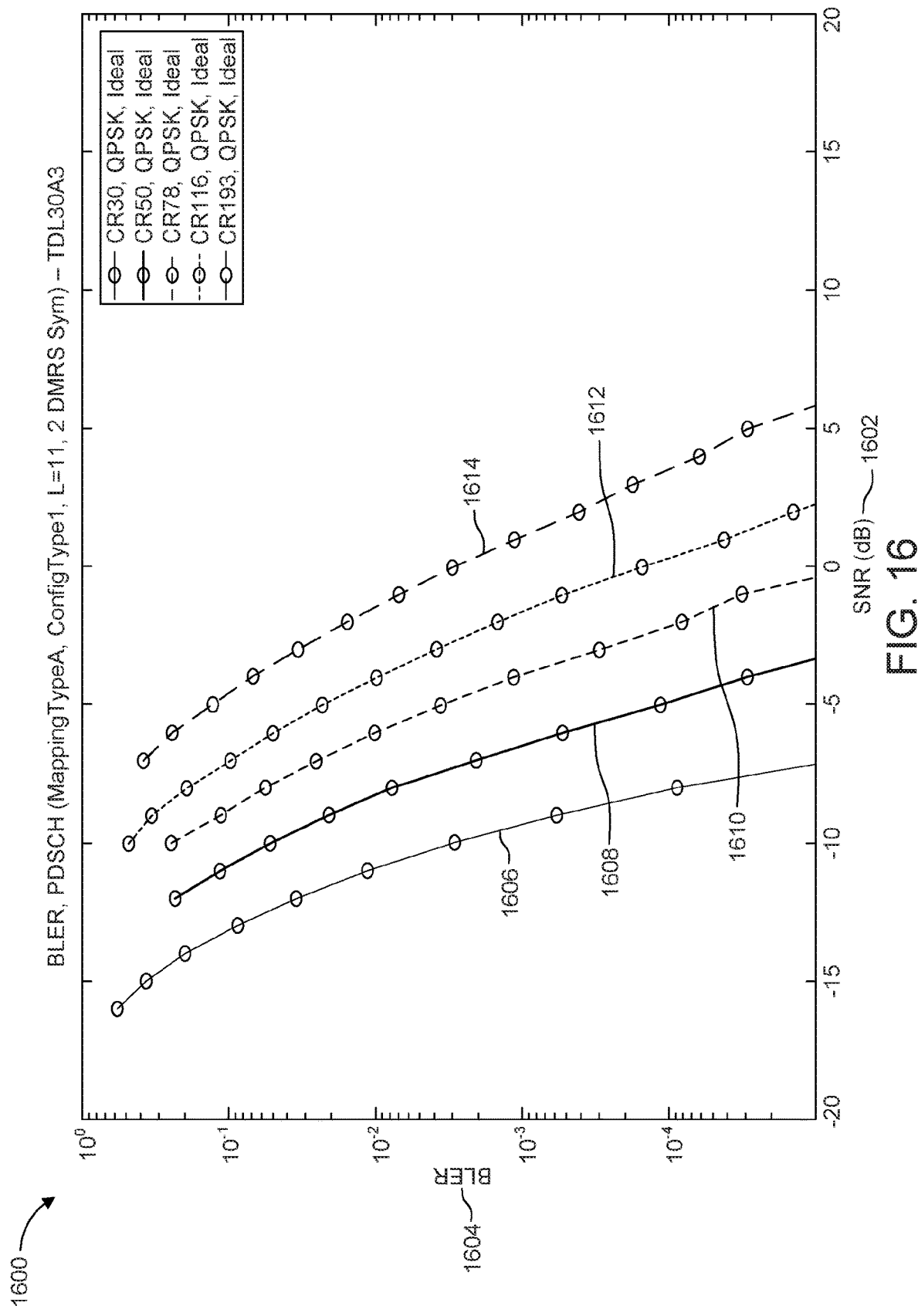
FIG. 16 is a graph showing block error rate (BLER) performance of channel quality information (CQI) entries on a tapped delay line (TDL)-A channel model with 30 ns delay spread and ideal channel estimation.

FIG. 16 is a graph 1600 showing BLER performance of CQI entries on a tapped delay line (TDL)-A channel model with 30 ns delay spread and ideal channel estimation. The x-axis of the graph 1600 illustrates SNR 1602 and the y-axis represents BLER 1604. The graph 1600 illustrates coding rate (CR) CR30 1606, CR50 1608, CR78 1610, CR116 1612 and CR194 1614. It can be seen from FIG. 16 that the decrease in coding rate from 193/1024 to 30/1024 results in an effective SNR increase of 8 dB at a BLER level of $10^{-1}$, but results in an effective SNR increase of 13 dB at BLER level of $10^{-5}$. The noise floor issue of LDPC codes at low BLER level should also be considered when selecting between the two approaches.

In general, the reduction of the MCS index may result in a more effective SNR gain at a relatively high target BLER level (e.g., $10^{-1}$) than at a relatively low target BLER level (e.g., $10^{-5}$). Hence, when the channel condition becomes worse, the MCS index reduction approach may be selected rather than the repetition number increase approach for data with low reliability requirements. Further, the repetition number increase approach may be selected over the MCS index reduction approach for data with high reliability requirements.

Alternatively, the two approaches may be jointly used. For example, if the channel condition becomes extremely bad, the transmitting WTRU may reduce the MCS index together with a repetition number increase.

NR URLLC service may use two or more MCS tables. This may imply that NR V2X may use these two or more MCS tables as well. In accordance with the CQI feedback, a transmitting WTRU may want to switch one or more MCS table(s) for the next transmissions or for retransmissions. For example, the spectral efficiency of the current MCS table may not fit a current channel condition, even at the maximum number of repetitions. The indication of MCS table switch may also be associated with repetition numbers. For example, if the current transmissions are based on the MCS table with high spectrum efficiency entries, and if the channel condition becomes worse, the switch to the MCS table with low spectrum efficiency entries may be accompanied without repetition since a low code rate or modulation order itself may work for the worse channel condition. Alternatively, the switch to the MCS table with lower spectrum efficiency entries may be accompanied with increased repetition to jointly achieve reliable data transmissions in extremely bad channel conditions.

In an embodiment, if a percentage of NACKs is less than a threshold, then a WTRU may switch to a unicast retransmission mode when retransmitting to the WTRUs that reported a NACK. The specific threshold(s) chosen may depend on the QoS of the initial transmission. For example, if the QoS is low, then the WTRU may retransmit again in a groupcast mode. However, if the QoS is high, the WTRU may retransmit in a unicast mode. Once a transport block is ACKed once by a receiving WTRU, the transport block may be counted as ACKed for the receiving WTRU regardless of whether or not subsequent retransmissions which include the receiving WTRU are also successfully ACKed. In embodiments, a receiving WTRU which reports a first ACK may not report subsequent ACKs on receipt of retransmissions.

Figure 17:
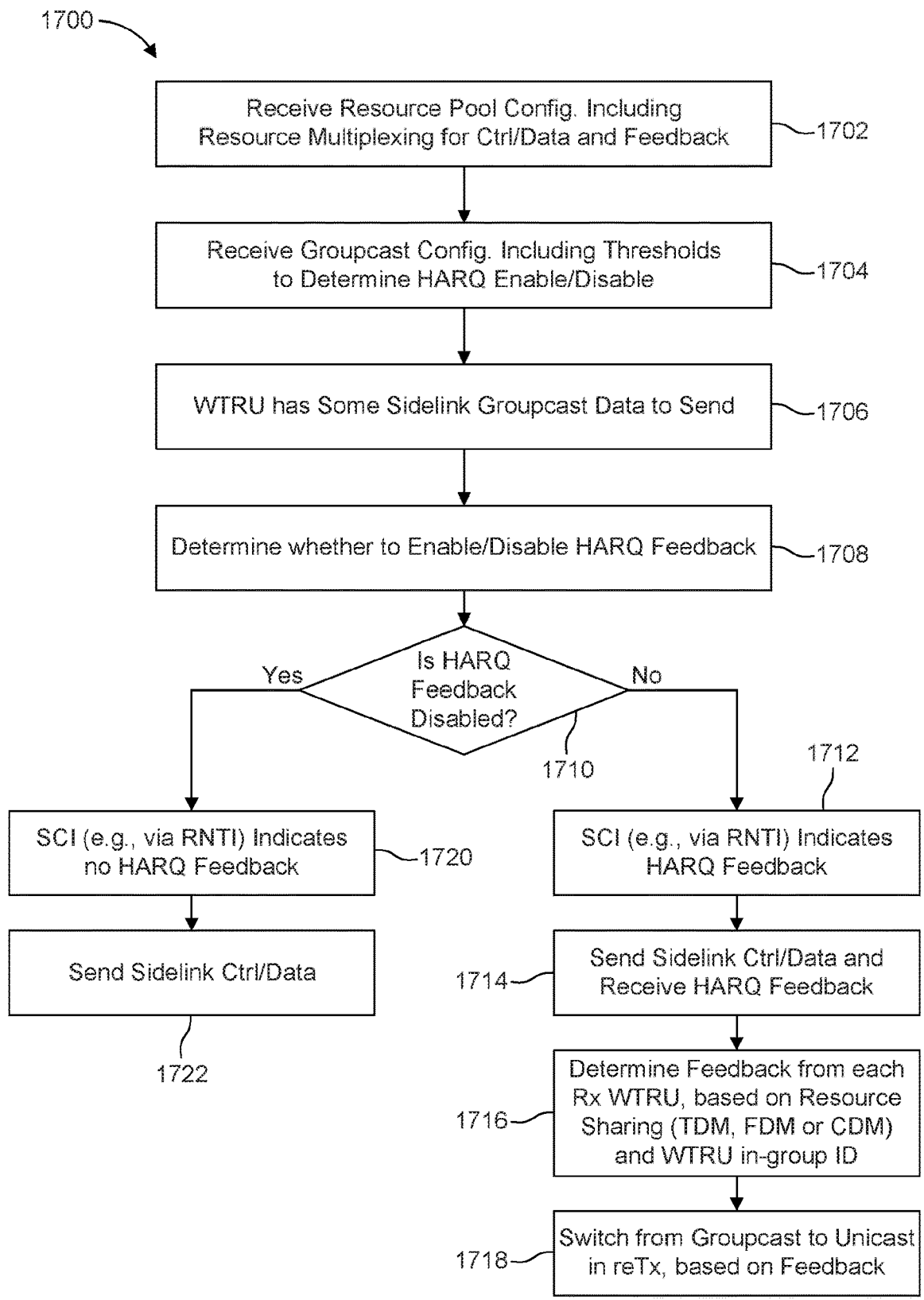
FIG. 17 is a flow diagram for sending data when HARQ feedback is either enabled or disabled.

FIG. 17 is a flow diagram 1700 for sending data when HARQ feedback is either enabled or disabled. A WTRU may receive 1702 a resource pool configuration which indicates resource multiplexing for control, data and/or feedback resources. The WTRU may receive 1704 a groupcast configuration which includes a set of rules and criteria as well as thresholds for determining whether to enable or disable HARQ. Enabling or disabling HARQ may be determined either implicitly, for example, via a set of rules, criteria and thresholds or explicitly via an indication, for example, a dynamic indication, a semi-static configuration or the like, or a combination of both. The WTRU may determine 1706 that some sidelink groupcast data is buffered for sending. The WTRU may determine 1708 whether to enable or disable HARQ feedback based on the threshold indicated, configured or received 1704. A determination as to whether HARQ feedback is disabled 1710 may be made. If HARQ feedback is disabled, the WTRU may compile and send 1720 an SCI, via RNTI, for example, via a CRC masked with a RNTI, scrambled with an RNTI, including an RNTI in payload, or the like, which indicates no HARQ Feedback. Subsequently, sidelink control and/or data may be sent 1722.

If HARQ feedback is not disabled, the WTRU may send 1712 an SCI, via RNTI, for example, a CRC masked with RNTI, scrambled with an RNTI, including an RNTI in a payload portion, or the like, which indicates that HARQ feedback is requested. The WTRU may send sidelink control information and/or data and may receive 1714 HARQ feedback in response. The WTRU may determine 1716 feedback from each Rx WTRU, based on resource sharing, for example, TDM, FDM or CDM resource sharing, and/or a WTRU in-group ID. Based on the feedback received, the WTRU may switch 1718 from groupcast transmission mode to unicast transmission mode for one or more data or control retransmissions. Some rules and/or criteria may be used to trigger a transmission mode and/or a feedback mode. For example, if a percentage of NACKs is less than a threshold or the number of NACKs is less than a threshold, or the like, the transmission mode and/or HARQ (re)-transmission mode may be triggered to switch to a unicast retransmission or to a unicast HARQ (re)-transmission mode for the WTRU (s) that send NACKs. When a specific WTRU transmits NACKs that are above a threshold quantity, the transmission mode and/or HARQ (re)-transmission mode may be triggered to switch to a unicast retransmission or a unicast HARQ (re)-transmission mode for the WTRU(s) that send the NACKs. There may be one or multiple thresholds configured or indicated. Thresholds may be associated with QoS. For example, each threshold may be associated with a QoS or a set of QoSs. More than one threshold may be associated with a QoS or a set of QoSs, and the like.

When a TB is ACKed initially or during any retransmission by a Rx WTRU, it may be counted as "ACKed" for that WTRU for all subsequent retransmission(s) of the same TB for that WTRU regardless the outcome of the subsequent HARQ feedback that is or are received. For example, even when NACKs are received for the subsequent retransmission of HARQ for that TB, the WTRU may discard the received NACKs and treat that TB in "ACKed" status.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a first wireless transmit/receive unit (WTRU), the method comprising:
    receiving information from a base station, the information indicating one or more resource blocks configured for a physical sidelink feedback channel for a first sidelink resource pool, wherein the physical sidelink feedback channel is for transmission of hybrid automatic repeat request (HARQ) feedback for sidelink transmissions;
    determining that HARQ feedback is enabled for a first sidelink data transmission;
    transmitting sidelink control information (SCI) to a second WTRU, wherein the SCI indicates that HARQ feedback is enabled for the first sidelink data transmission and comprises information indicative of a resource of the physical sidelink feedback channel where the HARQ feedback is to be transmitted for the first sidelink data transmission;
    receiving the HARQ feedback for the first sidelink data transmission, wherein the HARQ feedback is indicated using a sequence-based signal received from the second WTRU on the resource of the physical sidelink feedback channel; and
    transmitting a second sidelink data transmission to the second WTRU via a second sidelink resource pool, wherein HARQ feedback is not received for the second sidelink data transmission when the second sidelink data transmission is sent via the second sidelink resource pool.

2. The method of claim 1, wherein the information is received using radio resource control (RRC) signaling.

3. The method of claim 1, wherein the information indicates whether to enable hybrid automatic repeat request (HARQ) feedback for a vehicle to vehicle (V2V) quality indicator (VQI) level.

4. The method of claim 1, wherein the information indicates whether to enable hybrid automatic repeat request (HARQ) feedback for a quality of service (QoS) level.

5. The method of claim 1, comprising receiving data multiplexed with the HARQ feedback corresponding to the first sidelink data transmission.

6. The method of claim 5, wherein the data multiplexed with the HARQ feedback corresponding to the first sidelink data transmission is received if HARQ feedback is enabled for the first sidelink data transmission.

7. The method of claim 1, wherein the HARQ feedback comprises acknowledgment (ACK) or negative acknowledgment (NACK).

8. The method of claim 1, wherein the information indicative of a resource of the physical sidelink feedback channel comprises an identifier (ID) which is associated with a unicast or multicast link.

9. The method of claim 1, comprising determining whether to enable HARQ feedback for the first sidelink data transmission based on a quality of service (QOS) level of data for transmission.

10. A first wireless transmit/receive unit (WTRU) comprising:
    a receiver configured to receive information from a base station, the information indicating one or more resource blocks configured for a physical sidelink feedback channel for a first sidelink resource pool, wherein the physical sidelink feedback channel is for transmission of hybrid automatic repeat request (HARQ) feedback for sidelink transmissions;
    circuitry configured to determine that HARQ feedback is enabled for a first sidelink data transmission;
    a transmitter configured to transmit sidelink control information (SCI) to a second WTRU, wherein the SCI indicates that HARQ feedback is enabled for the first sidelink data transmission and comprises information indicative of a resource of the physical sidelink feedback channel where the HARQ feedback is to be transmitted for the first sidelink data transmission;
    the receiver configured to receive the HARQ feedback for the first sidelink data transmission, wherein the HARQ feedback is indicated using a sequence-based signal received from the second WTRU on the resource of the physical sidelink feedback channel; and
    the transmitter configured to transmit a second sidelink data transmission to the second WTRU via a second sidelink resource pool, wherein HARQ feedback is not received for the second sidelink data transmission when the second sidelink data transmission is sent via the second sidelink resource pool.

11. The first WTRU of claim 10, wherein the information is received using radio resource control (RRC) signaling.

12. The first WTRU of claim 10, wherein the information indicates whether to enable hybrid automatic repeat request (HARQ) feedback for a vehicle to vehicle (V2V) quality indicator (VQI) level.

13. The first WTRU of claim 10, wherein the information indicates whether to enable hybrid automatic repeat request (HARQ) feedback for a quality of service (QOS) level.

14. The first WTRU of claim 10, wherein the circuitry is configured to determine whether to enable HARQ feedback for the first sidelink data transmission based on a quality of service (QOS) level of data for transmission.

15. The first WTRU of claim 10, wherein the HARQ feedback comprises acknowledgment (ACK) or negative acknowledgment (NACK).

16. The first WTRU of claim 10, wherein the information indicative of a resource of the physical sidelink feedback channel comprises an identifier (ID) which is associated with a unicast or multicast link.

17. The first WTRU of claim 10, wherein the receiver is configured to receive data multiplexed with the HARQ feedback corresponding to the first sidelink data transmission.

18. The first WTRU of claim 17, wherein the data multiplexed with the HARQ feedback corresponding to the first sidelink data transmission is received if HARQ feedback is enabled for the first sidelink data transmission.

* * * * *